(12) United States Patent
Frederick et al.

(10) Patent No.: US 12,443,167 B2
(45) Date of Patent: Oct. 14, 2025

(54) DEVICE, SYSTEM AND METHOD FOR OPTIMIZING OPERATION OF PRODUCTION EQUIPMENT

(71) Applicant: Makusafe Corp., West Des Moines, IA (US)

(72) Inventors: Mark Frederick, West Des Moines, IA (US); Gabriel Glynn, West Des Moines, IA (US); Matt McMullen, West Des Moines, IA (US)

(73) Assignee: MAKUSAFE CORP., West Des Moines, IA (US)

( * ) Notice: Subject to any disclaimer, the term of this patent is extended or adjusted under 35 U.S.C. 154(b) by 343 days.

(21) Appl. No.: 17/962,827

(22) Filed: Oct. 10, 2022

(65) Prior Publication Data

US 2023/0112656 A1    Apr. 13, 2023

Related U.S. Application Data

(60) Provisional application No. 63/255,110, filed on Oct. 13, 2021.

(51) Int. Cl.
G05B 19/4155    (2006.01)
(52) U.S. Cl.
CPC ............. G05B 19/4155 (2013.01); *G05B 2219/32015* (2013.01)
(58) Field of Classification Search
None
See application file for complete search history.

(56) References Cited

U.S. PATENT DOCUMENTS

| 7,705,723 B2 | 4/2010 | Kahn |
| 8,795,168 B2 | 8/2014 | Goh |

(Continued)

FOREIGN PATENT DOCUMENTS

| KR | 102160545 B1 * | 9/2020 |
| WO | 2022013738 A1 | 1/2022 |

OTHER PUBLICATIONS

S. Banerjee M. Hempel and H. Sharif "A review of workspace challenges and wearable solutions in railroads and construction" 2017 13th International Wireless Communications and Mobile Computing Conference (IWCMC) Valencia Spain 2017 pp. 91-96 doi: B13.

*Primary Examiner* — David Earl Ogg
(74) *Attorney, Agent, or Firm* — Christopher A. Proskey; BrownWinick Law Firm

(57) ABSTRACT

In one or more arrangements, a system and method for optimizing a set of production equipment (e.g., a production line) is presented. In some arrangements, a worker detection system is configured to track workers present at the production equipment and a control system is configured to adjust operation of the production equipment as a function of data received from the worker detection system. In some arrangements, the worker detection system is configured to detect workers using wearable devices configured to be worn during a work shift. In some arrangements, the control system is configured to receive data relating to workers present at the set of production equipment from the worker detection system and perform one or more control processes to optimize operation of one or more sets of production equipment and/or evaluate safety risks faced by the worker during the work shift based on data received from the wearable devices.

44 Claims, 38 Drawing Sheets

(56) References Cited

U.S. PATENT DOCUMENTS

| | | |
|---|---|---|
| 9,659,484 B1 | 5/2017 | Mehta |
| 9,721,456 B2 | 8/2017 | Thurlow |
| 10,096,230 B2 | 10/2018 | Glynn |
| 10,454,971 B2 | 10/2019 | Chalmers |
| 10,522,024 B2 | 12/2019 | Glynn |
| 11,030,875 B2 | 6/2021 | Glynn |
| D937,828 S | 12/2021 | Glynn |
| D938,415 S | 12/2021 | Glynn |
| 11,527,142 B2 | 12/2022 | Glynn |
| 11,743,958 B2 | 8/2023 | Raj |
| 12,109,015 B1 | 10/2024 | Kiran |
| 2005/0073426 A1 | 4/2005 | Hines |
| 2007/0106775 A1 | 5/2007 | Wong |
| 2008/0180243 A1 | 7/2008 | Aaron |
| 2009/0047643 A1* | 2/2009 | Isaac ............. G09B 19/00 434/237 |
| 2009/0121931 A1 | 5/2009 | Katz |
| 2010/0099461 A1 | 4/2010 | Rahfaldt |
| 2010/0241465 A1 | 9/2010 | Amigo |
| 2013/0103428 A1 | 4/2013 | Molinsky |
| 2013/0271264 A1 | 10/2013 | Page |
| 2014/0266793 A1 | 9/2014 | Velado |
| 2015/0099945 A1 | 4/2015 | Hawkins, III |
| 2015/0161872 A1* | 6/2015 | Beaulieu ............. B66C 13/40 340/686.6 |
| 2017/0024531 A1 | 1/2017 | Malaviya |
| 2017/0127257 A1 | 5/2017 | Saxena |
| 2017/0140637 A1 | 5/2017 | Thurlow |
| 2017/0245806 A1* | 8/2017 | Elhawary ............. A61B 5/1122 |
| 2017/0330446 A1 | 11/2017 | Thurlow |
| 2017/0352242 A1 | 12/2017 | Glynn |
| 2018/0052970 A1 | 2/2018 | Boss |
| 2018/0121861 A1* | 5/2018 | Morgenthau ... G06Q 10/063114 |
| 2019/0114573 A1 | 4/2019 | Moore |
| 2020/0202281 A1* | 6/2020 | Barak ............. G06F 21/84 |
| 2020/0297250 A1* | 9/2020 | Elhawary ............. A61B 5/1123 |
| 2021/0005072 A1* | 1/2021 | Dinkins ............. G08B 21/0461 |
| 2021/0264764 A1 | 8/2021 | Glynn |
| 2021/0295460 A1* | 9/2021 | Tamazato ............. G06Q 50/265 |
| 2021/0350312 A1* | 11/2021 | Swift ............. G06Q 10/06313 |
| 2021/0383261 A1 | 12/2021 | Hanna |
| 2022/0147889 A1 | 5/2022 | Frederick |
| 2022/0277254 A1 | 9/2022 | Feeney |
| 2022/0349151 A1* | 11/2022 | Imura ............. E02F 9/2033 |
| 2024/0087444 A1 | 3/2024 | Bucchieri |

* cited by examiner

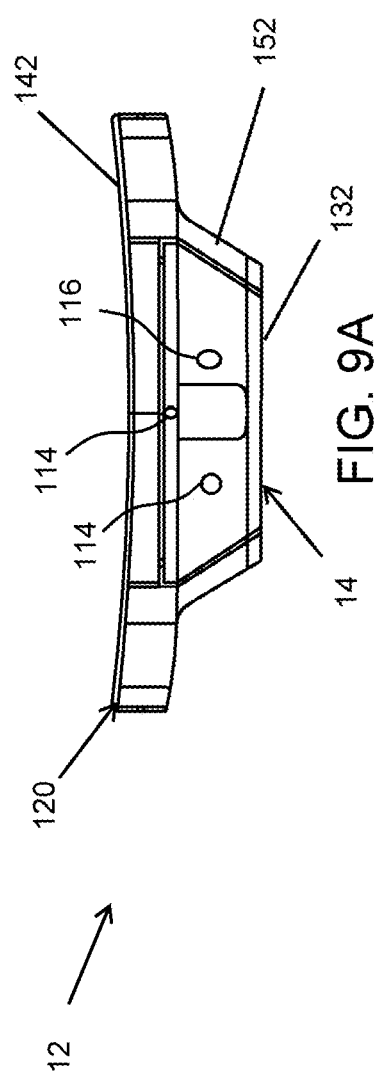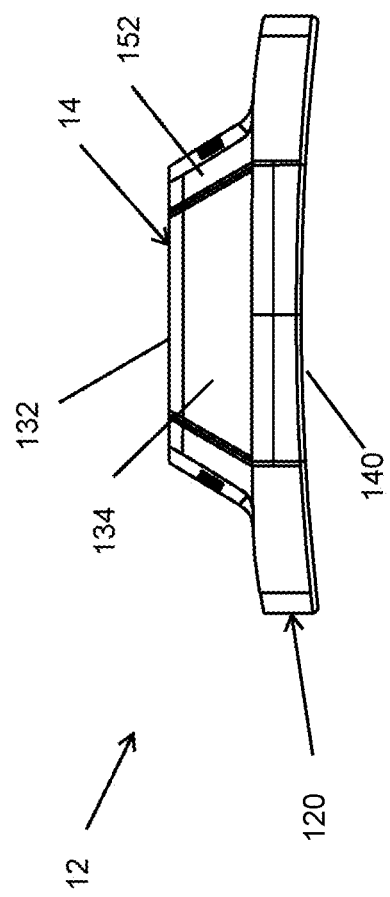

DEVICE, SYSTEM AND METHOD FOR OPTIMIZING OPERATION OF PRODUCTION EQUIPMENT

CROSS REFERENCE TO RELATED APPLICATIONS

This application claims priority to U.S. Provisional Patent Application. 63/255,110 filed on Oct. 13, 2021 and titled "DEVICE, SYSTEM AND METHOD FOR OPTIMIZING OPERATION OF A PRODUCTION LINE", the entirety of which is hereby fully incorporated by reference herein.

FIELD OF THE DISCLOSURE

This disclosure generally relates to monitoring systems. More specifically and without limitation, this disclosure relates to a monitoring system utilizing wearable devices to gather information indicative of work and analyze risk posed to workers by the work.

OVERVIEW OF THE DISCLOSURE

High throughput production equipment such as production lines have been key to the increase production and manufacturing in the $20^{th}$ and 21 centuries. Ideally, companies want to run production equipment with the highest throughput possible in order to produce the maximum amount of goods and maximize profits. However, it is recognized that productivity of workers operating production equipment varies during operation. For example, during a work shift, the number of workers on a production line may increase and/or decrease as workers are rotated on and off the production line. Furthermore, productivity of a worker may vary over time while working on the line. As one example, a worker newly placed on the line may initially be less productive while becoming accustomed to the movements of the required tasks. As another example, a worker may become less productive after working the line for longer period due to physical and/or mental fatigue.

If the number of workers and/or levels of productivity are not sufficient to process goods at the current throughput rate of the production line, goods may pass through the line without the required processing and may be required to be repaired or discarded. Furthermore, unsatisfactory and/or defective goods may pass through the production line without being removed. Accordingly, it is essential to ensure throughput of a production line does not exceed the capabilities of the workers present at production line at any given time to maximize production of good and minimize loses.

It is also important to monitor productivity and ensure throughput of a production line does not exceed the capabilities of the workers on the line to reduce the risk of injury. Injuries at work are tremendously costly for both the corporation as well as the injured worker. As an example, it is estimated that 2016 will again see nearly 100 billion dollars in workers' compensation claims. It is estimated that the average claim in the United State in 2016 will amount to over $100,000.

Most, if not all of these work-related injuries are avoidable. In view of the personal cost to the injured worker and the financial cost to the employer, a great amount of energy and effort has been placed on avoiding workplace injuries. Many employers have implemented various systems to avoid accidents ranging from common sense solutions to sophisticated systems, from establishing safety teams and safety managers to hiring third-party safety auditors, and everything in-between. However, despite these many efforts, avoidable injuries continue to occur at an alarming pace.

Therefore, there is a need in the art to provide a device, system and method of use for optimizing operation of production equipment.

Thus, it is a primary object of the disclosure to provide a wearable device, system and method of use that improves upon the state of the art.

Another object of the disclosure is to provide a system and method for managing operation of production equipment using a worker detection system.

Yet another object of the disclosure is to provide a system and method for managing operation of one or more production lines that monitors workers operating production equipment.

Another object of the disclosure is to provide a system and method for managing operation of production equipment that monitors workers working at the production line using wearable devices.

Yet another object of the disclosure is to provide a system and method for managing operation of production equipment that adjusts throughput speed based on a number of workers operating the production equipment.

Another object of the disclosure is to provide a system and method for managing operation of production equipment that adjusts speed of a production line based on the productivity of workers present at the production equipment.

Yet another object of the disclosure is to provide a system and method for managing operation of production equipment that optimizes rotation of workers between different production equipment.

Another object of the disclosure is to provide a system and method for managing operation of production equipment that tracks time workers worked on the various production equipment.

Yet another object of the disclosure is to provide a wearable device, system and method of use that aggregates a great amount of information about the work performed by workers and workplace conditions.

Another object of the disclosure is to provide a wearable device, system and method of use that eliminates bias in the collection of information about the work performed by workers and workplace conditions.

Yet another object of the disclosure is to provide a wearable device, system and method that more accurately assesses risk during a work shift.

Another object of the disclosure is to provide a wearable device, system and method of use that eliminates the inconsistency in reporting information about the work performed by workers and workplace conditions.

Yet another object of the disclosure is to provide a wearable device, system and method of use that analyzes data gathered to assess risk posed to workers at multiple times throughout a work shift.

Another object of the disclosure is to provide a wearable device, system and method of use that aggregates a great amount of information indicative of work performed by workers and workplace conditions to facilitate data analytics.

Yet another object of the disclosure is to provide a wearable device, system and method of use that assesses gathered data indicative of work performed by workers and workplace conditions to facilitate assessment of safety risks faced by workers during a work shift.

Another object of the disclosure is to provide a wearable device, system and method of use that assesses gathered data indicative of work performed by workers and workplace conditions to facilitate optimization of throughput on production equipment.

Yet another object of the disclosure is to provide a wearable device, system and method of use that is cost effective.

Another object of the disclosure is to provide a wearable device, system and method of use that is safe to use.

Yet another object of the disclosure is to provide a wearable device, system and method of use that is easy to use.

Another object of the disclosure is to provide a wearable device, system and method of use that is efficient to use.

Yet another object of the disclosure is to provide a wearable device, system and method of use that is durable.

Another object of the disclosure is to provide a wearable device, system and method of use that is robust.

Yet another object of the disclosure is to provide a wearable device, system and method of use that can be used with a wide variety of manufacturing facilities.

Another object of the disclosure is to provide a wearable device, system and method of use that is high quality.

Yet another object of the disclosure is to provide a wearable device, system and method of use that has a long useful life.

Another object of the disclosure is to provide a wearable device, system and method of use that can be used with a wide variety of occupations.

Yet another object of the disclosure is to provide a wearable device, system and method of use that provides high quality data.

Another object of the disclosure is to provide a wearable device, system and method of use that provides data and information that can be relied upon.

Yet another object of the disclosure is to provide a wearable device, system and method of use that allows for companies to compare the safety of their facilities to other facilities inside the same company and outside the company to determine how safe or efficient their facilities are in comparison.

Another object of the disclosure is to provide a system wearable device, system and method of use that monitors physical exertion exhibited by workers during a work shift.

These and countless other objects, features, or advantages of the present disclosure will become apparent from the specification, figures, and claims.

SUMMARY OF THE DISCLOSURE

In one or more arrangements, a system and method for optimizing a set of production equipment (e.g., a production line) is presented. In one or more arrangements, the system includes a worker detection system configured to track workers present at the production equipment and a control system configured to adjust operation of the production equipment as a function of data received from the worker detection system.

In one or more arrangements, the worker detection system is configured to detect workers using wearable devices configured to be worn by workers during a work shift. In one or more arrangements, the control system is configured to receive data relating to workers present at the set of production equipment from the worker detection system and perform one or more control processes to optimize operation of one or more sets of production equipment and/or evaluate safety risks faced by the worker during the work shift based on data received from the wearable devices. In one or more arrangements, control system is configured to adjust speed of a set of production equipment based on the number of workers present at the set of production equipment. In one or more arrangements, control system is configured to determine productivity of workers present at the set of production equipment and adjust speed of a production line based on the determined productivity.

In one or more arrangements, the wearable devices have a power source, a wireless communication module and one or more sensors. In one or more arrangements, the sensors are configured to monitor environmental data, biometric data, accelerometer and motion data, location and/or other data indicative of working conditions and/or work performed by the workers. In one or more arrangements, the wearable device records information gathered by the sensors. In one or more arrangements, the system is configured to receive and store the information recorded by the wearable devices. In one or more arrangements, the control system is configured to control one or more various aspects of a set of production equipment based on the information received from the wearable devices.

BRIEF DESCRIPTION OF THE DRAWINGS

FIG. 9A is an elevation view of the top side of the system shown in FIGS. 5 through 9, the view showing the core fully inserted within the opening of the holster; the view showing the band removed; the view showing a light pipe positioned in the core that provides access for light in the environment to be sensed by a light sensor; the view also showing a plurality of openings in the core that provides access to other sensors in the core, such as a sound sensor and an air quality sensor, or the like.

FIG. 9B is an elevation view of the bottom side of the system shown in FIGS. 5 through 9, the view showing the core fully inserted within the opening of the holster; the view showing the band removed.

DETAILED DESCRIPTION OF THE DISCLOSURE

Figure 1:
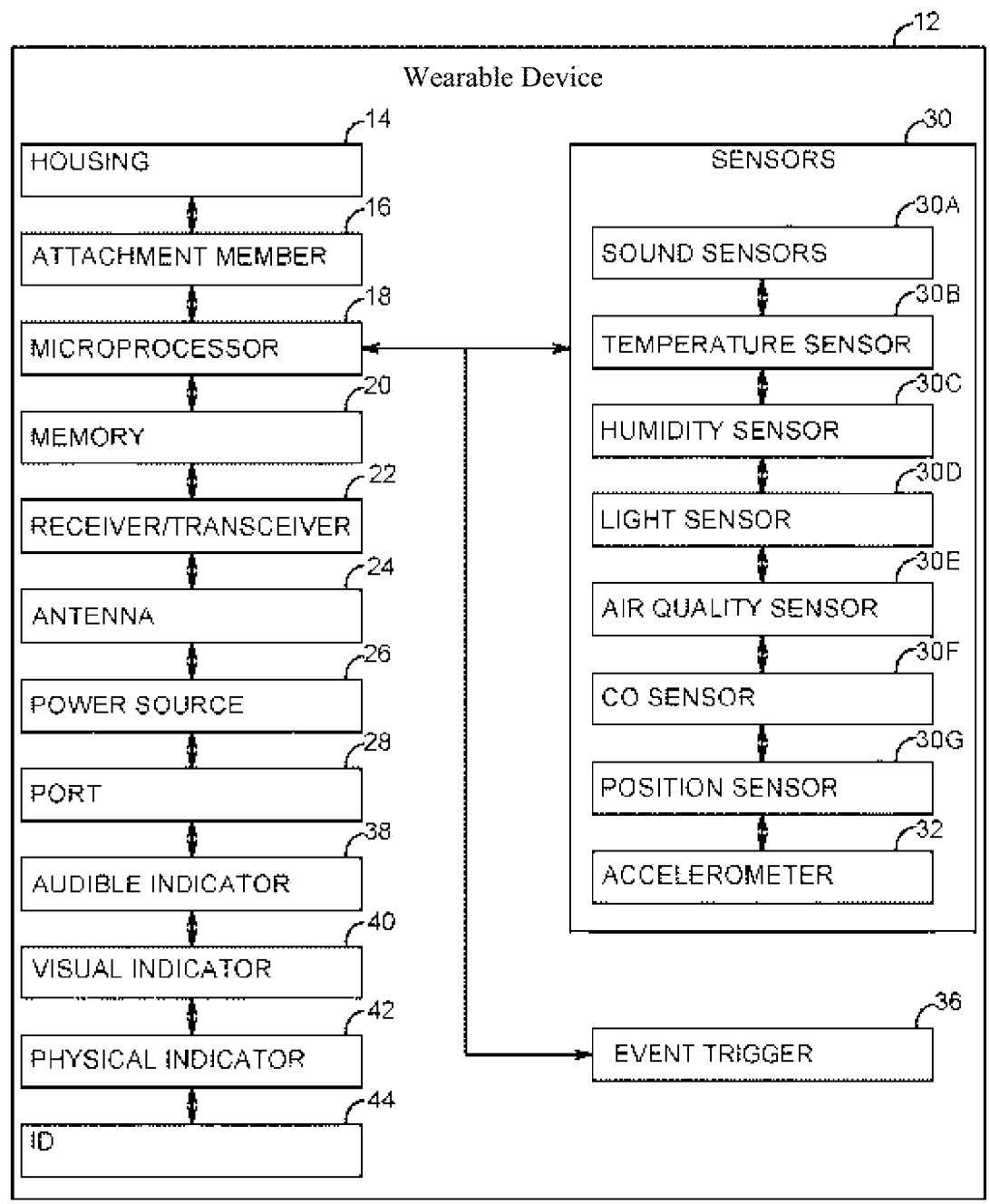
FIG. 1 is a plan view of a wearable device for use in a system for gathering data on workers and worker conditions and/or controlling operation of a production line, in accordance with one or more embodiments, the wearable device having a housing or core, an attachment member, at least one microprocessor, at least one memory, a receiver and/or transceiver, an antenna, a power source, a port, an audible indicator, a visual indicator, a physical indicator, an ID, and a plurality of sensors including sound sensors, temperature sensors, humidity sensors, light sensors, air quality sensors, CO censors, position sensors and an accelerometer, to name a few, the wearable device also includes an event trigger; the wearable device is included as part of a system configured to facilitates the collection and analyzation of worker activities and movements and facilitates the detection, tracking, identification and response to accidents, near misses and notable events or suggestions.
Figure 2:
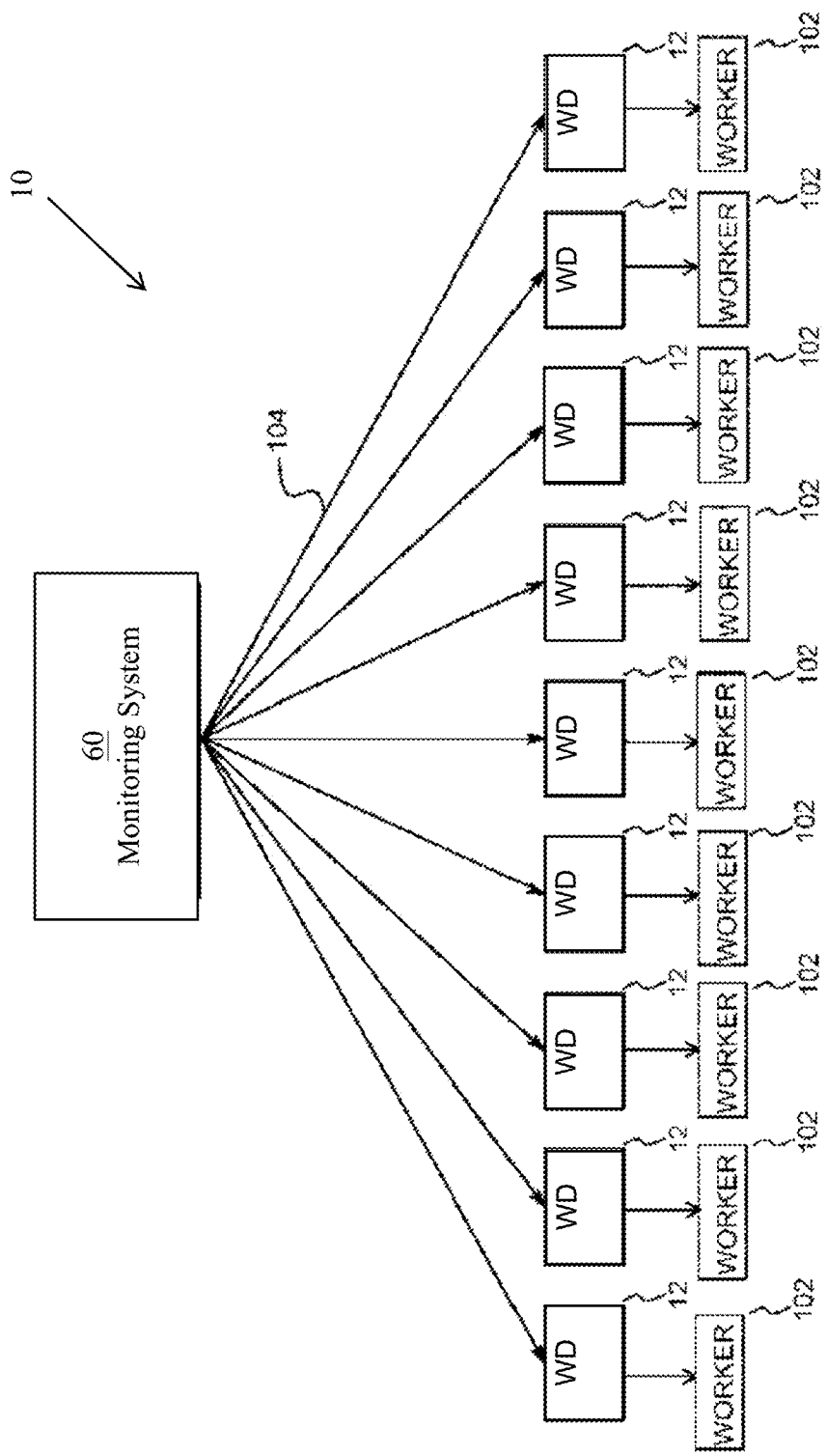
FIG. 2 is a plan view of a system using the wearable device described in FIG. 1 for collection of information, the view showing a plurality of wearable devices, each assigned to a worker; the view showing these wearable devices in communication with the database, electronic network and management software; the view showing information from the wearable devices flowing to a safety manager for the safety manager's attention to the information provided by the wearable devices including to accidents, near misses and notable events or suggestions.
Figure 3:
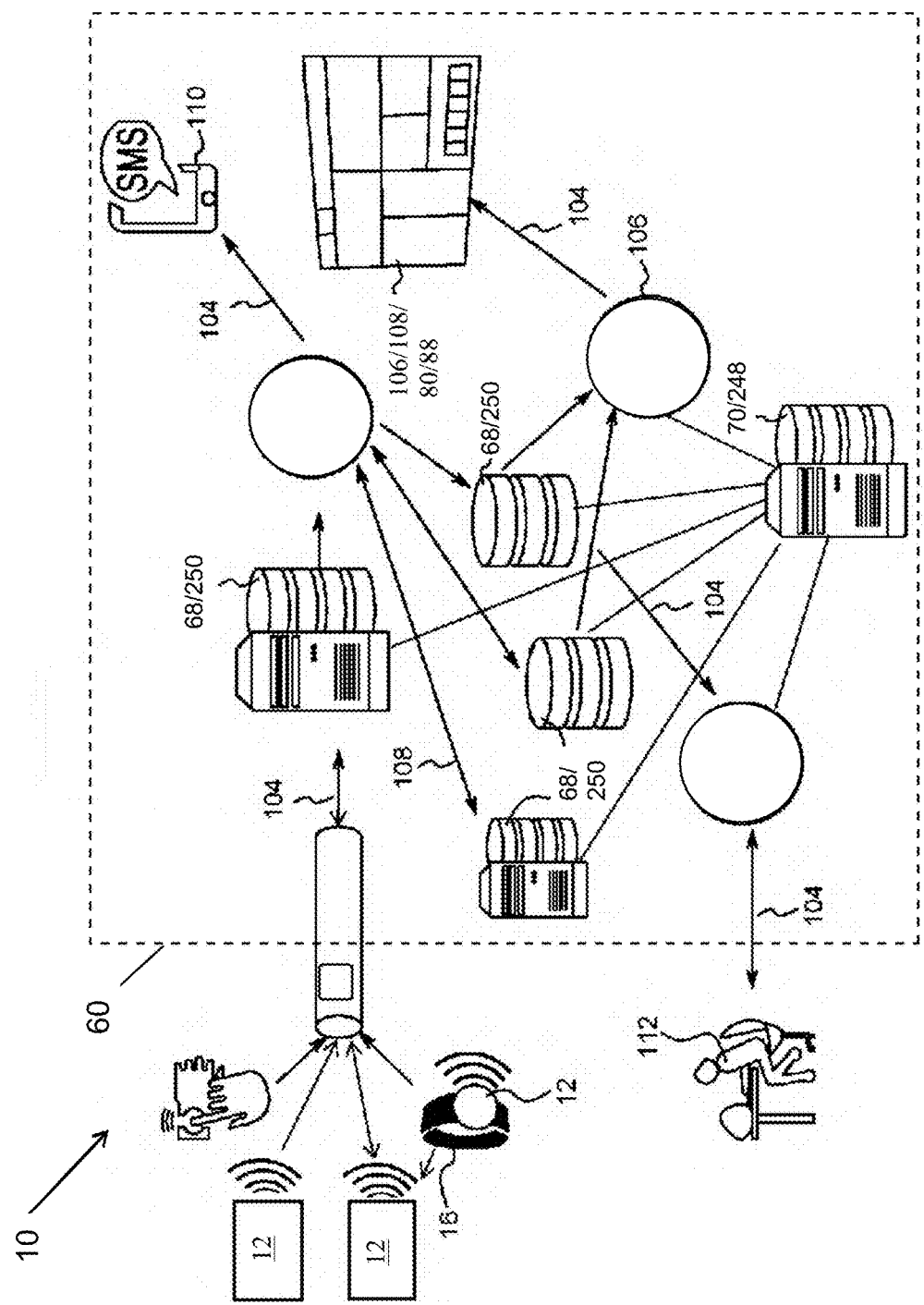
FIG. 3 is a plan view of the system described in FIG. 2, the view showing a wearable device in electronic communication with the components of the system including a database, data processing system, user interface, management software, control processes and/or data analytics processes, the view also showing the wearable device in communication with a safety manager and/or in communication with the electronic device of a safety manager.
Figure 4:
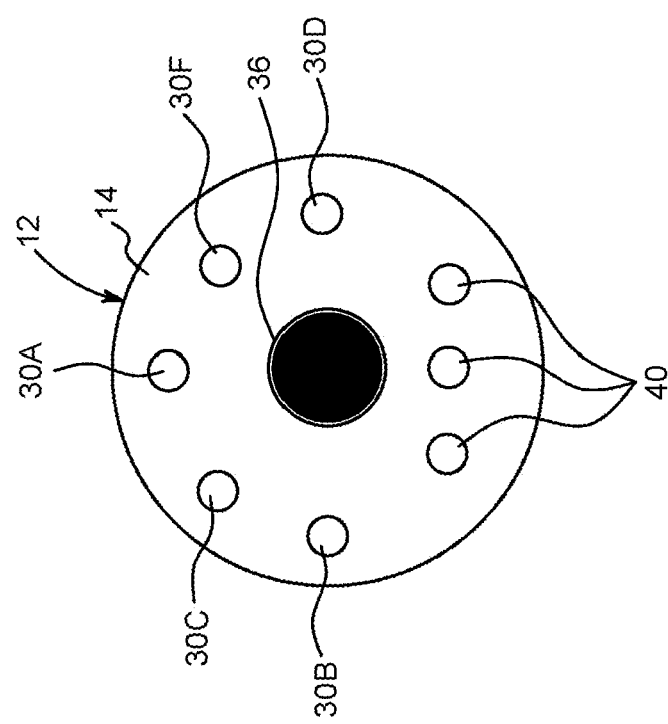
FIG. 4 is an elevation view of one configuration of a wearable device, the view showing a core having a generally circular peripheral shape, the view showing the wearable device having an event trigger, a plurality of sensors, and a plurality of visual indicators.
Figure 5:
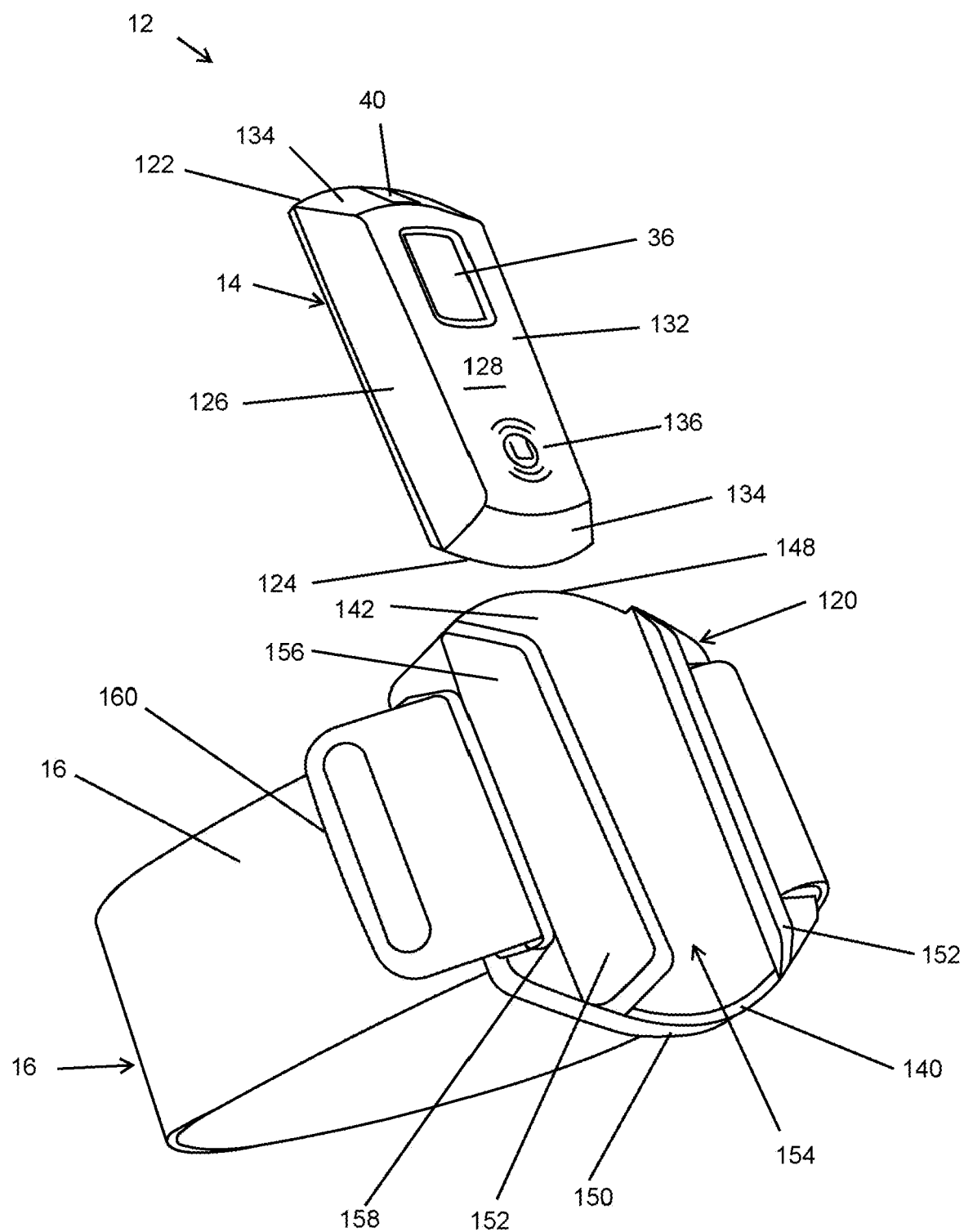
FIG. 5 is a perspective view of another configuration of a wearable device, the view showing the wearable device having an elongated core having an upper end, lower end, opposing sides, a forward wall, a back wall, and opposing end walls, the wearable device having an event trigger positioned within its forward wall, and a visual indicator positioned in its upper end wall; the view showing the core sized and shaped to fit within an opening of a holster, the holster having a back wall and a pair of side walls and a step that are configured to receive and hold the core therein; the view showing the holster connected to an attachment device that is in the form of a band that is configured to fit around the wrist or arm of a worker; the view showing the core about to be inserted within the opening of the holster.
Figure 6:
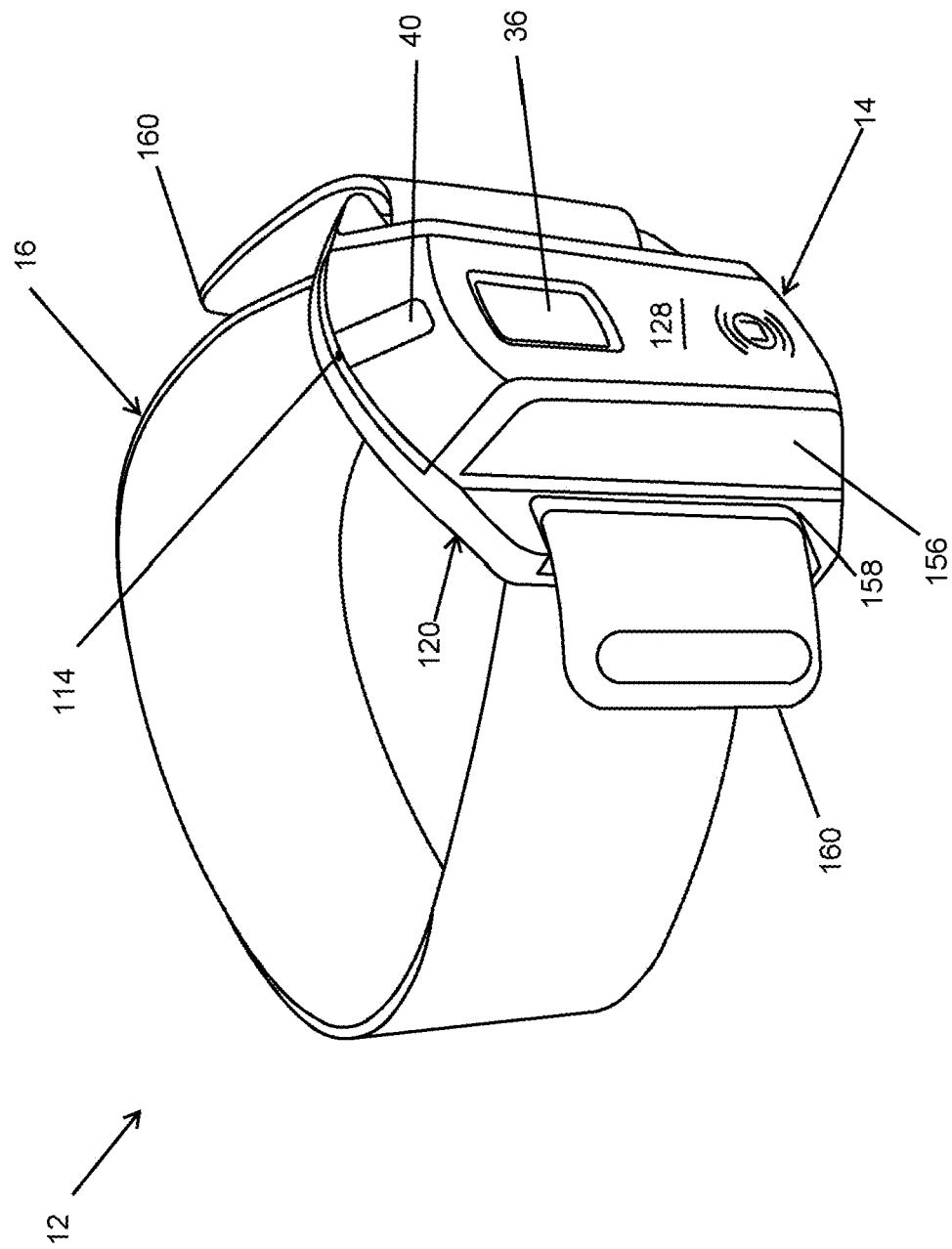
FIG. 6 is a perspective view of the system shown in FIG. 5, the view showing the core fully inserted within the opening of the holster; the view also showing an opening in the upper end of the core to provide access to sensors housed within the hollow interior of the core.
Figure 7:
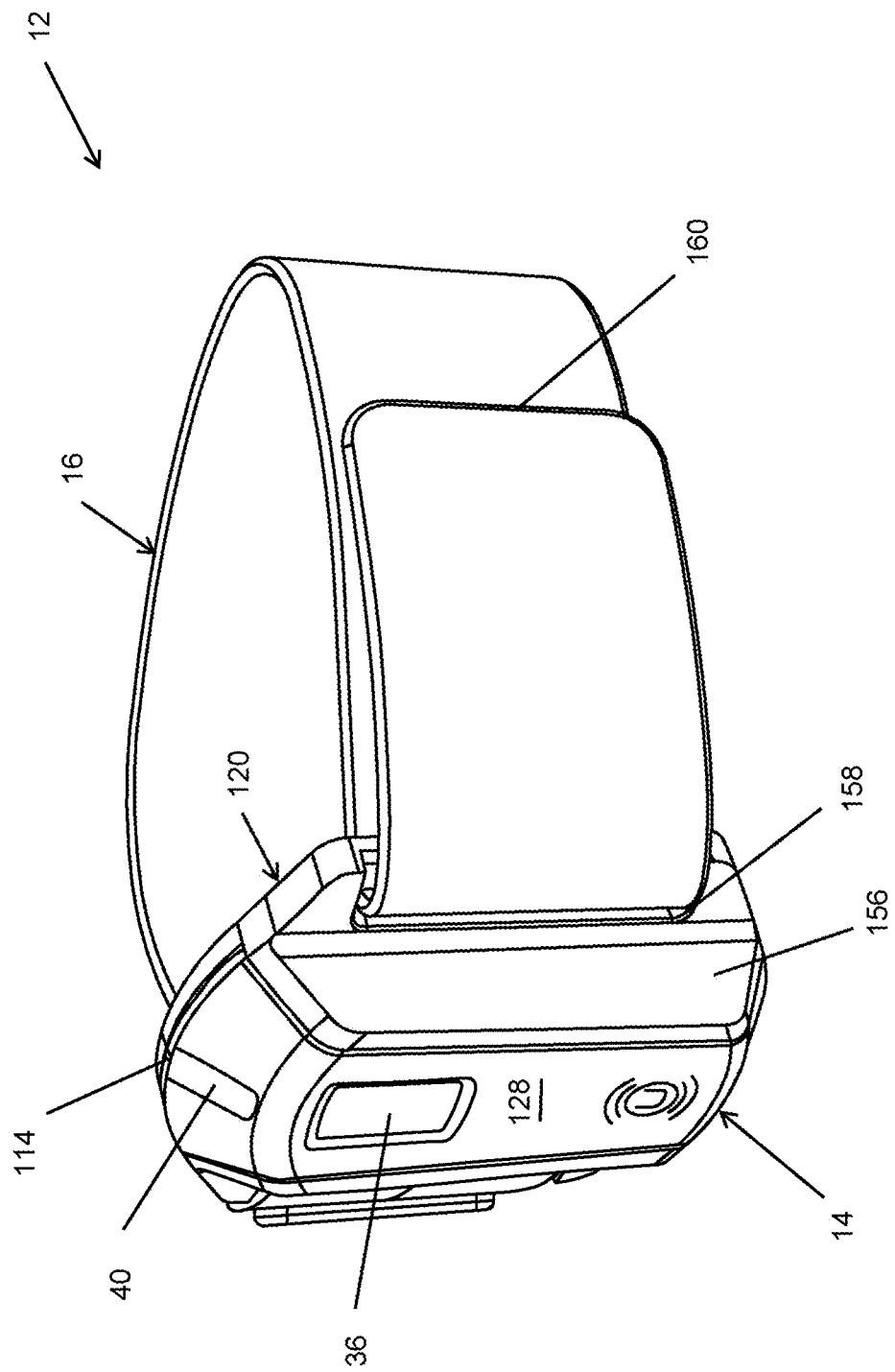
FIG. 7 is another perspective view of the system shown in FIGS. 5 and 6, the view showing the core fully inserted within the opening of the holster; the view also showing an opening in the upper end of the core to provide access to sensors housed within the hollow interior of the core.
Figure 8:
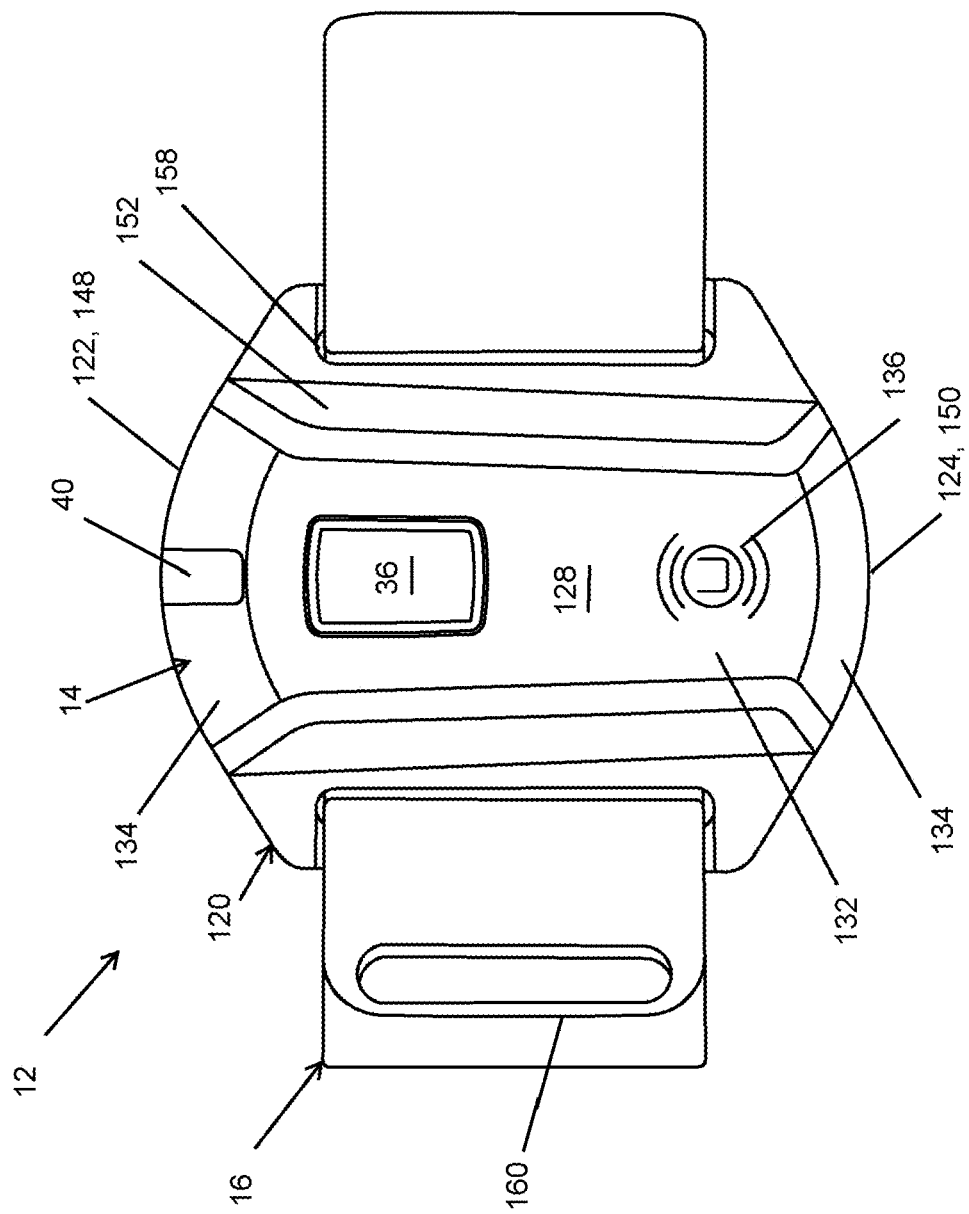
FIG. 8 is an elevation view of the front side of the system shown in FIGS. 5 through 7, the view showing the core fully inserted within the opening of the holster.
Figure 9:
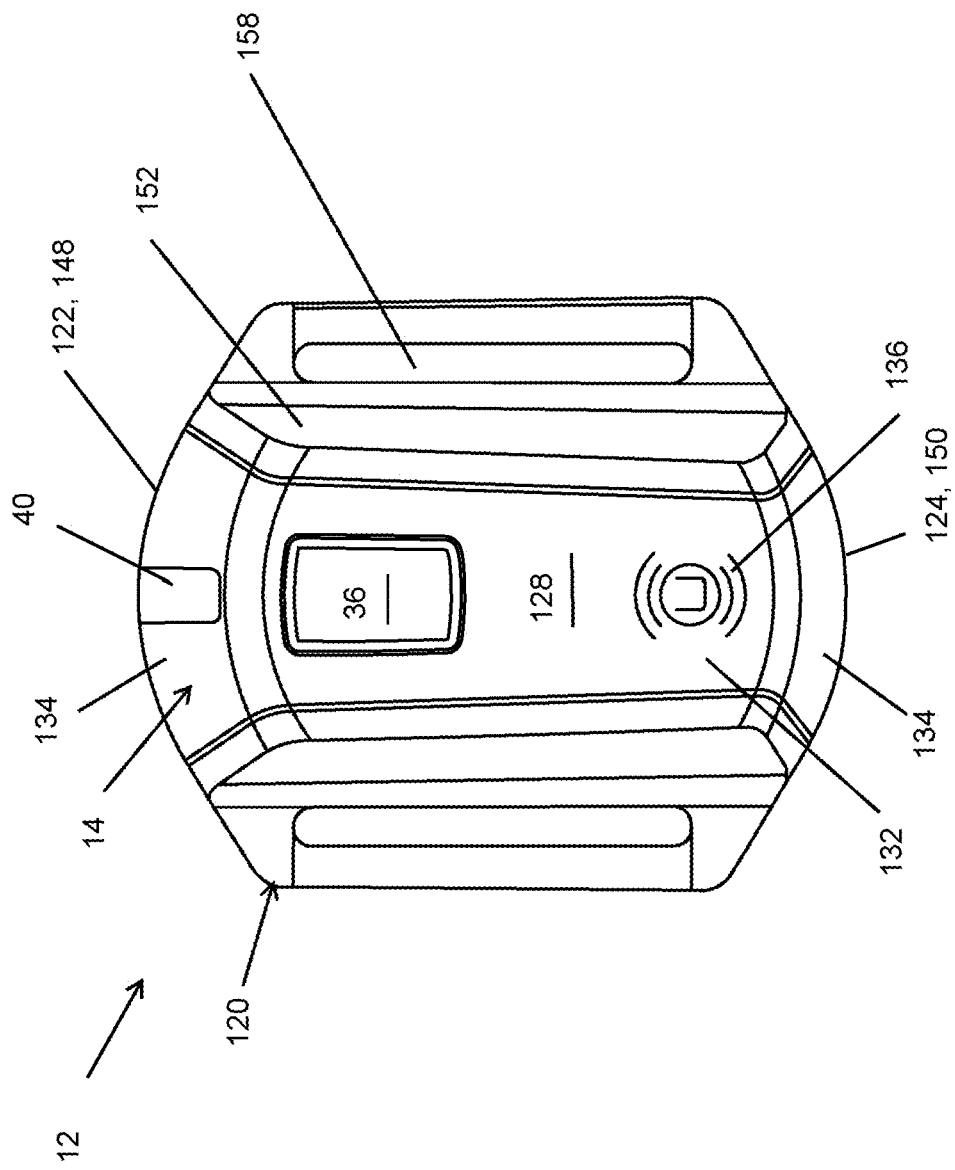
FIG. 9 is an elevation view of the front side of the system shown in FIGS. 5 through 8, the view showing the core fully inserted within the opening of the holster; the view showing the band removed.
Figure 9D:
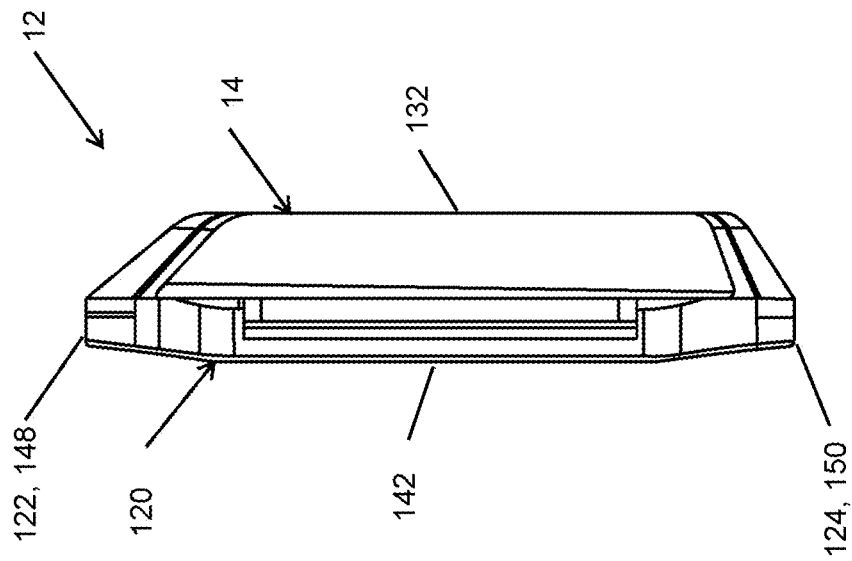
FIG. 9D is an elevation view of the right side of the system shown in FIGS. 5 through 9, the view showing the core fully inserted within the opening of the holster; the view showing the band removed.
Figure 9C:
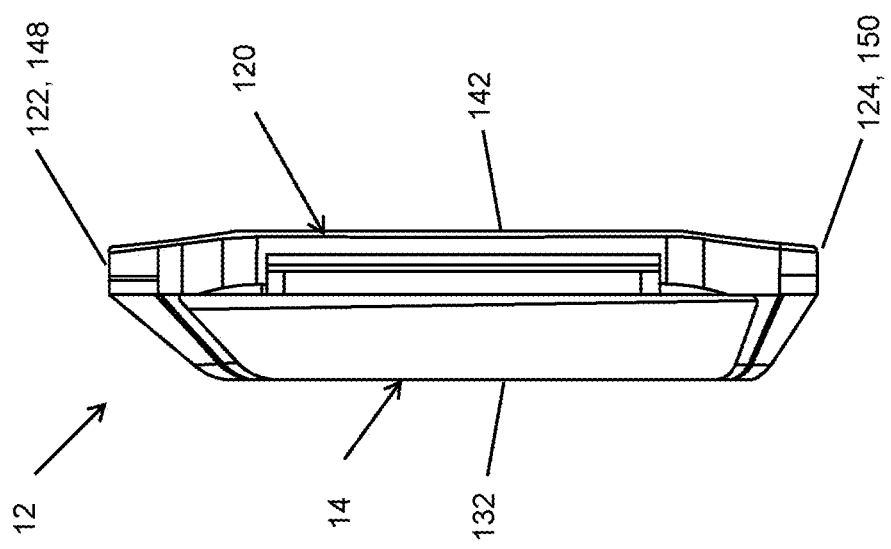
FIG. 9C is an elevation view of the left side of the system shown in FIGS. 5 through 9, the view showing the core fully inserted within the opening of the holster; the view showing the band removed.
Figure 10:
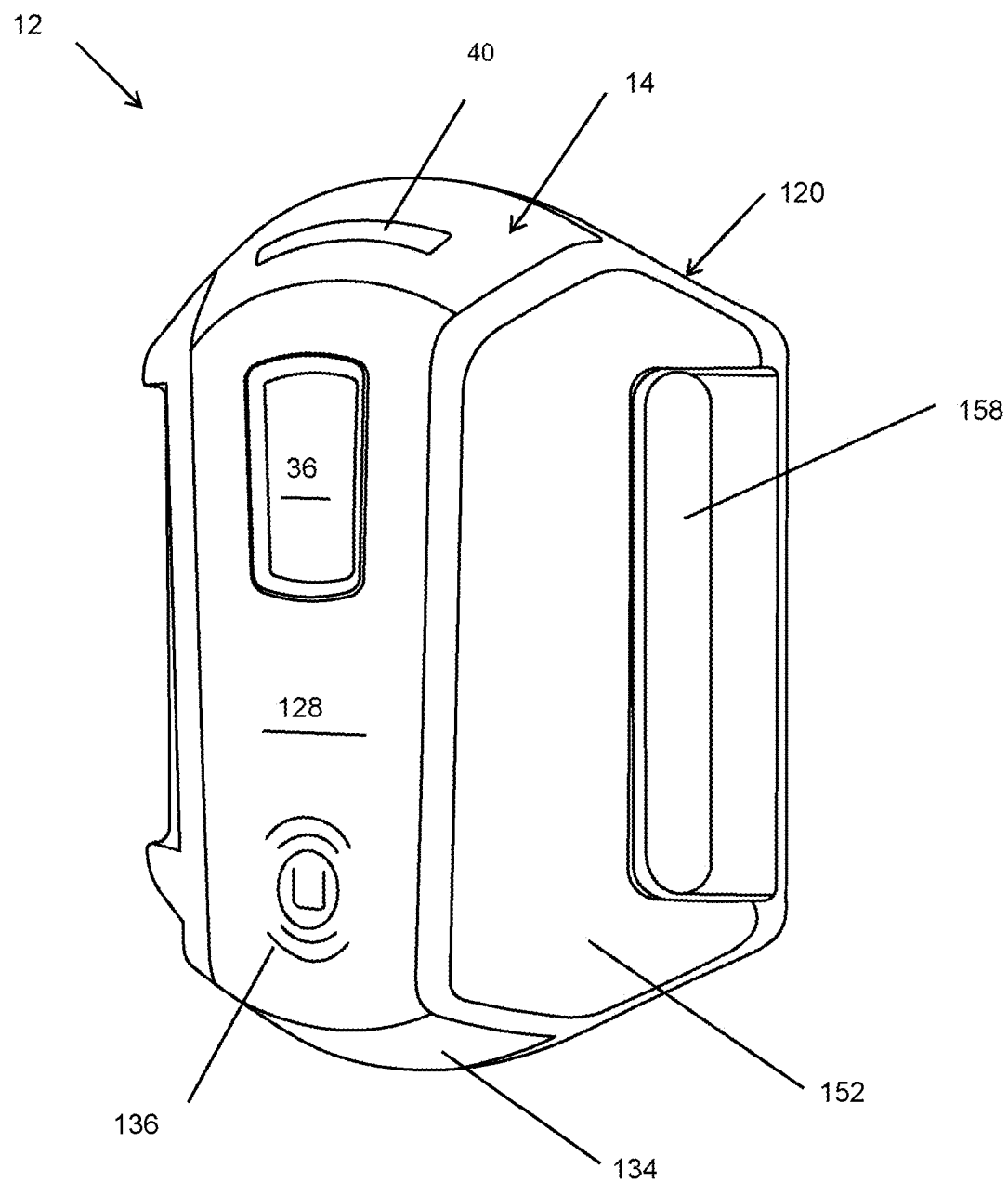
FIG. 10 is another perspective view of the system shown in FIGS. 5 through 9, the view showing the core fully inserted within the opening of the holster; the view showing the band removed.
Figure 11:
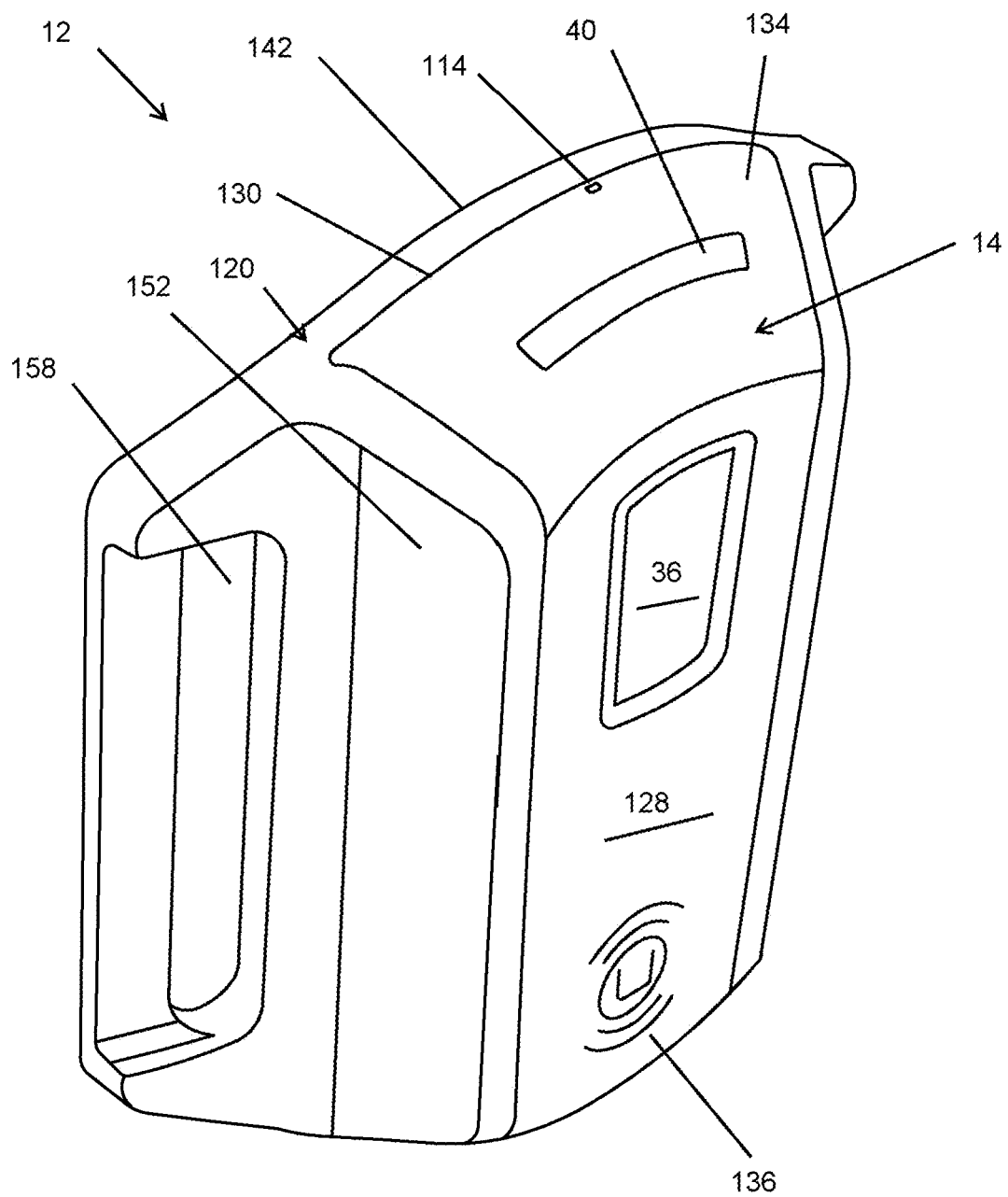
FIG. 11 is another perspective view of the system shown in FIGS. 5 through 10, the view showing the core fully inserted within the opening of the holster; the view showing the band removed.
Figure 12:
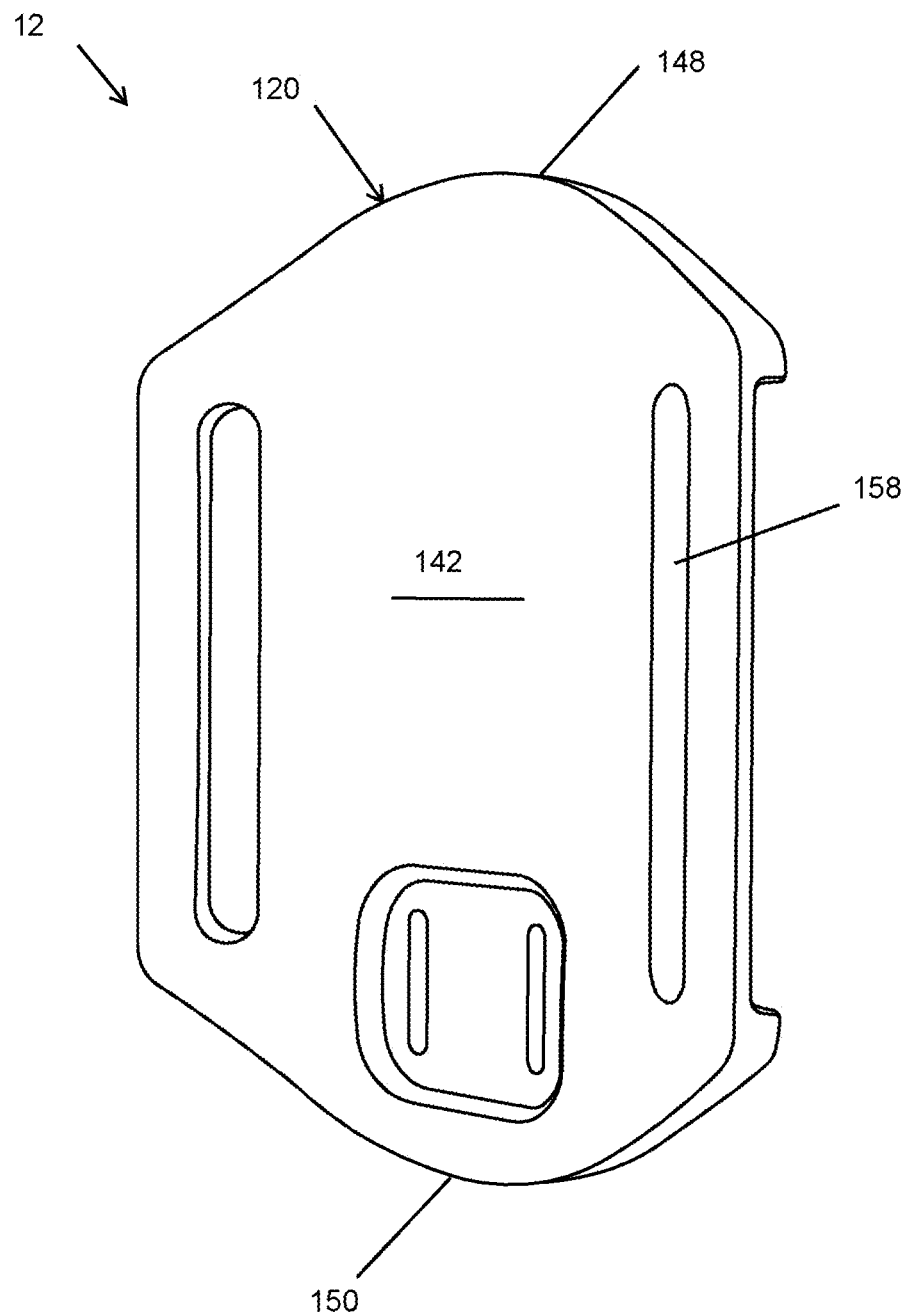
FIG. 12 is another perspective view of the system shown in FIGS. 5 through 11, the view showing the core fully inserted within the opening of the holster; the view showing the band removed; the view showing the back side of the holster.
Figure 13:
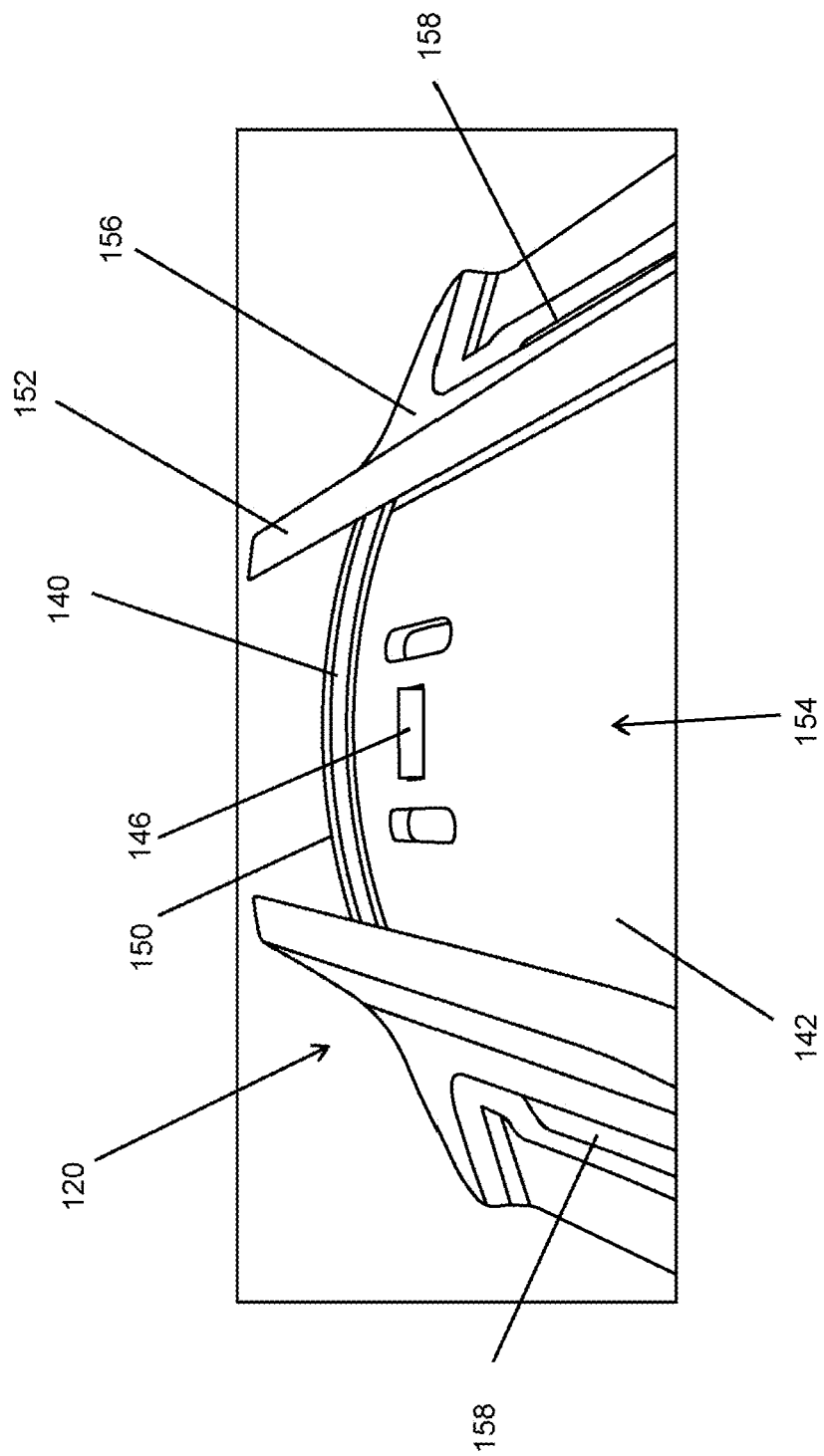
FIG. 13 is a partial perspective view of the holster of the system, the view showing the opening in the holster between opposing sidewalls and the back wall that is sized and shaped to receive the core therein; the view also showing the detent mechanism in the back wall that is configured to engage the core and hold the core within the opening of the holster; the view also showing the step positioned in the lower end of the back wall between the sidewalls that is configured to engage the lower end of the core and prevent the core from sliding out the lower end of the opening.
Figure 14:
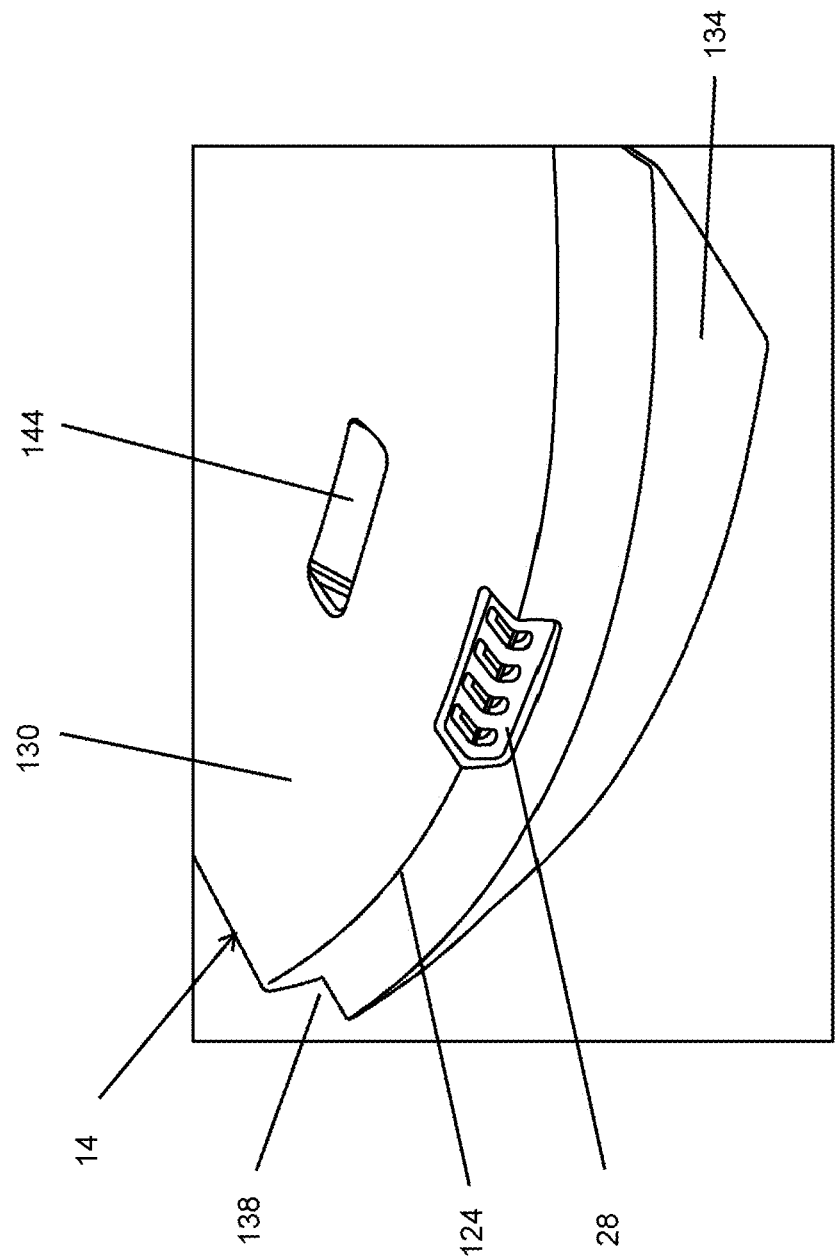
FIG. 14 is a partial perspective view of the back side of the lower end of the core, the view showing the detent mechanism in the back wall that is configured to engage the detent mechanism in the holster and hold the core within the opening of the holster; the view also showing the step positioned in the lower end of the back wall between the sidewalls that is configured to engage the lower end of the opening of the holster and prevent the core from sliding out the lower end of the opening; the view also showing the port with a plurality of connection pins positioned in the lower end of the back wall at the step, the port configured to provide charging capabilities as well as data transfer capabilities when plugged into the charging base or other components of the system.
Figure 15:
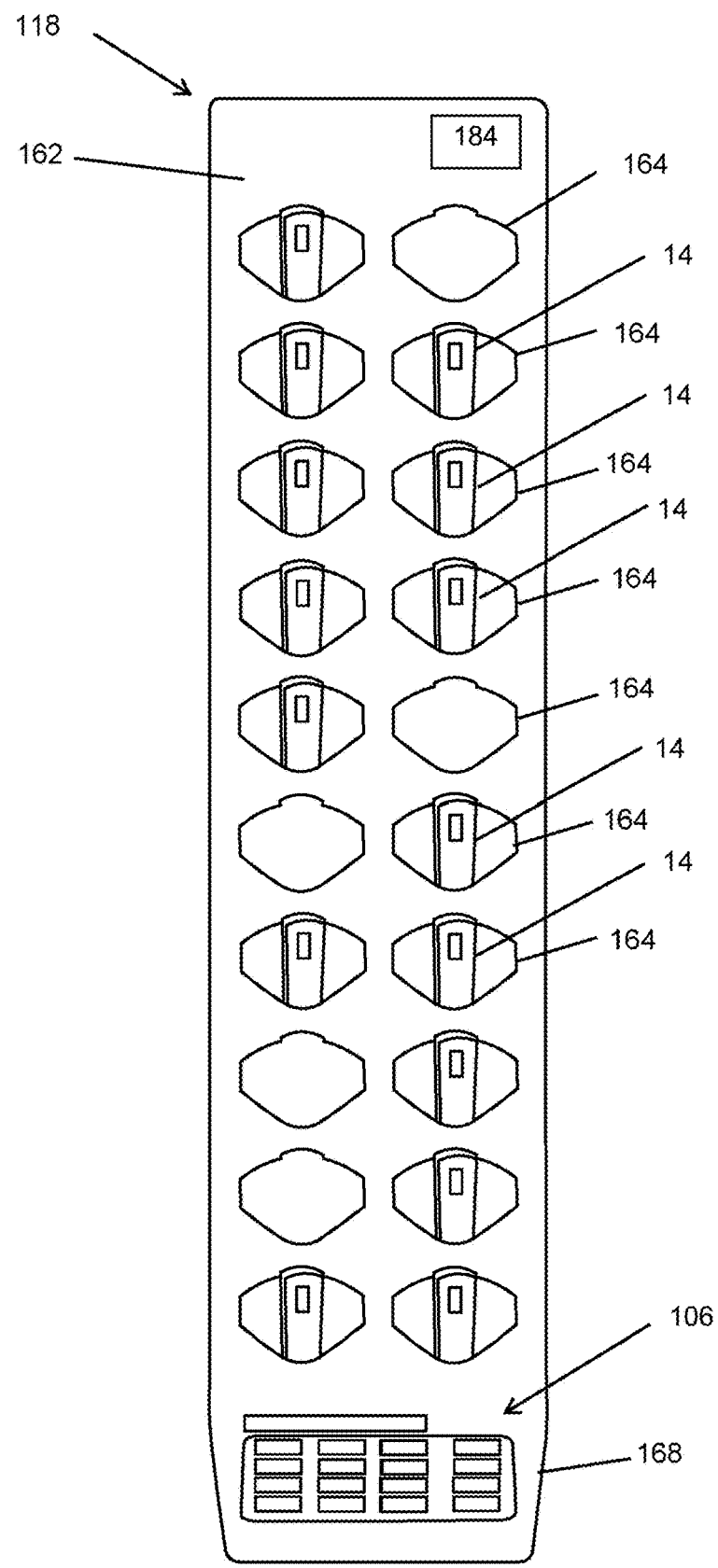
FIG. 15 is an elevation view of a charging base of the system; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker; the view showing a plurality of sockets occupied by cores and a plurality of sockets unoccupied by cores.
Figure 16:
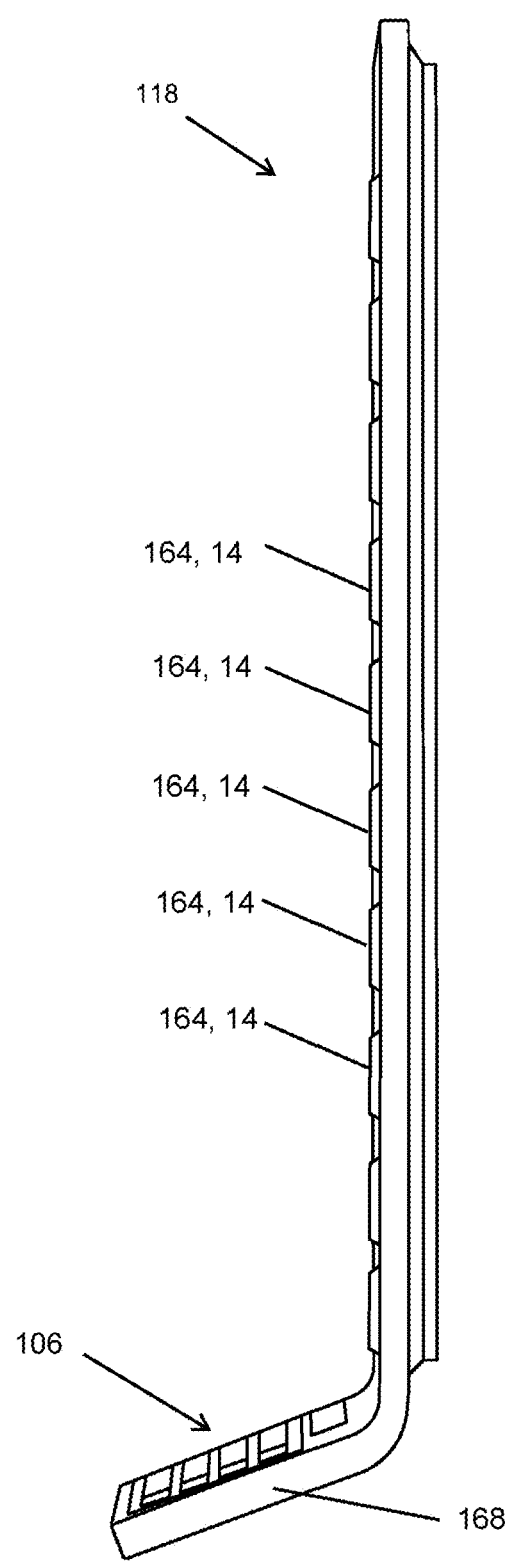
FIG. 16 is an elevation view of a charging base shown in FIG. 15; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker.
Figure 17:
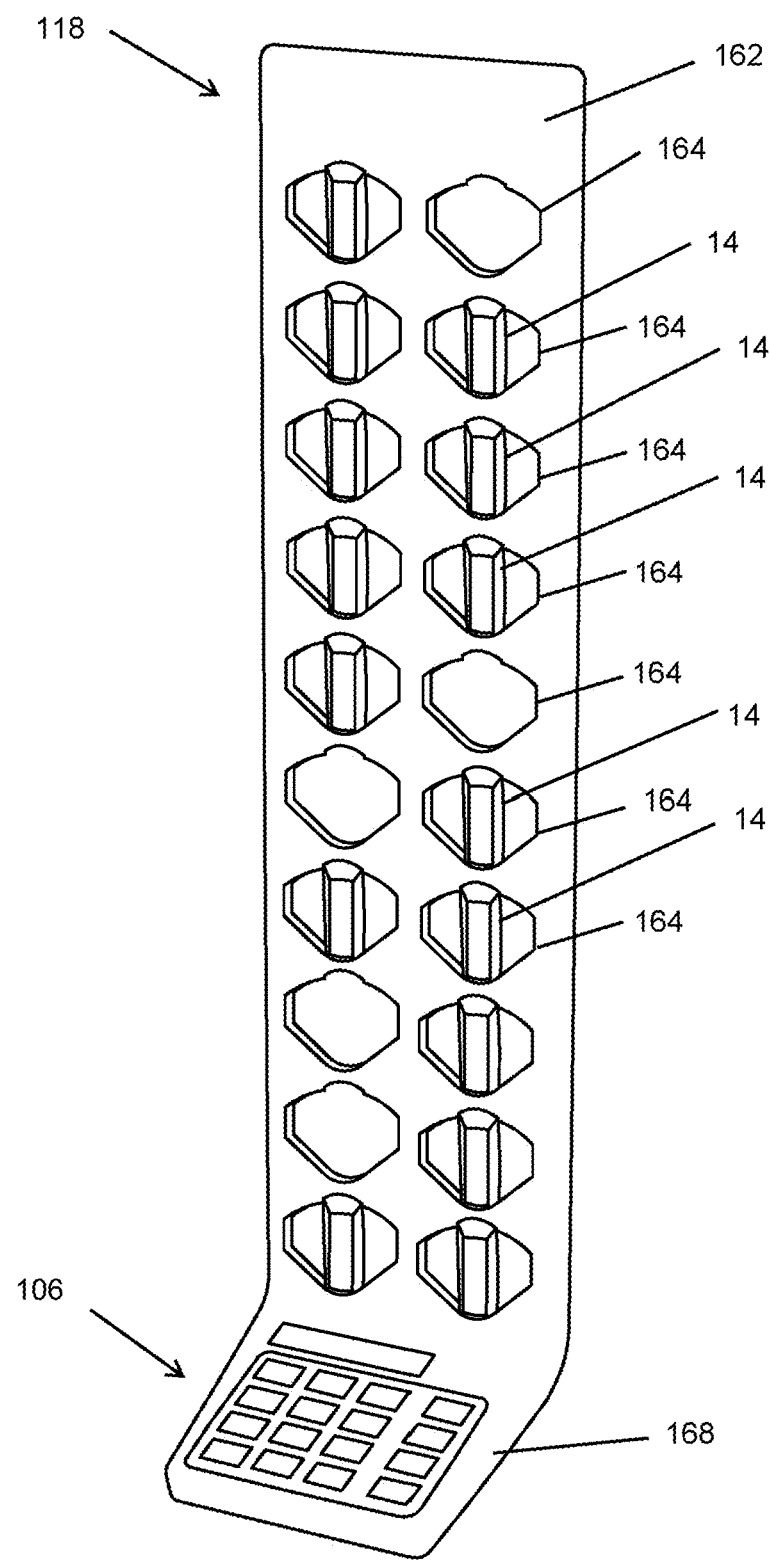
FIG. 17 is a perspective view of a charging base shown in FIGS. 15 and 16; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker; the view showing a plurality of sockets occupied by cores and a plurality of sockets unoccupied by cores.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

Any advantages and/or improvements discussed herein may not be provided by various disclosed embodiments, and/or implementations thereof. The contemplated embodiments are not so limited and should not be interpreted as being restricted to embodiments which provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments which address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure.

It is to be understood that the terms such as "left, right, top, bottom, front, backrest, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B,"

unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of such articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected and/or engaged, respectively, in any manner that facilitates operation, which may include being directly connected, indirectly connected, electronically connected, wirelessly connected and/or connected by any other manner, method and/or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments and/or methods.

Similarly, the structures and operations discussed herein may occur out of the order described and/or noted in the figures. For example, two operations and/or figures shown in succession may in fact be executed concurrently and/or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of production lines. However, the embodiments are not so limited. It is appreciated that the embodiments may be adapted for use with other production equipment and/or in other applications which may be improved by the disclosed structures, arrangements and/or methods. The system is merely shown and described as being used in in the context of production lines for ease of description and as one of countless examples.

System 10:

With reference to the figures, a system for monitoring worker status and working conditions 10 is presented (system 10). In one or more arrangements, system 10 includes a plurality of wearable devices 12 and a monitoring system 60 among other components.

Wearable Devices 12:

Wearable devices 12 are formed of any suitable size, shape, and design and are configured to record information indicative of tasks performed by workers and/or information indicative of safety risks encountered by workers during a work shift, such as environmental conditions as well as near misses. In one or more arrangements, recorded information may include, for example, location of worker during work shift, proximity to high risk machinery, air quality, sound levels, data indicative of physicality of tasks performed by workers such as heart rate, temperature, perspiration level, number of steps, distance traveled, accelerometer data, and/or other data acquired by sensors 30 of wearable devices 12.

In one or more arrangements, as is shown, wearable device 12 includes a core 14. Core 14 is formed of any suitable size, shape, and design and is configured to house, hold, and shelter the components of wearable device 12.

In one or more arrangements, wearable device 12 is configured to be worn by a worker 102 and in this way, wearable device 12 is considered to be a wearable device. To facilitate being worn by a worker 102 while working, an attachment member 16 is connected to or formed into wearable device 12 and/or core 14 of wearable device 12. In one or more arrangements, as is shown, attachment member 16 is a band, strap, belt, elastic strap or the like, that is attachable to a worker's arm wrist, waist or other part of the body or clothing worn by the worker 102. In one or more arrangements, it is desirable to attach the wearable device 12 to the worker's non-dominant arm while working. Alternatively, attachment member 16 is formed of any other device that connects two components together such as a snap-fit member, a clip, hook-and-loop arrangement, a button, a snap, a zipper-mechanism, a zip-tie member, or the like, just to name a few. As another arrangement, wearable device 12 can be attached to or formed as part of a piece of clothing or equipment, such as a safety vest, a helmet or the like. In one or more arrangements, as is further described herein, core 14 of wearable device 12 is held within a holster 120 in a removable manner and attachment member 16 is connected to holster 120, as is further described herein.

In one or more arrangements, as is shown, wearable device 12 includes a plurality of electronic components that are configured to act in concert with one another and carry out the purpose and function of wearable device 12, which is to detect record and report information about the workplace conditions surrounding a worker 102 while working. In one or more arrangements, wearable device 12 includes one or more microprocessors 18 and memory 20. Microprocessor 18 is any electronic device which receives inputs, such as signals or information, and processes it in accordance with instructions stored in memory 20. Memory 20 is any device which stores information and allows for retrieval of this information upon command. In one or more arrangements, microprocessor 18 may have its own onboard memory 20 and microprocessor 18 and memory 20 may be a single unitary and combined component. In another arrangement, memory 20 may be one or more standalone units that are electrically connected to microprocessor 18. In yet another arrangement, microprocessor 18 may have its own onboard memory 20 as well as being connected to memory 20 that is a standalone unit, or any combination thereof. As such, it is hereby contemplated that wearable device 12 may include multiple microprocessors 18 (which may or may not have their own onboard memory 20) and/or multiple devices which serve as memory 20.

In one or more arrangements, wearable device 12 includes a pair of microprocessors 18, with one microprocessor 18 primarily devoted to controlling the operation of recording the sound surrounding the worker 102, and the other microprocessor 18 devoted to controlling the other operations of the wearable device 12.

In one or more arrangements, as is shown, wearable device 12 includes an antenna 22 which is operatively connected to a receiver, transmitter, and/or a transceiver (hereinafter referred to as transceiver 24). Antenna 22 is any device which receives and/or transmits wireless signals. A receiver is any device that receives wireless signals from antenna 22, processes these signals and transmits them to microprocessor 18 or other electronic components. In this way, a receiver receives information from antenna 22. A transmitter is any device that receives signals from microprocessor 18, or other electronic components, processes these signals and transmits them through antenna 22 for over the air broadcasting. In this way, a transmitter transmits information through antenna 22. A transceiver is any device which is capable of operating as both a receiver and a transmitter. It is hereby contemplated that wearable device 12 includes a receiver, or a transmitter or both a receiver and transmitter, which may be a single combined electronic device, separate devices, or a plurality of devices. Reference shall be made herein to "transceiver 24" for purposes of simplicity; however, reference to the term "transceiver" shall be understood to include a receiver alone, a transmitter alone, a receiver and a transmitter, a transceiver, or any combination thereof. Transceiver 24 may be configured to communicate using any protocol such as 802.11/Wi-Fi, Wi-Max, Bluetooth, Bluetooth Low Energy, UltraWideband (UWB), ZigBee, Zwave, GSM/EDGE, UMTS/HSPA+/HSDPA, CDMA, LTE, and/or FM/VHF/UHF networks or any other communication medium and/or protocol. The use of a transceiver that facilitates two-way communication facilities the transmission of over-the-air updates to cores 14 from a central processor or command center which ensures that the software and/or firmware of the core 14 is always up to date.

In the arrangement shown, as one example, wearable device 12 includes a power source 26 which is operatively connected to the electronic components of wearable device 12 such that power source 26 provides power to these electronic components. Power source 26 is formed of any suitable size, shape, and design. In one or more arrangements, power source 26 is formed of one or more replaceable/disposable batteries. In another arrangement, power source 26 is formed of one or more rechargeable batteries.

In one or more arrangements, as is shown, wearable device 12 includes a port 28, which is operatively connected to the electronic components of wearable device 12. Port 28 is formed of any suitable size, shape, and design and is configured to allow for the reception and transmission of information as well as charging of on board power source 26.

In one or more arrangements, as is shown, wearable device 12 includes a plurality of sensors 30. Sensors 30 are formed of any suitable size, shape, and design and are configured to sense environmental conditions surrounding the worker 102 while working. In one or more arrangements, wearable device 12 includes a plurality of sensors 30.

In one or more arrangements, wearable device 12 includes a sound sensor 30A. Sound sensor 30A is formed of any suitable size, shape, and design and is configured to detect the volume level and/or frequency of sound surrounding the worker 102. In one or more arrangements, sound sensor 30A is a microphone that is accessible through one or more openings 114 in core 14 that provide unfettered access for the sound to reach the microphone. Sound sensor 30A allows for the detection of elevated sounds, abrupt spikes in sounds, loud noises, irritating or distracting frequencies or the like. Sound sensor 30A also allows for the detection of when a volume threshold is approached or exceeded.

In one or more arrangements, wearable device 12 includes a temperature sensor 30B. Temperature sensor 30B is formed of any suitable size, shape, and design and is configured to detect the temperature of the environment surrounding the worker 102. The same and/or an additional temperature sensor 30B may be configured to detect the temperature of the worker 102 themselves. In one or more arrangements, temperature sensor 30B is a thermometer. Temperature sensor 30B allows for the detection of high or low temperatures as well as abrupt changes in temperature. Temperature sensor 30B also allows for the detection of when a temperature threshold is approached or exceeded. In one or more arrangements, wearable device 12 includes a humidity sensor 30C. Humidity sensor 30C is formed of any suitable size, shape, and design and is configured to detect the humidity of the environment surrounding the worker 102. The same and/or an additional humidity sensor 30C may be configured to detect the humidity level, moisture level or perspiration level of the worker 102 themselves. Humidity sensor 30C allows for the detection of high or low levels of humidity as well as abrupt changes in humidity. Humidity sensor 30C also allows for the detection of when a humidity threshold is approached or exceeded. In one or more arrangements, wearable device 12 includes a light sensor 30D. Light sensor 30D is formed of any suitable size, shape, and design and is configured to detect the light levels of the environment surrounding the worker 102. Light sensor 30D allows for the detection of high or low levels of light as well as abrupt changes in light levels. Light sensor 30D also allows for the detection of when a light threshold is approached or exceeded. In one or more arrangements, light sensor is operably connected to and/or accessible by a light pipe 116. Light pipe 116 is any device that facilitates the collection and transmission of light from the environment surrounding the worker 102. In one or more arrangements, light pipe 116 is a clear, transparent, or translucent material that extends from the exterior of the core 14 to the light sensor 30D and therefore covers and protects light sensor 30D while enabling the sensing of light conditions.

In one or more arrangements, wearable device 12 includes an air quality sensor 30E. Air quality sensor 30E is formed of any suitable size, shape, and design and is configured to detect the air quality of the environment surrounding the worker 102, the particulate matter in the air of the environment surrounding the worker 102, the contaminant levels in the air of the environment surrounding the worker 102, or any particular contaminant level in the air surrounding the worker 102 (such as ammonia, chlorine, or any other chemical, compound or contaminant). Air quality sensor 30E allows for the detection of high contaminant levels in the air as well as abrupt changes in air quality. Air quality sensor 30E also allows for the detection of when an air quality threshold is approached or exceeded.

In one or more arrangements, air quality sensor 30E is a total volatile organic compound sensor, also known as a TVOC sensor. Volatile organic compounds (or VOCs) are organic chemicals that have a high vapor pressure at ordinary room temperature. VOCs are numerous, varied, and ubiquitous. They include both human-made and naturally occurring chemical compounds. Most scents or odors are of VOCs. In this arrangement, air quality sensor 30 is configured to detect VOCs. Also, In one or more arrangements, air quality sensor 30E is accessible through one or more openings 114 in core 14 that provide unfettered access and airflow for sensing by air quality sensor 30E.

In one or more arrangements, wearable device 12 includes a carbon monoxide (CO) sensor 30F. CO sensor 30F is formed of any suitable size, shape, and design and is configured to detect CO levels of the environment surrounding the worker 102. CO sensor 30F allows for the detection of high CO levels in the air as well as abrupt changes in CO levels. CO sensor 30F also allows for the detection of when a CO threshold is approached or exceeded. Of course, sensor 30F, or additional sensors 30, may be used to sense other gasses in the air around the worker 102, such as carbon dioxide, ozone, or any other gas or other content of the air around the worker 102. Also, In one or more arrangements, sensor 30F is accessible through one or more openings 114 in core 14 that provide unfettered access and airflow for sensing by sensor 30F.

In one or more arrangements, wearable device 12 includes a position sensor 30G. Position sensor 30G is formed of any suitable size, shape, and design and is configured to detect the position of the worker 102 within the manufacturing facility. Notably, the term manufacturing facility is to be construed in a broad manner and may include being within one or a plurality of buildings. However, the manufacturing facility may include being outside and unconstrained by the boundaries of a building or any particular grounds. Position sensor 30G allows for the detection of movement of the worker 102 within the manufacturing facility, the speed of movement of the worker 102 within the manufacturing facility, the tracking of the position of the worker 102 within the manufacturing facility, among any other speed, location, direction, inertia, acceleration, or position information. This position information can be aggregated over the course of the worker's shift to determine the amount of distance traveled by the worker 102, the average speed, the mean speed, the highest speed, or any other information. In addition, this position information can be aggregated to determine the areas where the worker 102 concentrated their time. In addition, this position information can be correlated with the information detected by the other sensors to determine the concentration of certain environmental factors in different areas of the manufacturing facility. Position sensor 30 may be a GPS device, a Wi-Fi device that utilizes triangulation from known points, a Wi-Fi device that utilizes trilateration from known points, or any other device that detects the position of wearable device 12 and the worker 102.

In one or more arrangements, wearable device 12 includes an accelerometer 32. Accelerometer 32 is formed of any suitable size, shape, and design and is configured to detect acceleration and/or movement of the wearable device 12, such as when a worker 102 trips on something on the floor and almost falls, or when a worker 102 falls off of a ladder, is hit by a fork truck, or has another traumatic event. Accelerometer 32 may be formed of any acceleration detecting device such as a one axis accelerometer, a two axis accelerometer, a three axis accelerometer or the like. Accelerometer 32 also allows for the detection changes in acceleration, detection of changes in direction as well as elevated levels of acceleration.

In an alternative arrangement, or in addition to an accelerometer 32, a gyroscope or gyro-sensor may be used to provide acceleration and/or movement information. Any form of a gyro is hereby contemplated for use, however In one or more arrangements a three-axis MEMS-based gyroscope, such as that used in many portable electronic devices such as tablets, smartphones, and smartwatches are contemplated for use. These devices provide 3-axis acceleration sensing ability for X, Y, and Z movement, and gyroscopes for measuring the extent and rate of rotation in space (roll, pitch, and yaw).

In another arrangement, and/or in addition to an accelerometer 32, a magnetometer may be used to provide acceleration and/or movement information. Any form of a magnetometer that senses information based on magnetic fields is hereby contemplated for use. In one or more arrangements, a magnetometer is used to provide absolute angular measurements relative to the Earth's magnetic field. In one or more arrangements, an accelerometer, gyro and/or magnetometer are incorporated into a single component or a group of components that work in corresponding relation to one another to provide up to nine axes of sensing in a single integrated circuit providing inexpensive and widely available motion sensing.

Wearable device 12 may also include any other sensors 30. For example, in one or more arrangements, wearable device 12 includes one or more sensor 30 that tracks biometric data of the worker including but not limited to, for example, heart rate, blood pressure, blood oxygen levels, blood alcohol levels, blood glucose sensor, respiratory rate, galvanic skin response, bioelectrical impedance, brain waves, and/or combinations thereof.

During operation, sensors 30 detect environmental conditions, such as sound, temperature, humidity, light, air quality, CO levels, TVOC levels, particulate levels, position and acceleration information, direction information, speed information and the like respectively. This information is periodically and/or continuously transmitted to microprocessor 18 and/or stored in memory 20. This information is also periodically and/or continuously transmitted through transceiver 24 and antenna 22 and is communicated to and stored in a database 68, where it is aggregated and analyzed to detect patterns as is described further herein.

Wearable device 12 includes an event trigger 36. Event trigger 36 is formed of any suitable size, shape, and design and is configured to allow a worker 102 to indicate that a notable event just occurred, such as an accident that almost occurred (also known as a near miss), such as when the worker 102 trips and almost falls, when the worker 102 is almost struck by a forklift, when products almost fall on the worker 102, when the worker 102 is almost injured by a tool, or the like near misses.

Also, workers 102 are encouraged to use event trigger 36 when a notable event occurs. This may be any information that the worker 102 believes would be helpful for the safety manager 112 to know about or others in the management of the manufacturing facility. This may include a suggestion as to how to improve the manufacturing facility, problems associated with the layout of the manufacturing facility, the worker 102 noticing that equipment is wearing and likely to fail in the near future, that ear plugs, safety glasses or other protective equipment is failing, that a door fails to lock, that another worker 102 is behaving strangely or taking unnecessary risks, or practically any other information. It has been tested that providing the worker 102 with the instantaneous ability to record suggestions or information at the moment the information dawns on the worker 102, reduces the barriers to providing this information and as such, this information is more-readily provided as it is very easy to provide. In addition, because the information is provided contemporaneous with the worker 102 experiencing the notable event, it has been found that the information is provided in a thorough, unbiased, honest, and straight forward manner. Or said, another way, when a worker 102 waits to report improvements or issues at the end of the shift, the worker 102 is likely to be uninclined to go through the reporting process, they are likely to forget salient details, or their memory of events could fade. In contrast, by providing an easy and contemporaneous recordation of the notable event at or just after the time the event occurs, the information provided tends to be pure and uncorrupted. Due to the ease of simply pressing the event trigger 36 the worker 102 is likely to report the information. More accurate reporting and more frequent reporting allows a safety manager 112 or management in general to be more aware of the issues in the manufacturing facility and able to continuously improve the manufacturing facility. In addition, the timeliness of this information cannot be matched as it is transmitted to the safety manager 112 and/or database 68 as soon as it is recorded and as soon as the wearable device 12 establishes connectivity with database 68 and/or charging base 118 or another wireless communication intermediary, such as a repeater.

In one or more arrangements, event trigger 36 is a button, switch or other device placed on or formed in wearable device 12 that allows the worker 102 to indicate that a notable event (such as a near miss) just occurred. At the time the event trigger 36 is activated, the wearable device 12 records and/or transmits and/or saves a higher level or high-density of environmental information such as sound, temperature, humidity, light, air quality, CO levels, position, and acceleration and the like and transmits this information to database 68. This high-density environmental information is stored along with an audible message provided by the worker 102 explaining why they engaged the event trigger 36. In one or more arrangements, the wearable device 12 continually tracks and stores a predetermined amount of high-density data, such as sixty-seconds two minutes, thirty seconds, or the like. This high-density data is tracked and stored in a rolling manner. That is, the high-density data is overwritten or converted to low-density data unless an event occurs that causes the wearable device 12 to save and transmit the high-density data.

As one example, when event trigger 36 is activated, the wearable device 12 stores this high-density information for transmission through port 28 when wearable device 12 is connected to charging base 118, or the wearable device 12 transmits this information wirelessly over the air through antenna 22 when wireless connectivity is established with charging base 118 and/or database 68. When event trigger 36 is not activated, wearable device 12 stores and/or transmits a lower level or low-density of information or overwrites a portion of the high-density information. That is, by way of example, high-density information may include storing and/or transmitting a sample from sensors 30 once every hundredth of a second or tenth of a second, whereas low-density information may include storing and transmitting a sample from sensors once every second or once every two seconds, or the like. In this way, a balance can be had between recording a high sensitivity of information at and just prior to the time an accident, near miss or notable event occurs, while recording enough information to develop patterns and predict potential accidents while not being overly encumbered by too much data when an accident, near miss or notable event situation has not occurred.

In one or more arrangements, when event trigger 36 is activated, the sound sensor 30A, or microphone, is activated for a predetermined time or period thereafter. This allows the worker 102 to voice record the events of the accident, near miss or notable event contemporaneously, or just after, the event occurs. This allows for an honest and relatively unbiased account of the event shortly after the near miss occurs. This voice recording can be converted into text and automatically inserted into an event report, or alternatively the voice recording itself may be inserted directly into an event report. In one or more arrangements, the audio recording through sound sensor 30A occurs for a predetermined amount of time such as for thirty seconds or a minute after the event trigger 36 is pressed. In another arrangement, the audio recording through sound sensor 30A occurs for so long as the wearable device 12 detects that the worker 102 is talking. In another arrangement, the audio recording through sound sensor 30A occurs for so long as the worker 102 depresses or engages the event trigger 36. In another arrangement, sound sensor 30 records the audio for a length of time or period determined by any other manner, method or means.

In one or more arrangements, to eliminate or reduce unintentional engagement of the event recording function of wearable device 12, wearable device 12 is configured to require a special engagement or unlock procedure to start the event recording function. In one or more arrangements, a double engagement or double press of event trigger 36 is required to engage the event recording function. In another arrangement, an elongated press of event trigger 36 is required to engage the event recording function.

In yet another arrangement, an accident or near miss or other safety matter can be distinguished from a notable event (such as a suggestion for improvement of a process or the factory layout by a worker 102) by the manner in which the event trigger 36 engaged. As one example, a safety issue is reported by pressing the event trigger 36 twice and a notable event that is not related to immediate safety concerns is reported by pressing the event trigger 36 three times. Alternatively, two different triggers 36, such as two buttons, can be provided one dedicated for safety issues the other dedicated for non-safety issues. Or any other manner of reporting safety issues and non-safety issues may be used. By separating the reporting of safety issues from non-safety issues, this allows reports of safety issues, accidents and near misses to be expedited through the system 10, such as immediately emailing or texting them to a safety manager 112 or other manager so that they can respond quickly to safety issues while allowing non-safety issues to be handled as a lower priority. In one or more arrangements, the report of safety issues is instantaneously reported over the air to charging base 118 and/or database 68 and is thereafter contemporaneously, immediately, and/or quickly sent to a safety manager's phone, email, text message or the like for their immediate attention. In contrast, non-safety related matters are stored on wearable device 12 and downloaded once core 14 is installed in charging base 118. In this way, the system 10 includes an expedited path for the report of notable events that are safety issues and the system 10 includes a non-expedited path for the report of notable events that are not safety issues.

In one or more arrangements, wearable device 12 includes one or more audible indicators 38. Audible indicator 38 is formed of any suitable size, shape, and design and is configured to provide an audible indication to the worker 102 when a hazard condition may be present or when a safety threshold is approached or exceeded or when any other event or issue occurs that the worker 102 should be informed of. In one or more arrangements, audible indicator 38 is a speaker, or any other device that is configured to produce or repeat a sound, such as a tone, an alarm, audible instructions, or any other sound.

As an example, when the decibel level in the environment surrounding the worker 102 reaches 90% of the safety threshold sound, as is sensed by sound sensor 30A, the microprocessor 18 detects that a safety threshold is approached and issues an alarm or a prerecorded spoken voice instruction or any other audible indication through audible indicator 38, which informs the worker 102 to retreat from the potentially unsafe condition. Audible indicator 38 may also be used to provide any instructions to the worker 102, such as telling them through a voice command to join a mandatory meeting in the lobby, informing them of a fire alarm or contaminant alarm, providing them with their schedule for the day, providing them with the goals for the day, providing them with instructions for the day, or providing information on any other condition or instruction.

In one or more arrangements, wearable device 12 includes one or more visual indicators 40. Visual indicator 40 is formed of any suitable size, shape, and design and is configured to provide a visual indication to the worker 102 when a hazard condition may be present or when a safety threshold is approached or exceeded or when any other event or issue occurs that the worker 102 should be informed of. In one or more arrangements, visual indicator 40 is one or more lights, LEDs or any other illuminating device placed in core 14 which illuminates. In one or more arrangements, visual indicator 40 is formed of a red, a green and a blue LED which illuminate in various ways to provide various information. However, any other number of lights or LEDs are hereby contemplated for use as is any other color of lights or LEDs.

As an example, when the air quality in the environment surrounding the worker 102 reaches a first safety threshold as is detected by the microprocessor 18 though air quality sensor 30E (e.g. exceeds 80% of a safety threshold) a first light of the visual indicator 40 is illuminated, such as the blue LED; when the air quality in the environment surrounding the worker 102 reaches a second safety threshold as is detected by the microprocessor 18 though air quality sensor 30E (e.g. exceeds 90% of a safety threshold) a second light of the visual indicator 40 is illuminated, such as the green LED, or both the green and the blue LED are illuminated; when the air quality in the environment surrounding the worker 102 reaches a third safety threshold as is detected by the microprocessor 18 though air quality sensor 30E (e.g., reaches or exceeds 100% of a safety threshold) a third light of the visual indicator 40 is illuminated, such as the red LED, or the green, blue and red LEDs are illuminated. Illumination of visual indicators 40 informs the worker 102 to retreat from the potentially unsafe condition or location.

In another arrangement, various visual indicators 40 may be used to provide information regarding the state of operation of wearable device 12. As an example, one light of the visual indicators 40 of the wearable device 12 may be illuminated when the wearable device 12 is powered and operational, such as illumination of a blue LED. As another example, one light of the visual indicators 40 of the wearable device 12 may be illuminated when the power source 26 of wearable device 12 reaches a power or charge threshold as is sensed by microprocessor 18, such as falling below a 10% charge level and as such illumination of this visual indicator 40 informs the worker 102 that it is time to charge the wearable device 12. As another example, one light of the visual indicators 40 of the wearable device 12 may be illuminated when the wearable device 12 is wirelessly connected to the internet, a hub, or other communication device.

In one or more arrangements, wearable device 12 includes one or more physical indicators 42. Physical indicator 42 is formed of any suitable size, shape, and design and is configured to provide a physical indication to the worker 102 when a hazard condition may be present or when a safety threshold is approached or exceeded or when any other event or issue occurs that the worker 102 should be informed of. In one or more arrangements, physical indicator 42 is a vibration device placed in core 14 which vibrates upon command. As an example, when the air quality in the environment surrounding the worker 102 reaches a first safety threshold as is detected by the microprocessor 18 though air quality sensor 30E (e.g. exceeds 90% of a safety threshold) physical indicator 42 activates. Upon sensing this vibration or physical indication from physical indicator 42, the worker 102 retreats from the potentially unsafe condition.

Any other form of indicator is hereby contemplated for use with wearable device 12 and is used to provide information to the worker 102. As an example, In one or more arrangements, core 14 may connect to a worker's headphones or other listening device (such as an earbud) through port 28, or wirelessly through wireless pairing, and when information becomes available, such as an announcement or reaching or exceeding a safety threshold, the wearable device 12 transmits an audible signal to the worker's headphones or listening device. In this way, by connecting, either through a wired connection or wirelessly to the worker's headphones or other listening device the wearable device 12 provides audible information directly to the worker 102 thereby eliminating or reducing the possibility that the worker 102 does not hear the information due to the noisy environment.

Wearable device 12 includes an ID 44. ID 44 is any form of a unique identifier that identifies any one particular wearable device 12 from other wearable devices 12 used within a manufacturing facility. In one or more arrangements, ID 44 is a code that can be scanned, such as a bar code, QR code or other code. In another arrangement, ID 44 is a unique identifier that is contained within a near field communication (NFC) chip or other communication device. In another arrangement, ID 44 is a serial number. Any other form of identification is hereby contemplated for use as ID 44.

Wearable Devices In Operation:

As one example, system 10 is used in a manufacturing facility 100 having a plurality of workers 102 and an electronic network 104. System 10 includes a user interface 106 connected to the electronic network 104 and database 68, which is operated and controlled by management software 108. A plurality of wearable devices 12, one for each worker 102 are used to record information to facilitate monitoring and/or assessment of workers 102 during a work shift.

At the beginning of a shift, workers 102 are assigned a wearable device 12. The unique ID 44 of the wearable device 12 is associated with the particular worker 102 by entering the ID 44 into database 68 by any means such as scanning, NFC, typing, biometric scanning, random allocation, or the like. In this assignment, the particular worker 102 is assigned to the particular core 14 and specific rules or guidelines are associated with the core 14 for use with that particular worker 102. As an example, safety thresholds for a worker 102 that works with loud pressing machines and wears external ear muffs may be much higher than a worker 102 that works in shipping and receiving and does not use any hearing protection. In this way, by assigning particular rules for each worker 102 based on that worker's job and tasks, allows the system 10 to provide more accurate information and determine more accurately when safety issues arise for that particular worker 102 because what may be acceptable for one worker's role may not be acceptable for another worker's role.

Once the core 14 is assigned to the worker 102, the worker 102 attaches wearable device 12 to themselves, such as placing an elastic strap of attachment member 16 around the worker's non-dominant arm and tightening it by a buckle, Velcro, buttons or any other manner or method. Alternatively, wearable device 12 is attached to their helmet, belt, pocket, collar, shirt, or to any other portion of their body or clothing or equipment by any manner or means.

Once attached, the wearable device 12 is activated. Upon activation, wearable device 12 establishes a wireless connection to database 68 through electronic network 104 and begins sending and receiving pertinent information. Also once activated, wearable device 12 begins sensing environmental conditions surrounding the worker 102 through sensors 30.

As an example, where wearable device 12 includes a sound sensor 30A, a temperature sensor 30B, a humidity sensor 30C, a light sensor 30D, an air quality sensor 30E, a CO sensor 30F, a position sensor 30G and an accelerometer 32, the wearable device 12 periodically senses sound, temperature, humidity, light, air quality, CO levels, position, and acceleration.

These environmental conditions are sensed and at least temporarily recorded or buffered in high-density (such as one sample every tenth of a second or every hundredth of a second, or the like, or in the example of sound, the sound in the environment is continuously recorded for a predetermined amount of time or period) to onboard memory 20 and/or transmitted through transceiver 24 and antenna 22 through electronic network 104 to database 68.

If an accident or a near miss occurs or a notable event occurs, this high-density of information is retained and stored on database 68 for later analysis. Buffering or retaining a high-density of information allows for an in-depth analysis of the conditions around the time of an accident or near miss. This high-density of information is retained around the time of an accident or near miss as it may shed additional light on the events surrounding the accident or near miss that may not be discernable if only low-density information is retained.

If on the other hand, an accident or near miss is not recorded, this high-density of information is overwritten, or not retained, and instead a low-density of information (such as one sample every half second or every second) is recorded, stored, and/or transmitted. Recording and/or transmitting a low-density of information continuously throughout the worker's shift allows for analysis and recordation of environmental information at an appropriate level of detail, while not being overly cumbersome and cumulative and overburdening the system 10 with too much unnecessary information at too high a level of detail.

In one or more arrangements, wearable device 12 periodically transmits environmental information to database 68 through a wireless connection over electronic network 104 (such as when wearable device 12 acquires a Wi-Fi connection). In an alternative arrangement, wearable device 12 stores environmental information sensed by sensors 30 on onboard memory 20 throughout the worker's shift. Then, at the end of the shift, when wearable device 12 is physically plugged into electronic network 104 by port 28 the information stored on memory 20 is downloaded to database 68. Also, while plugged in by port 28, the power source 26 is recharged.

In one or more arrangements, to ensure the purity of data collected, core 14 includes a proximity sensor or cover-sensor as one of the sensors 30. Proximity sensor is configured to determine when the core 14 is covered, such as when a worker puts a welding jacket on over the core 14, and when it is covered the core 14 takes corrective action, such as shutting down particular sensors, going into a sleep mode and/or filtering out what environmental data (such as light levels, sound levels or air quality as these would be affected by being covered) should not be recorded or reported due to be being covered.

Tripping Example:

As an example, during the worker's shift, wearable device 12 continuously senses the environmental conditions around the worker 102 using sensors 30, including the position of the worker 102 within the manufacturing facility, as well as recording the sound around the worker 102. The wearable device 12 temporarily stores this information in high-density on the memory 20 of the wearable device 12. Unless a notable event, near miss or accident occurs, this high-density of information is overwritten and only a low-density of information is retained on memory 20. This recordation of high-density information and then overwriting the information while only retaining a low-density of information is repeated until, during the worker's shift the worker 102 trips on a pallet that was improperly placed in a high traffic area. Upon tripping on this pallet, the accelerometer 32 senses the unusual acceleration and microprocessor 18 identifies this spike in acceleration as a potential accident or near miss (e.g. the system 10 is configured to apply machine learning and artificial intelligence to determine what are known as "signatures" that indicate a near miss or accident occurred, over time and with the application of more examples and more data, the system 10 becomes smarter and better able to distinguish when an accident or near miss occurs and separates these events from non-events). Microprocessor 18 interprets the information supplied to it through sensors 30 by the instructions stored in memory 20 and is programmed to identify the large spike in acceleration or "tripping signature" as a potential accident or near miss. Upon identifying this tripping incident as a possible accident or near miss, the microprocessor 18 retains the high-density of information for a predetermined amount of time both before and after the accident or near miss (such as 60 seconds before and 60 seconds after or the like).

In one or more arrangements, in response to sensing this accident or near miss, microprocessor 18 prompts worker 102 to provide a recitation or description of the accident or near miss through an audible indication using audible indicator 38, visual indication using visual indicator 40, a physical indication using physical indicator 42 or any combination of these indicators 38, 40, 42. In one or more arrangements, the audible indication is an audible tone, such as a beep or series of beeps, or audible instructions such as "A potential accident was detected, please describe what happened." In response, the worker 102 is trained to describe what occurred, which gives the worker 102 an opportunity to contemporaneously describe the events. This eliminates the potential that the worker 102 forgets what happened or confuses what happened in this event with another event.

In an alternative arrangement, the worker 102 is trained to press or engage the event trigger 36 when they experience a near miss or accident. Once the worker 102 presses or engage the event trigger 36 the worker is also trained to speak into the wearable device 12 and describe the events that just occurred, or alternatively once the event trigger 36 is pressed or engaged the wearable device 12 prompts the worker 102 to provide a description of the events that just occurred.

In one or more arrangements, upon sensing this accident or near miss, wearable device 12 transmits a signal through a wireless connection to electronic network 104 that an accident or near miss just occurred. This signal indicates who the worker 102 is that experienced the accident or near miss through association of the unique ID 44 of wearable device 12 to that worker 102, the position of the accident or near miss as is detected by position sensor 30G, as well as the nature of the accident or near miss, which in this example is a potential trip or fall, as is sensed by accelerometer 32. Any other sensed information may also be provided wearable device 12. In one or more arrangements, the audible recording of the worker's description of the accident or near miss is also transmitted, or this audible recitation is automatically converted to text, which is transmitted in text form as part of this signal.

As this event is considered an accident or near miss, it receives expedited attention. Wearable device 12 transmits some or all of the information related to the incident over the air to monitoring system 60 via charging base 118, electronic network 104 or any other communication path or communication device or system that is used in association with the system 10.

Management Software 108:

In one or more arrangements, information provided by wearable devices 12 is processed by management software 108. Management software 108 converts the information into an incident report and a signal, such as a text message, email, or the like is transmitted to an electronic device 110 (such as a cell phone, a handheld device, their own wearable device 12, an email account, or any other electronic device capable of receiving an electronic message or information) of one or more safety managers 112 or other managers or other persons in charge of managing safety in the manufacturing facility 100. This signal includes the position/location of the event, time of the event, name of the worker 102 involved and type of potential accident or near miss along with any other pertinent information. In one or more arrangements, the audible recording of the worker's description of the accident or near miss is also transmitted, or this audible recitation is automatically converted to text which is transmitted in text form as part of this signal. With this timely information, the safety manager 112 can quickly and effectively respond to the potential accident or near miss. This information is also stored as an incident report in database 68 for risk assessment, control of one or more production lines, data mining, data retrieval, data analytics, and/or machine learning and artificial intelligence purposes.

As this event is a safety event, transmission is expedited through the system 10 so that the safety manager 112, a response team or others can quickly respond in attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage.

Once the safety manager 112 arrives at the scene of the accident or near miss they will see that a pallet was placed in a high traffic area. In response, the safety manager 112 can move the pallet or cordon off the area to prevent future accidents and/or take further corrective actions.

Falling Items Example:

As an example, during the worker's shift, wearable device 12 continuously senses the environmental conditions around the worker 102 using sensors 30, including the position of the worker 102 within the manufacturing facility, as well as recording the sound around the worker 102. The wearable device 12 temporarily stores this information in high-density on the memory 20 of the wearable device 12. Unless a notable event, near miss or accident occurs, this high-density of information is overwritten and only a low-density of information is retained on memory 20. This recordation of high-density information and then overwriting the information while only retaining a low-density of information is repeated until, during the worker's shift the worker 102 experiences falling items. As an example, during the worker's shift, the worker 102 climbs up on a ladder to remove some items from a shelf. Upon doing so, a number of items fall and almost strike the worker 102 in the head because they were improperly stacked or stored.

In response to this near miss, the worker 102 presses the event trigger 36. In response to the event trigger 36 being activated, microprocessor 18 retains the high-density of information for a predetermined amount of time both before and after the accident or near miss (such as 60 seconds before and 60 seconds after, or the like).

In one or more arrangements, in response to the event trigger 36 being activated, microprocessor 18 prompts worker 102 to provide a recitation or description of the accident or near miss through an audible indication using audible indicator 38 or a visual indication using visual indicator 40 or a physical indicator using physical indicator 42. In one or more arrangements, the audible indication is an audible tone, such as a beep or series of beeps, or audible instructions such as "A potential accident was detected, please describe what happened." In response, the worker 102 is trained to describe what occurred, which gives the worker 102 an opportunity to contemporaneously describe the events. This eliminates the potential that the worker 102 forgets what happened or confuses what happened in this event with another event.

In one or more arrangements, when the event trigger 36 is activated, indicating that an accident or near miss occurred, wearable device 12 transmits a signal through a wireless connection to electronic network 104 that an accident or near miss occurred. This signal indicates who the worker 102 is that experienced the accident or near miss through association of the unique ID 44 of wearable device 12, and the position and time of the accident or near miss as is detected by position sensor 30G, as well as the nature of the accident or near miss, which in this example is an activation of the event trigger 36. In one or more arrangements, the audible recording of the worker's description of the accident or near miss is also transmitted, or this audible recitation is automatically converted to text which is transmitted in text form as part of this signal.

In one or more arrangements, management software 108 converts the information provided by wearable device 12 into an incident report and a signal, such as a text message, email, or the like is transmitted to an electronic device 110 (such as a cell phone, a handheld device, their own wearable device 12, an email account, or any other electronic device capable of receiving an electronic message or information) of one or more safety managers 112 or other managers or other persons in charge of managing safety in the manufacturing facility 100. This signal includes the position/location of the event, time of the event, name of the worker 102 involved and type of potential accident or near miss along with any other pertinent information. In one or more arrangements, the audible recording of the worker's description of the accident or near miss is also transmitted, or this audible recitation is automatically converted to text which is transmitted in text form as part of this signal. With this timely information, the safety manager 112 can quickly and effectively respond to the potential accident or near miss. This information is also stored as an incident report in database 68 for risk assessment, control of one or more production lines, data mining, data retrieval, data analytics, and/or machine learning and artificial intelligence purposes.

As this event is a safety event, transmission is expedited through the system 10 so that the safety manager 112, a response team or others can quickly respond in attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage.

Once the safety manager 112 arrives at the scene of the accident or near miss they will see that items were stored in the shelving in an unsafe and unstable manner. In response, the safety manager 112 removes the items or cordon off the area to prevent future accidents and/or the safety manager 112 takes further precautionary measures.

Threshold Example:

In one or more arrangements, microprocessor 18 is programmed to indicate whether particular thresholds are exceeded. As an example, when 90% of a volume threshold is exceeded, as is interpreted by microprocessor 18, a signal is transmitted to safety manager 112 informing the safety manager 112 of the potentially dangerous condition. Once received, the safety manager 112 can respond in an attempt to address the problem and reduce the volume in the affected area.

Similarly, when 90% of a volume threshold is exceeded, as is interpreted by microprocessor 18, a signal is transmitted to the worker 102 through audible indicator 38, visual indicator 40 and/or physical indicator 42 indicating to the worker 102 of a potential dangerous condition. This information may be used by the worker 102 to correct the problem or exit the potentially dangerous area.

Notable Event Example:

As one example, a worker 102 during their shift realizes that they have a suggestion to improve a manufacturing step, to improve a workstation or improve the flow of the manufacturing facility, or any other suggestion or improvement. Without system 10, the worker 102 would have to walk to the location of either a safety manager 112, facility manager or other manager(s) office and meet with that person to describe their suggestion. This requires the worker to remove themselves from their work, which reduces productivity and could be considered a punishable event. Alternatively, the worker 102 must take time to fill out a suggestion form or log into a computer and send an email to a safety manager 112 or facility manager. Due to the time and inconvenience involved with doing so, workers 102 rarely follow through with reporting their suggestions.

However, in the system 10 presented, when the worker 102 has an idea or suggestion, the worker 102 presses the event trigger 36. In one or more arrangements, to distinguish this notable event from a safety issue (such as an accident or near miss) the worker 102 presses a separate notable event button or they press the event trigger 36 twice or three times or whatever the configuration is to discern that this engagement of the event trigger 36 is for reporting a notable event or suggestion and not for reporting an immediate safety concern. In doing so, the wearable device 12 assigns the event a lower priority, that is not expedited, in the same manner as a safety event.

In one or more arrangements, in response to the event trigger 36 being activated, in the manner to identify that the worker 102 desires to record or submit a suggestion or identify a notable event, microprocessor 18 prompts worker 102 to provide a recitation or description of the notable event or suggestion through an audible indication using audible indicator 38 or a visual indication using visual indicator 40 or a physical indicator using physical indicator 42. In one or more arrangements, the audible indication is an audible tone, such as a beep or series of beeps, or audible instructions such as "A notable event was detected, please describe what happened." In response, the worker 102 is trained to describe what occurred or what their suggestions are, which gives the worker 102 an opportunity to contemporaneously describe the events or suggestions at or near the time they occurred. This eliminates the potential that the worker 102 forgets what happened or confuses what happened in this event with another event. This also essentially eliminates the barriers to providing their suggestions for improvement as the worker 102 does not have to leave their workstation, they don't have to fill out any paperwork or type out anything (which may be a substantial barrier for many workers 102). In contrast, the worker 102 can simply speak their suggestions while continuing to work. The wearable device 12 also stores the information related to the time and place of the notable event, such as location, time, and what the sensors 30 sensed for inclusion in a notable event report.

In one or more arrangements, when the event trigger 36 is activated in a manner indicating that a notable event has been encountered, the wearable device 12 assigns this event a lower priority than a safety issue such as a near miss or an accident. Wearable device 12 develops a notable event report which includes the spoken words of the worker 102, which may be retained as spoken words and/or may be converted to text, as well as the time, location and any other pertinent information that is sensed by the sensors 30 of wearable device 12.

In one or more arrangements, this information is stored on memory 20 of wearable device 12 until the wearable device 12 is connected to charging base 118 at which point the information is transmitted over electronic network 104 to database 34 and other components of the system 10 where the information is contained within a notable event report, which is provided to safety manager or facilities manager or other manager or team for their consideration and attention.

In alternative arrangement, this information is stored on memory 20 until it is convenient for wearable device 12 to transmit this information over the air to the other components of system 10, such as database 34, charging base 118, and/or management software 108. Again, because the information is deemed not to be an immediate safety concern this information is deemed to be of a lower priority level and is not expedited. Meaning that the wearable device 12 may be allowed to transmit the information at a time convenient for the wearable device 12, such as when the wearable device 12 establishes a strong signal with electronic network 104.

In another arrangement, the information related to the notable event may be treated in the same manner as the safety event information described above. However, by providing notable event information in the same and undiscernible manner as safety information, this has the potential of distracting the safety manager 112 from responding quickly to true safety concerns and issues.

In one or more arrangements, the system 10 combines all the notable event reports into a single report that is provided to the safety manager 112, facility manager or other manager or team on a daily, weekly, monthly or quarterly basis, or on any other basis that is convenient and facilitates allocation of proper resources to these notable events.

Example of Core, Holster and Attachment Member:

With reference to FIGS. 5-14, one configuration of a wearable device 12 is presented that includes a core 14, holster 120 and attachment member 16 among other components as is described herein.

Core:

Core 14 is formed of any suitable size, shape, and design and is configured to house the electronic components of wearable device 12 and fit in and be held by holster 120 in a removable manner. In the arrangement shown, as one example, core 14 includes an upper end 122, a lower end 124, opposing sides 126, an exterior surface 128, a back wall 130 and a forward wall 132. In the arrangement shown, as one example, the size and shape of core 14 narrows slightly as it extends from upper end 122 to the lower end 124. This slight narrowing facilitates the insertion of core 14 within holster 120 and ensures that core 14 may be held within holster 120 in a removable manner while ensuring that the core 14 does not come out of holster 120 in an unintentional manner. Also, in the arrangement shown, core 14 slightly narrows as it extends from the back wall 130 to the forward wall 132 so as to also facilitate easy insertion within holster 120 while preventing unintentional removal of core 14 from holster 120.

More specifically, in one or more arrangements, as is shown, the forward wall 132 and back wall 130 narrow slightly toward one another as they extend from upper end 122 to lower end 124 such that the lower end 124 is slightly narrower or slightly smaller in stature than the upper end 122. Similarly, opposing sides 126 of core 14 narrow slightly toward one another as they extend from upper end 122 to lower end 124 such that the lower end 124 is slightly narrower or slightly smaller in stature than the upper end 122.

Also, as is shown, opposing sides 126 angle toward one another as they extend from back wall 130 to forward wall 132. Such that the forward wall 132 or forward side of core 14 is slightly narrower or slightly smaller in stature than the back wall 130 or back side of core 14. In one or more arrangements, as is shown, the shape of core 14 slightly curves or contours so as to comfortably fit around the worker's arm. In this arrangement, the back surface of the back wall 130 has a slightly concave shape and the forward wall 132 has a slightly convex shape. This slightly curved or arcuate shape makes core 14 slightly more comfortable to wear. In an alternative arrangement, the forward wall 132 and/or back wall 130 are relatively flat or straight or not curved whereas the back wall of the holster 120 is curved in a concave manner thereby providing a comfortable feel for worker 102.

Also, as is shown, the upper end 122 and lower end 124 of core 14 include end walls 134. The opposing end walls 134 angle toward one another as they extend from back wall 130 to forward wall 132. That is, the upper positioned end wall 134 connects at its upper end to back wall 130 and at its sides to the upper end of sides 126 and extends slightly downward therefrom until connecting at its lower end to the upper end of forward wall 132. Similarly, the lower positioned end wall 134 connects at its lower end to back wall 130 and at its sides to the lower end of sides 126 and extends slightly upward therefrom until connecting at its upper end to the lower end of forward wall 132.

In the arrangement shown, core 14 is relatively small and has a low profile with a smooth exterior surface 128. The small size and smooth exterior surface 128 and configuration of core 14 helps to prevent the wearable device 12 from being in the way while being worn and further prevents the wearable device 12 from being hung-up or caught during use thereby causing a safety issue itself.

In the arrangement shown, as one example, the exterior surface 128 of the core 14 includes indicia 136 thereon. Indicia 136 can be any visual indication such as a logo or design, a model number, a unit number, the ID 44 of that particular core 14, instructions, lost and found information, owner info, or any other information. This indicia 136 may be included on the forward wall 132, which is outwardly facing and visible to others, or indicia 136 may be on back wall 130, sides 126, upper or lower end walls 134 or on any other portion of core 14. The inclusion of indicia 136 may improve the ease of use of system 10 by allowing for quick visual identification of core 14.

In one or more arrangements, as is shown, the upper positioned end wall 134 includes visual indicator 40 therein. In the arrangement shown, as one example, this visual indicator 40 is a transparent or semitransparent component positioned in the exterior surface 128 of core 14 that is positioned to cover or operably connect to a light or LED housed within the hollow interior of core 14, which is configured to cover the light or LED to protect it during wear while facilitating the transport of light generated by the light or LED through the material of core 14 so that it can be visually seen by the worker 102 as well as others around the worker 102. While only a single visual indicator 40 is shown in core 14, any number of visual indicators 40 are hereby contemplated for use. While the visual indicator 40 is shown in the upper positioned end wall 134, it is hereby contemplated for use that the visual indicator 40 may be positioned in any portion of core 14.

In one or more arrangements, the transparent component of visual indicator 40 may double as a light pipe 116 for light sensor 30D, or alternatively, this component is separated into two components or portions, with one component or portion serving to transport light from the light or LED to the exterior to serve as a visual indicator and the other component or portion serving as the light pipe 116 to transfer light from the exterior of core 14 to the light sensor 30D. In an alternative arrangement, a separate light pipe 116 is positioned in the exterior surface 128 of core 14 and facilitates the transfer of light from the environment to the light sensor 30D. Light pipe 116 is operatively connected to the light sensor 30D within core 14 and facilitates transfer of light from the environment to the light sensor 30D for tracking of light conditions around the worker.

In one or more arrangements, as is shown, the upper positioned end wall 134 includes one or more openings 114 therein. In the arrangement shown, as one example, one or more openings 114 provide a passageway through the material of core 14 thereby providing access to the sensors 30 held within core 14, such as sound sensor 30A, air quality sensor 30E or any other sensor 30 that requires access to air for sensing purposes. While only a single opening 114 is shown in core 14, any numbers of openings 114 are hereby contemplated for use. While the opening 114 is shown in the upper positioned end wall 134, it is hereby contemplated for use that the opening(s) 114 may be positioned in any portion of core 14.

In the arrangement shown, core 14 includes event trigger 36 therein. Event trigger 36 is formed of any suitable size, shape, and design and is configured to be engaged by the worker 102 whenever an accident, near miss or notable event occurs. Once engaged, the event trigger 36 causes core 14 to store a high-density of information for a predetermined amount of time or period, as well as record audible information from the worker 102 and then transmit this information in a safety report or a notable event report or other report as is described herein. In the arrangement shown, as one example, event trigger 36 takes the form of a button placed in the exterior surface 128 of forward wall 132 which provides easy access to event trigger 36. In the arrangement shown, event trigger 36 is a recessed or depressed button which helps to prevent unintentional engagement of the event trigger 36 which helps to reduce the number of false-positives. In one or more arrangements, a raised ring or protective cover may be placed over or around event trigger 36 to further reduce unintentional engagement of event trigger 36. In the arrangement shown, event trigger 36 is positioned in the upper end of forward wall 132, however any other position is hereby contemplated for use.

In one or more arrangements, as is shown, the lower end of back wall 130 includes a step 138 therein. In the arrangement shown, as one example, step 138 is a notch or recess in the lower end 124 of the lower positioned end wall 134. This step 138 provides a structural feature that engages the lower end of holster 120 thereby facilitating full frictional and locking engagement between holster 120 and core 14. In the arrangement shown, step 138 is a generally right-angled groove that extends from side 126 to side 126 at the intersection of back wall 130 and lower end wall 134. A similar but opposite step 140 is positioned in the lower end of back wall 142 of holster 120. The engagement of step 138 of core 14 with the step 140 of holster 120 establishes the fully inserted position of core 14 within holster 120 and prevents the core 14 from sliding out of the lower end of holster 120.

In the arrangement shown, as one example, port 28 is positioned at or in association with step 138. In the arrangement shown, as one example, port 28 includes a plurality of conductive pins that are accessible at the lower end of back wall 130. The pins of port 28 facilitate charging of the power source 26 within core 14 when core 14 is plugged into charging base 118. The pins of port 28 facilitate data-transfer from memory 20 to the other components of system 10 when core 14 is plugged into charging base 118. The position of port 28 in the lower end of back wall 130 at step 138 provides protection for the pins of port 28 when core 14 is fully inserted within holster 120. This is because, when core 14 is held within holster 120, port 28 is covered by the back wall 142 and step 140 of holster 120.

A detent 144 is also positioned in the lower end of back wall 130. Detent 144 is any device or component that helps to facilitate locking but removable connection of core 14 to holster 120. In the arrangement shown, detent 144 of core 14 is an angled recess that is configured to receive a corresponding detent 146 positioned in the lower end of back wall 142 of holster 120. In the arrangement shown, as one example, detent 146 in the back wall 142 of holster 120 is angled protrusion that fits with close and tight tolerances and frictional engagement within the detent 144 of core 14 when core 14 is fully inserted within holster 120. Any number of detents 144, 146 are hereby contemplated for use as is any size, shape, and design for detents 144, 146.

Holster:

Holster 120 is formed of any suitable size, shape, and design and is configured to house and hold core 14 therein in a removable manner while core 14 is worn by a worker 102. In the arrangement shown, as one example, holster 120 includes an upper end 148, a lower end 150, opposing side walls 152, and a back wall 142 that form an opening 154 that is sized and shaped to receive core 14 therein. In the arrangement shown, as one example, the size and shape of opening 154 of holster 120 narrows slightly as it extends from upper end 148 to the lower end 150 in conforming shape with the exterior surface 128 of core 14. This slight narrowing facilitates the insertion of core 14 within holster 120 and ensures that core 14 may be held within holster 120 in a removable manner while ensuring that the core 14 does not come out of holster 120 in an unintentional manner. Also, as is shown, opposing side walls 152 angle toward one another as they extend from upper end 148 to lower end 150. This causes the opening 154 therein to be a slightly narrower or slightly smaller at the lower end 150 of opening 154 as opposed to the upper end 148.

In one or more arrangements, as is shown, the shape of holster 120 slightly curves or contours so as to comfortably fit around the worker's arm. In this arrangement, the back surface of the back wall 142 has a slightly concave shape. This slightly curved or arcuate shape makes holster 120 slightly more comfortable to wear.

In the arrangement shown, holster 120 is relatively small and has a low profile with a smooth exterior surface 156. The small size and smooth exterior surface 156 and configuration of holster 120 helps to prevent the wearable device 12 from being in the way while being worn and further prevents the wearable device 12 from being hung-up or caught during use thereby causing a safety issue itself.

In one or more arrangements, as one example, the exterior surface 156 of the holster 120 includes indicia 136 thereon. Indicia 136 can be any visual indication such as a logo or design, a model number, a unit number, the ID 44 of that particular holster, the owner's name, instructions, lost and found information, or any other information. This indicia 136 may be included on the on any portion of holster 120.

In one or more arrangements, as is shown, the lower end of back wall 142 includes a step 140 therein. In the arrangement shown, as one example, step 140 is a generally right angled protrusion in the lower end 150 back wall 142. This step 140 provides a structural feature that engages the lower end of core 14 thereby facilitating full frictional and locking engagement between holster 120 and core 14. In the arrangement shown, step 140 is a generally right-angled protrusion that extends from side wall 152 to side wall 152 at the intersection of back wall 142 and side walls 152 at the lower end 150 of holster 120. A similar but opposite step 138 is positioned in the lower end of core 14. The engagement of step 138 of core 14 with the step 140 of holster 120 establishes the fully inserted position of core 14 within holster 120 and prevents the core 14 from sliding out of the lower end of holster 120.

In this example arrangement, a detent 146 is also positioned in the lower end of back wall 142. Detent 146 is any device or component that helps to facilitate locking but removable connection of core 14 to holster 120. In the arrangement shown, as one example, detent 146 of holster 120 is an angled protrusion that is configured to engage and be received within a corresponding detent 144 positioned in the lower end of back wall 130 of core 14. In the arrangement shown, as one example, detent 146 in the back wall 142 of holster 120 is angled protrusion that fits with close and tight tolerances and frictional engagement within the detent 144 of core 14 when core 14 is fully inserted within holster 120. Any number of detents 144, 146 are hereby contemplated for use as is any size, shape, and design for detents 144, 146.

Holster 120 is configured to be connected to worker 102 by any manner, method or means. In one or more arrangements, as is shown, holster 120 includes an opening 158 positioned at each opposing side of holster 120. These openings 158 are configured to receive or connect to a portion of attachment member 16. In the arrangement shown, as one example, attachment member 16 is an elastic band 16 that extends between opposing ends 160. In this example arrangement, the ends 160 of bands 16 are passed through the openings 158 of holster 120 and the band 16 is tightened on itself by way of the frictional engagement of a hook-and-loop arrangement (such as Velcro® or the like systems) buttons, snaps, or any other manner or method of connecting two components together. In this way, holster 120 and core 14 are comfortably connected to worker 102. In an alternative arrangement, the worker 102 can pass their belt though the openings 158 and attach the holster 120 and core 14 in that manner.

In an alternative arrangement, instead of holster 120 having a band that serves as an attachment member 16, attachment member 16 is a clip that can be clipped onto a user's shirt, helmet, belt or any other piece of clothing or equipment.

It has been found that workers 102 like having their own bands (attachment devices 16) and their own holsters 120. This is because the worker 102 actually physically engages these components. By having personal bands and holsters 120 this is more sanitary and comfortable for the workers 102. In addition, by separating the core 14, holster 120 and attachment member 16 band, this allows for replacement of the core 14, holster 120 and attachment member 16 band separately. That is, if one of these components fails or wears out (as is often the case with an elastic band as the attachment member 16) this single component of the system 10 can be replaced without throwing away the other components.

Themed Wearable Devices:

In one or more arrangements, the attachment member 16, holster 120 and core 14 are colored with the colors of the companies that use them and include the logos or other indicia of the companies that use them. This provides a fun appeal to the system 10, and also makes it easier to identify who the owner of the components are. In another arrangement, the worker 102 can order custom colored or themed holsters 120, bands 16 and/or cores 14, such as in the motif of their favorite sports team or the like.

Charging Base 118:

In one or more arrangements, system 10 includes a charging base 118. Charging base 118 is formed of any suitable size, shape, and design and is configured to receive, charge and transfer information from and to cores 14. In the arrangement shown, as one example, charging base 118 includes a back wall 162 that includes a plurality of sockets 164 that are sized and shaped to receive cores 14 therein. When cores 14 are placed within sockets 164, cores 14 are charged by charging base 118 and data transfer occurs between core 14 and charging base 118 and the other components of the system 10.

Charging base 118 also includes a user interface 106, which in the arrangement shown is included in a lower wall 168. User interface 106 provides the ability for the workers 102 to interact with the charging base 118 and may include a plurality of sensors, a key pad, a biometric scanner, a touch screen or any other input for information. As one example, at the beginning of a shift, a worker 102, with or wearing their own personal holster 120 engages the charging base 118 by biometrically scanning in with a finger or thumb print, a retinal scan, facial recognition, voice recognition or the like or any combination thereof; or alternatively, the worker 102 types in their name, worker 102 ID number, swipes a worker 102 ID card, scans in using their phone or any other manner or method of associating their personal identification with the system 10.

Upon receiving this information, charging base 118 and system 10 identifies the worker 102 and allocates a core 14 held within the charging base 118 that is fully charged, or has the highest charge among the cores 14, and assigns that core 14 to that worker 102 by illuminating the core 14, illuminating the socket 164 that the core 14 is held in, or providing the socket number to the worker 102 or by identifying which core 14 the worker 102 is to take by any other manner, method or means. Also, in association with this process, system 10 programs core 14 with the proper threshold levels and other information that is particular to that worker's job. For instance, for a worker in a heavy industrial position that wears external protective gear (such as ear muffs) the thresholds will be substantially different than the thresholds for a worker in a light clerical role that does not wear any protective gear. This ensures that proper safety thresholds are identified for each worker 102 in each role. This ensures that unnecessary safety concerns are maintained at a minimum.

Once the proper core 14 has been identified to the worker 102, the worker 102 retrieves that core 14 from the charging base 118, slides the core 14 into their holster 120 and the worker 102 begins their shift and the core 14 begins recording information in the manner described herein.

At the end of the shift, the worker 102 returns the core 14 to the charging base 118. Once the core 14 is plugged into a socket 164, the charging base 118 begins charging the core 14 and begins retrieving data from the core 14 for distribution into the system 10 and saving into database 68 among other uses as is described herein. The system 10 may also updates the software or firmware on the core 14 and prepares the core 14 for another use.

In one or more arrangements, after turning in the wearable device 12 at the end of their shift, the worker 102 is provided with a log of all items that were sensed as potential accidents or near misses and/or notable events. The information related to each of these potential accidents or near misses and/or notable events is provided to the worker 102 such as time, position, temperature, light level, air quality, volume, CO level, the audible recording or converted text of the contemporaneous recording of the incident or notable event. The worker 102 is then provided the opportunity to confirm or deny whether an accident or near miss or notable event actually occurred, and provide additional information regarding the potential accident or information or notable event. This provides the worker 102 the opportunity to clarify the record and provide additional information.

In one or more arrangements, charging base 118 includes its own communication equipment, such as a cellular communication module. In this arrangement, charging base 118 can communicate completely independently of the internet service or other communication service utilized by the manufacturing facility. This independence ensures that the charging base 118 has the best possible ability to get accurate and timely information to the database 68, electronic network 104, management software 108 and other components of the system 10, so as to ensure timely and accurate reporting of safety events, near misses, accidents and notable events. This independent communication structure also prevents the addition of charging base 118 and system 10 from being a drag on the internet or other communication structure of the manufacturing facility. This independent communication also ensures that the charging base 118 itself can send out text messages and emails directly to the safety manager 112 or others without delay when an accident occurs. In an alternative arrangement, the charging base 118 connects to the internet or communication service utilized by the manufacturing facility. In yet another alternative arrangement, the charging base 118 includes both an independent communication structure as well as connecting to the internet or communication service utilized by the manufacturing facility which provides the benefits of redundancy and back-up in the event that one system is not working.

To be clear, core 14 may transfer data in any of a number of manners. In one or more arrangements, periodically during use core 14 transmits information to other components of the system 10. This may occur at a convenient time, such as when the core 14 establishes a strong wireless connection with other components of the system 10, or when there is low utilization on the system 10, or the like. In another arrangement, core 14 stores data on its memory 20 and transmits this data to other components of the system 10 when core 14 is plugged into charging base 118, directly into an internet-connected lead (such as an Ethernet cable, or mini-Ethernet cable, or the like). In another arrangement, core 14 transfers data both periodically through a wireless connection to other components as well as when core 14 is plugged into charging base 118 or another internet-connected device. In this way, the system 10 and/or core 14 can transmit information in the most efficient manner and in accordance with the urgency of the information. That is, urgent information, such as a safety issue, may be transmitted immediately, whereas mundane data collected for data mining purposes may be stored and transmitted in a more-efficient and less burdensome manner when core 14 is plugged into charging base 118. This flexibility of data transfer provides efficiencies and helps the system 10 operate in the most efficient manner possible.

Outdoor Version:

While the arrangements described primarily herein discuss use of core 14 and/or system 10 within a manufacturing facility where core 14 communicates using Wi-Fi or other close-proximity wireless communication technology, it is contemplated that in other arrangements it is desirable to use the system 10 outside of the constraints of a single building or a single manufacturing facility or campus. In these arrangements, core 14 is equipped with its own cellular communication module which facilitates the operation of the system 10 described herein without the need to be constrained to any particular geographic area. In this arrangement, core 14 communicates with system 10 in the manners described herein through communication with existing third-party cellular towers, much in the same way that a conventional cellular phone communicates with these towers. This information is then routed through the electronic network 104 to database 68 and the other components of system 10.

This arrangement is desirable for companies that have a dispersed workforce such as package delivery companies such as Fed-Ex and UPS, railroads, companies that do on site repair and installation such as heating and air conditioning companies and plumbing companies, or any other company with a dispersed workforce that is not housed or constrained within a building or campus. Other than having cellular communication capabilities, this outdoor version of the core 14 operates in a similar if not identical manner to that described herein and facilitates the accomplishment of the same if not identical objectives.

Monitoring System 60:

In one or more shown arrangements, system 10 includes a monitoring system 60. Monitoring system 60 is formed of any suitable size, shape, design and is configured to receive information indicative of worker status and/or working conditions. In one or more arrangements, monitoring system is configured to receive information recorded by wearable devices 12 (e.g., via charging base 118, electronic network 104, and/or user terminal) and store the information and/or aggregate data derived therefrom. In the arrangement shown, monitoring system 60 includes a database 68 and a data processing system 70 communicatively connected to the database.

While one or more arrangements may be primarily shown and/or discussed with reference to use of wearable devices for gathering of data, the arrangements are not so limited. Rather, it is contemplated that in some various arrangements, monitoring system 60 may gather information indicative of worker status and/or working conditions using various methods and/or means including but not limited to, for example, various sensors positioned around a work facility, security systems, IT systems, and/or any other system or device for gathering data Database 68:

Database 68 is formed of any suitable size, shape, design and is configured to facilitate storage and retrieval of data. In the arrangement shown, as one example, database 68 is local data storage connected to data processing system 70 via electronic network 104. However, embodiments are not so limited. Rather, it is contemplated that in one or more arrangements, database 68 may be remote storage or cloud based service communicatively connected to data processing system 70 via one or more external communication networks.

In some various arrangements, information recorded by wearable devices 12 may be communicated to database 68 for storage directly (e.g., over electronic network 104) from wearable devices 12. Additionally or alternatively, in some various arrangements, information recorded by wearable devices 12 may be to database 68 for storage indirectly (e.g., by charging base and/or data processing server.

Data Processing System 70:

Data processing system 70 is formed of any suitable size, shape, and design and is configured to facilitate receipt, storage, and/or retrieval of information in database 68, execution analytics software 80, execution of the management software 108, providing of a user interface 106, and/or implementation of various other modules, processes or software of system 10.

In one or more arrangements, for example, such data processing systems includes a circuit specifically configured and arranged to carry out one or more of these or related operations/activities. For example, data processing system 70 may be discreet logic circuits or programmable logic circuits configured and arranged for implementing these operations/activities, as shown in the figures, and/or described in the specification.

Figure 18:
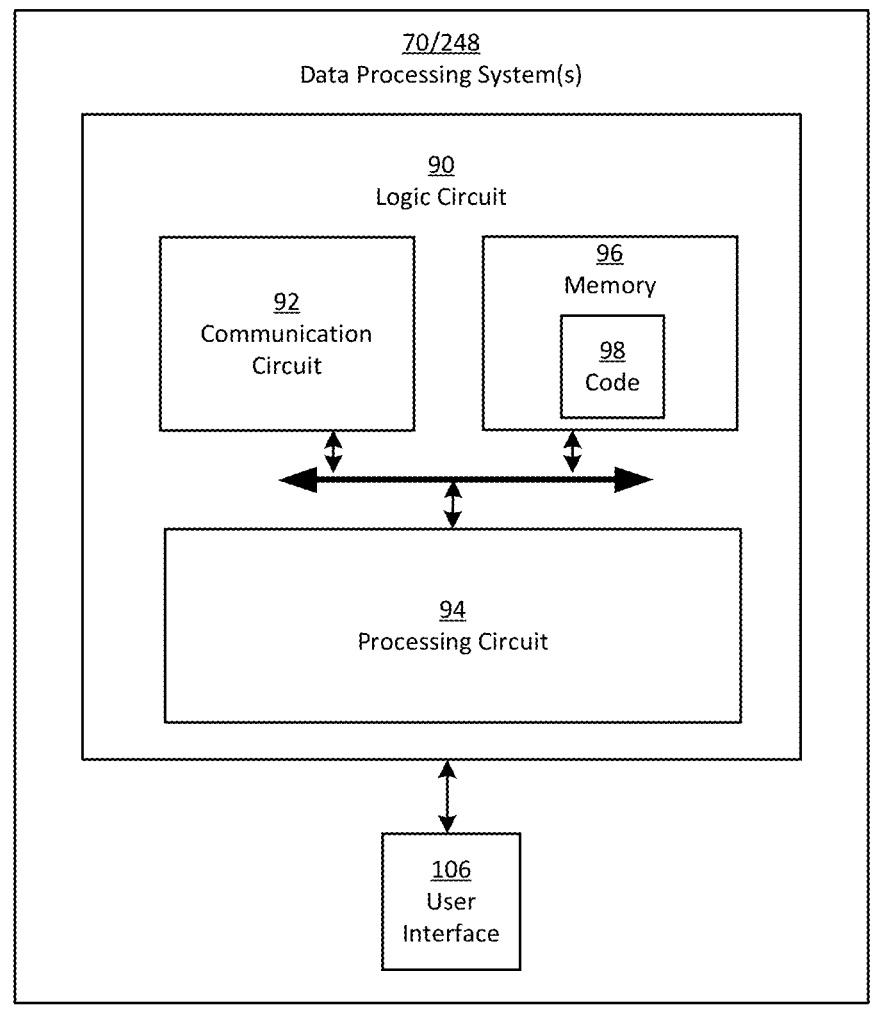
FIG. 18 is a plan view of a processing system, in accordance with one or more embodiments.
Figure 19:
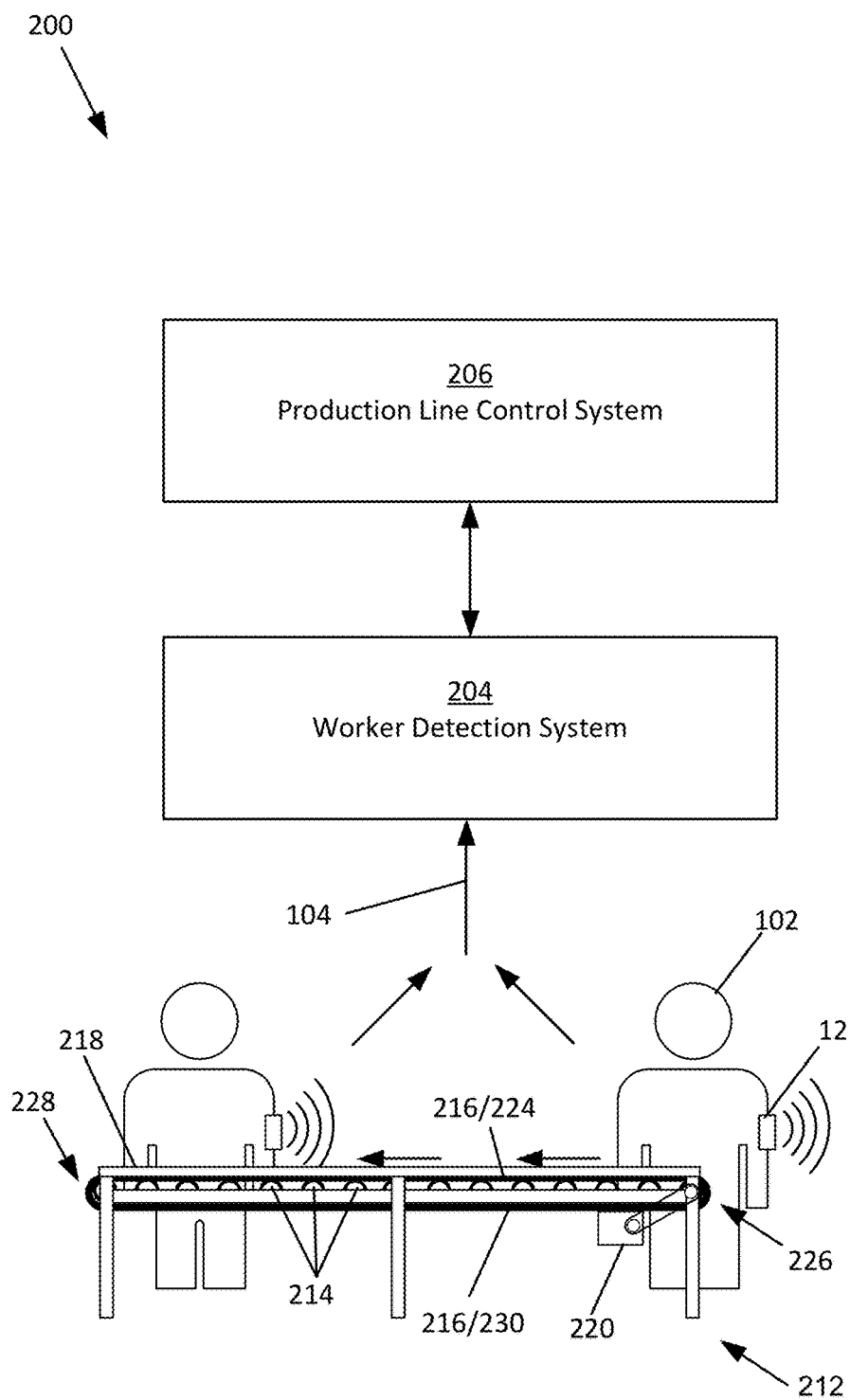
FIG. 19 is a plan view of a system for optimizing operation of a production line, in accordance with one or more embodiments; the view showing a production line; wearable devices, a worker detection system, and a control system.
Figure 20:
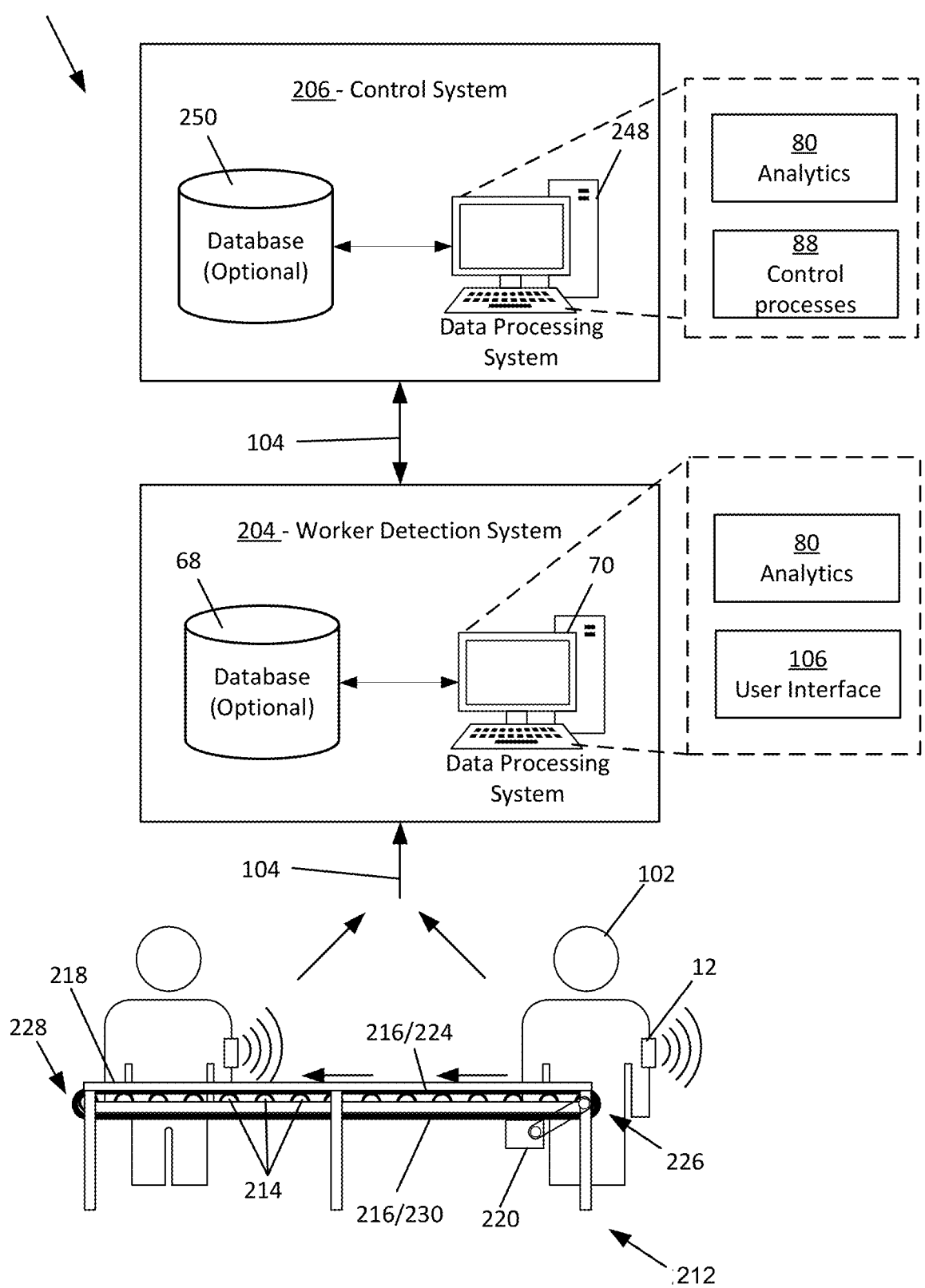
FIG. 20 is a plan view of a system for optimizing operation of a production line, in accordance with one or more embodiments; the view showing a production line; wearable devices, a worker detection system, and a control system.
Figure 21:
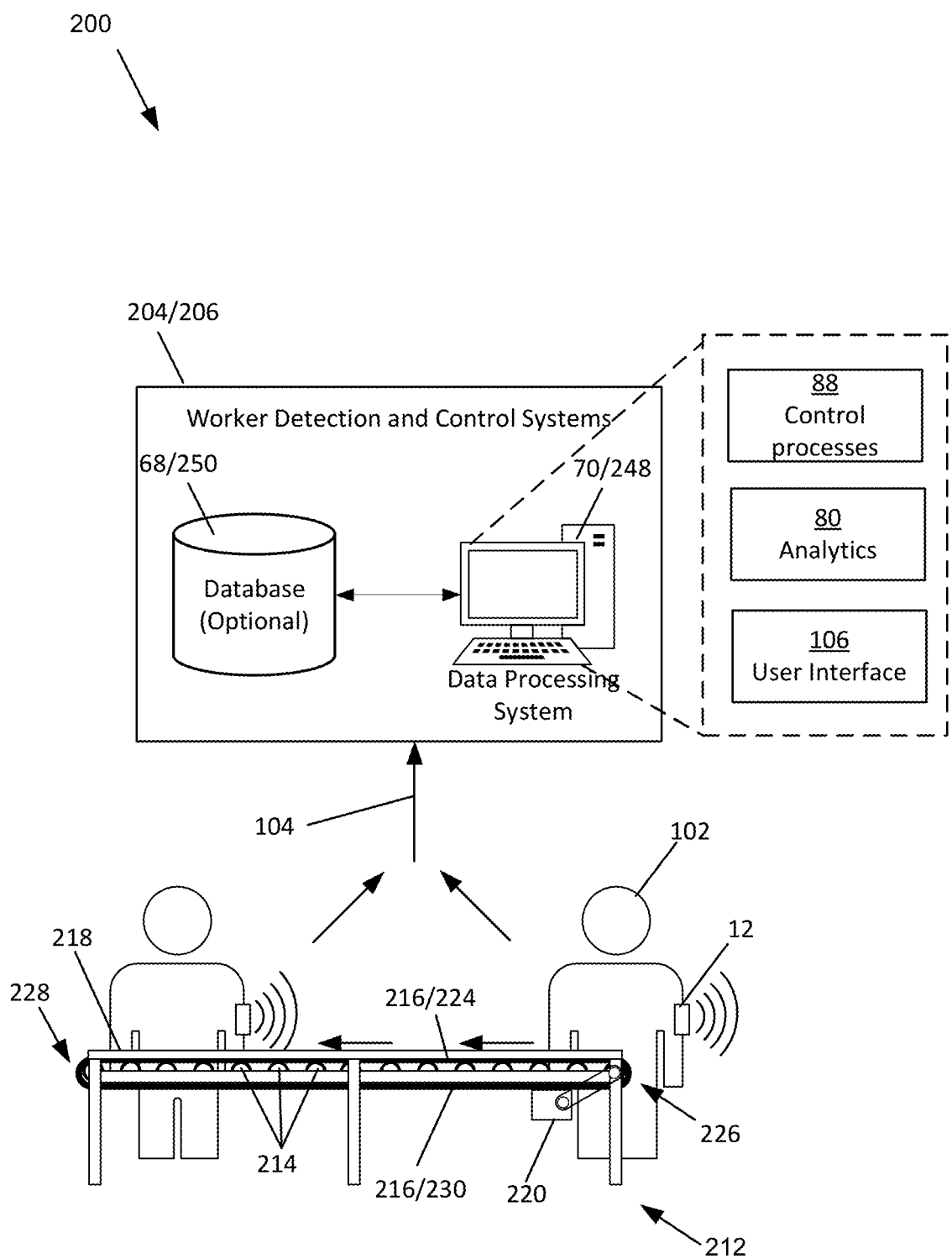
FIG. 21 is a plan view of a system for optimizing operation of a production line, in accordance with one or more embodiments; the view showing a production line; wearable devices, a worker detection system, and a control system; the view showing the worker detection system and the control system implemented together.
Figure 22:
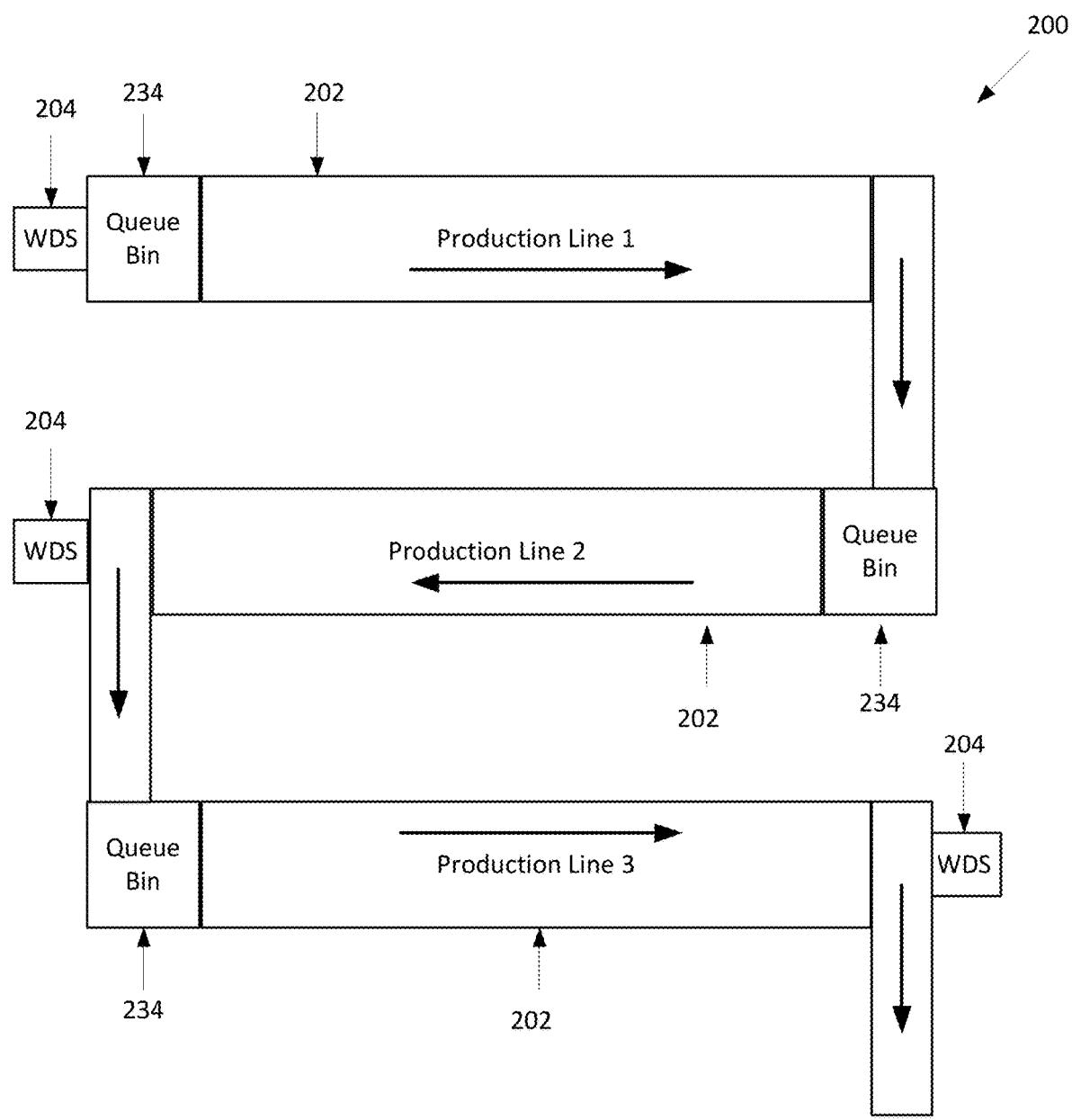
FIG. 22 shows a top view of a system for optimizing operation of multiple production lines, in accordance with one or more embodiments.
Figure 23:
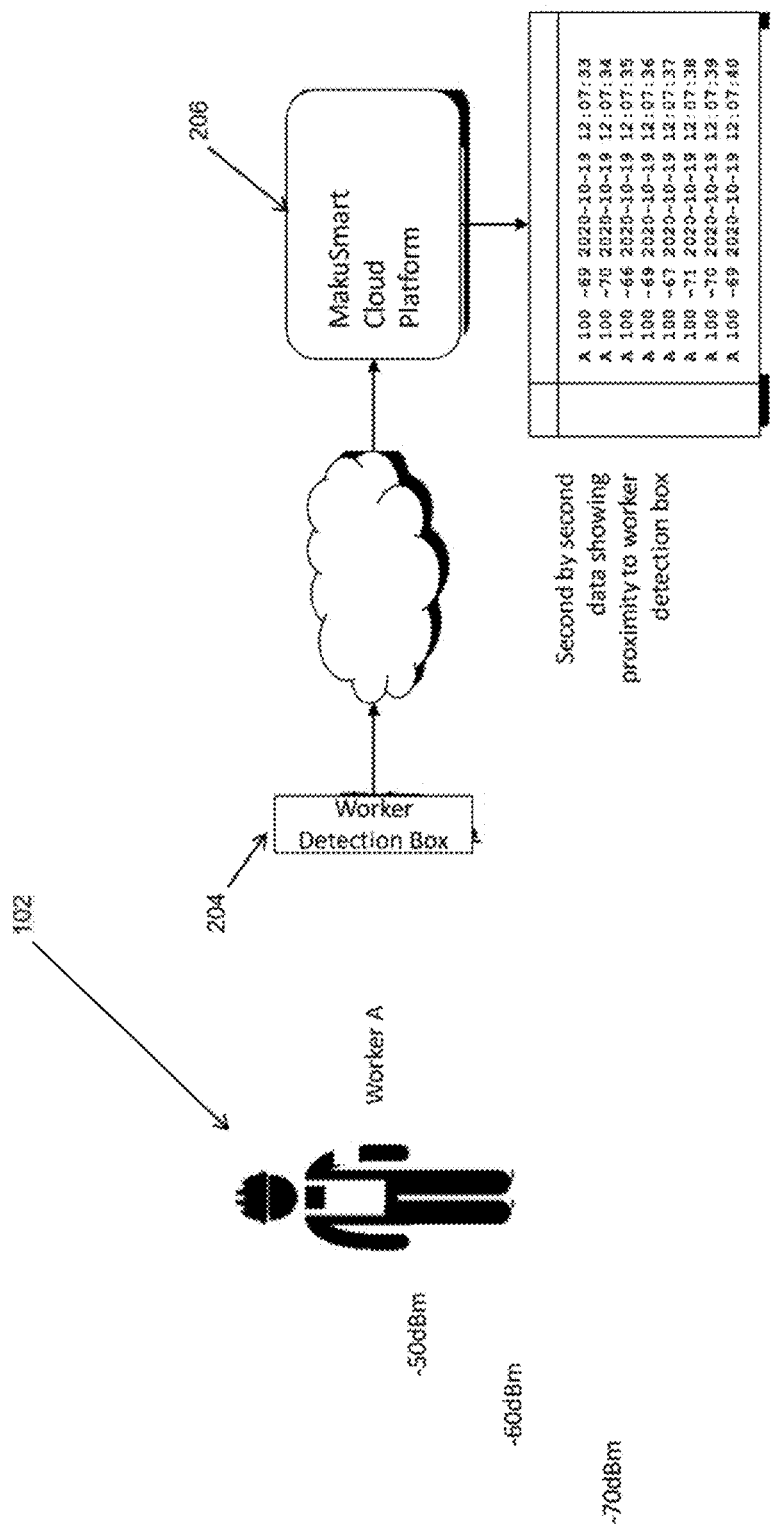
FIG. 23 shows a view of a system for optimizing operation of a production line, in accordance with one or more embodiments; the view showing a worker detection system configured to determine proximity of a wearable device worn by a worker.
Figure 24:
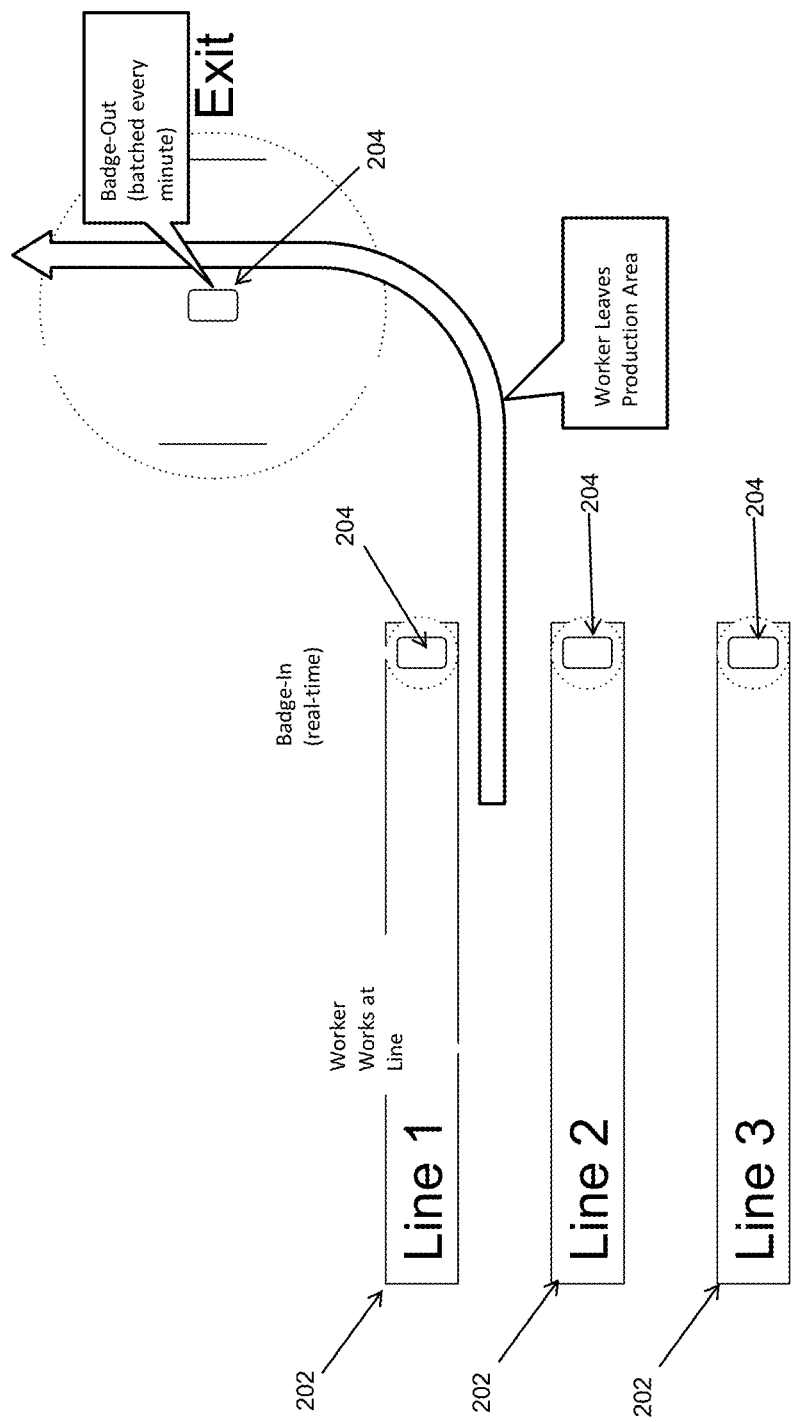
FIG. 24 shows a top view of a system for optimizing operation of multiple production lines, in accordance with one or more embodiments; the view illustrating steps for tracking presence of a worker.

FIG. 18 shows a block diagram of an example implementation of data processing system 70 in accordance with one or more arrangements. In the arrangement shown, as one example, data processing system(s) 70 includes a logic circuit 90 and a user interface 106 among other components.

Logic Circuit 90:

Logic circuit 90 is formed of any suitable size, shape, design and is configured to process data received from one or more components communicatively connected to data processing system 70. In the arrangement shown, as one example implementation, logic circuit 90 includes a communication circuit 92, a processing circuit 94, and a memory 96 having software code 98 or instructions that facilitates the operation of system 200.

Processing Circuit 94:

Processing circuit 94 may be any computing device that receives and processes information and outputs commands according to software code 98 stored in memory 96. For example, in some various arrangements, processing circuit 94 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 96.

Memory 96:

Memory 96 may be any form of information storage such as flash memory, ram memory, dram memory, a hard drive, or any other form of memory. Processing circuit 94 and memory 96 may be formed of a single combined unit. Alternatively, processing circuit 94 and memory 96 may be formed of separate but electrically connected components. Alternatively, processing circuit 94 and memory 96 may each be formed of multiple separate but communicatively connected components.

Software code 98 is any form of instructions or rules that direct processing circuit 94 how to receive, interpret and respond to information to operate as described herein. Software code 98 or instructions is stored in memory 96 and accessible to processing circuit 94. As an illustrative example, in one or more arrangements, software code 98 or instructions may configure processing circuit 94 to receive data communicated by wearable devices 12 or other sensors in a facility to facilitate control of production line 202 and/or other components of system 200.

As some illustrative examples, in one or more arrangements, data processing system(s) 70 is configured to control speed at which items are moved along conveyor 212 of production line 202, control the rate at which items are input to source end 226 of conveyor 212, communicate status alerts (e.g., via automated call, SMS, push notification, email, messaging on social networks, or any other means or methods for messaging), and/or perform various other operations. In one or more arrangements, operation of logic circuit 90 is configurable by a user via user interface 106 to customize/adjust operation of system 200.

Communication Circuit 92:

Communication circuit 92 is formed of any suitable size, shape, design, technology, and in any arrangement and is configured to facilitate communication with devices to be controlled, monitored, and/or alerted by data processing system(s) 70. In one or more arrangements, as one example, communication circuit 92 includes a transmitter (for one-way communication) or transceiver (for two-way communication). In various arrangements, communication circuit 92 may be configured to communicate with various components of system 200 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

User Interface 106:

In some implementations, data processing system(s) 70 includes a user interface 106. User interface 106 is formed of any suitable size, shape, design, technology, and in any arrangement, and is configured to facilitate user control and/or adjustment of various components of system 200. In one or more arrangements, as one example, user interface 106 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 106 includes a display (not shown). Display is formed of any suitable size, shape, design, technology, and in any arrangement, and is configured to facilitate display information of settings, sensor readings, time elapsed, and/or other information pertaining to operation of production line 202. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to logic circuit 90. For example, in one or more arrangements, operation of logic circuit 90 may customized using a smartphone or other computing device that is communicatively connected to the logic circuit 90 (e.g., via Bluetooth, WIFI, and/or the internet). For instance, in one or more arrangements, user interface 106 may be provided as a webpage that is executable by a web browser on a smartphone or other computing device.

Alternative Arrangement:

With reference to FIGS. 19-32, a system and method for optimizing a production line is presented. The arrangements shown in FIGS. 19-32 may include various components similar to those of the system 10 shown in FIGS. 1-18 and as such the disclosure related to the arrangements shown in FIGS. 1-18 applies to the arrangements shown in FIGS. 19-32 unless stated specifically herein.

Production Equipment Optimization System 200:

With reference to the figures, a production equipment optimization system 200 (or simply system 200 (of simply system 200) is presented. In one or more arrangements, system 200 includes a plurality of wearable devices 12, a worker detection system 204 and a control system 206, and among other components. In one or more arrangements, system is configured to control operational of a production line 202. However, the embodiments are not so limited. Rather, it is contemplated that in some various arrangements, system may be used to control operation of various other types of production equipment and/or devices and/or perform various actions and/or processes.

Production Line 202

Production line 202 may be formed of any suitable size, shape, and design and is configured to move items along the production line for processing and/or assembly. In the arrangement shown, production line includes one or more conveyors 212.

Conveyor 212:

Conveyor 212 may be formed of any suitable size, shape, and design and is configured to transport item along conveyor 212 to facilitate processing and/or assembly of items by workers. In the arrangement shown, conveyor 212 is a belt-type conveyer having rollers 214, a belt 216 positioned on rollers 214, guide rails 218, and a motor 220.

During operation, motor 220 causes belt 216 to be rotated around rollers 214 in a loop. Motor 220 is formed of any suitable size, shape, and design and is configured to generate mechanical movement. In the arrangement shown, as one example, motor 220 is an electric motor (e.g., a DC motor or an AC motor) configured to convert electric power into rotational motion. However, embodiments are not so limited. For example, in some arrangements, motor 220 may be an internal combustion engine, a fluid driven engine (e.g., steam, water, and/or air driven), or any other type of motor or engine.

In the arrangement shown, a drive shaft of motor 220 is operatively connected to pull an upper portion 224 of belt 216 at a destination end 228 of conveyor 212 when operated, which causes belt 216 to be rotated around rollers 214 in a continuous loop. However, the embodiments are not so limited. Rather, it is contemplated that in various embodiment motor 220 may be operatively connected to belt 216 using various methods or means known in the art. In one or more arrangements, speed of motor 220 is adjustable to facilitate adjustment of the speed at which belt 216 is rotated and the speed items are transported along conveyor 212.

Rotation of belt 216 carries items to be processed along conveyor 212 on upper portion 224 of belt 216 from a source end 226 to a destination end 228 of conveyor 212. In one or more arrangements, guide rails 218 prevent the items or other items from falling off sides of the belt 216 while being transported. At a destination end 228 of conveyor 212, the items are moved off belt 216 to their destination (e.g., a bin or other conveyor) and belt 216 wraps around a roller 214 at the destination end 228, and lower portion 230 of belt 216 is pulled back toward the source end 226.

Worker Detection System 204:

Worker detection system 204 is formed of any suitable size, shape, and design and is configured to detect and notify control system 206 when workers 102 are present on a production line 202.

In one or more arrangements, as one example, worker detection system 204 may be implemented by a data processing system 70 and optionally a database 68, for example, as described with reference to monitoring system 60. For example, in some implementations, system 200 may form part of system 10. However, the embodiments are not so limited. Rather, it is contemplated that in some various arrangements, worker detection system 204 and other components of system 200 may be independently in applications with various other components of monitoring system 60 and/or system 10 omitted. Furthermore, it is contemplated that in one or more arrangements, various features and/or functionality of data processing system 70 and/or database 68 described with reference to monitoring system 60 may be omitted.

In one or more arrangements, worker detection system 204 is configured to detect presence of workers 102 using wearable devices 12 worn by the workers 102. For example, in one or more arrangements, data processing system 70 of worker detection system 204 includes a short range communication circuit (e.g. communication circuit 92 of logic circuit 90) that is configured to communicate with a wearable device 12 of a worker 102 when the worker 102 is in close proximity to a production line 202.

While worker detection system 204, is primarily shown and described with reference to detection of workers using wearable devices 12, the embodiments are not so limited. Rather, it is contemplated that in one or more arrangements worker detection system 204 may detect when workers 102 are present on a production line 202 using various means or methods including but not limited to, for example, wearable devices 12, badges, smart cards, proximity detection, motion sensors, object and/or facial recognition, geo-fencing, GPS, RF communication, and/or any other means or method for determining presence and/or location of workers 102.

In one or more arrangements, worker detection system 204 is configured to indicate that a worker 102 is working on production line 202 while the wearable device 12 of the worker 102 continues to be detected by worker detection system 204. Alternatively, in one or more arrangements, worker detection system 204 is configured to indicate that a worker 102 is working on production line 202 for the time period from a time when the wearable device 12 of the worker 102 is first detected by the worker detection system 204 until the wearable device 12 is detected on another production line or elsewhere in the facility (e.g., near an exit) by another worker detection system 204. This later approach may be less susceptible to intermittent connections (e.g., caused by radio interference) and/or may extend battery life of wearable devices 12 due to the reduced communication between wearable devices 12 and worker detection system 204.

In operation: as an illustrative example, workers 102 may be directed to log in with a nearby worker detection system 204 prior to working on any production line 202. In one or more arrangements, workers may log-in to a first production line 202 by placing their wearable device 12 in close proximity with the corresponding worker detection system 204 for the first production line 202 until log in is confirmed (e.g., with an audible notification, visible notification, and/or other notification to indicate that the worker successfully logged in). In this illustrative example, in response to the user logging in, the worker detection system 204 communicates data to control system 206 that indicates that the worker 102 is working on the first production line 202. Control system 206 may then perform various operations to adjust operation of the first production line 202 based on the knowledge that the worker 102 has been added to the production line (e.g., increasing speed of the first production line 202).

If the worker 102 is later moved to a second production line 202, the worker logs into a worker detection system 204 nearby the second production line 202. In response to the user logging in, the worker detection system 204 communicates data to control system 206 indicating that the worker 102 is working on the second production line 202. Control system 206 may then perform various operations to adjust operation of the first production line 202 and/or second production line based on the knowledge that the worker 102 is now working on the second production line (e.g., decreasing speed of the first production line and/or increasing speed of the second production line).

Similarly, if the worker 102 later leaves the production area on break or at the end of a work shift, the worker 102 may be directed to log out using a worker detection system 204, for example, located nearby an exit. In response to the user logging out, the worker detection system 204 communicates data to control system 206 indicating that the worker 102 no longer working on the second production line 202. Control system 206 may then perform various operations to adjust operation of the second production line based on the knowledge that the worker 102 has left the second production line.

In one or more arrangements, worker detection system 204 may be configured to gather and communicate various other data metrics to control system 206 addition to or in lieu of worker presence. In some various arrangements, data metrics gathered by worker detection system 204 may include but are not limited to, for example, data gathered by sensors 30 of wearable devices 12, other sensors communicatively connected to worker detection system 204, and/or various data metrics derived therefrom.

In one or more arrangements, worker detection system 204 may store and/or aggregate worker presence information and/or other data metrics (e.g., in database 68). Additionally or alternatively, in one or more arrangements, worker detection system 204 may simply communicate worker presence information and/or other data metrics to control system 206 without storing the information and/or data metrics.

In one or more arrangements, worker detection systems 204 are positioned in respective housings 240 near each production line 202. Housings 240 are formed of any suitable size, shape, and design and are configured to hold and protect worker detection systems 204. In one or more arrangements, housings 240 are configured to be waterproof to facilitate easily cleaning without damaging circuits of worker detection systems 204. Waterproof housings 240 are thought to be particular useful in production facilities such as meat packing facilities that regularly clean production lines 202 and nearby equipment.

In the arrangement shown, as one example, housing 240 includes a main body 242, a front plate 244, and a waterproof door 246 among other components. Main body 242 is formed of any suitable size, shape, and design and is configured to house one or more components of worker detection system 204. In the arrangement shown, main body 242 has a generally rectangular block shape having a top 250, bottom 252, opposing sides 254, and back 256 (not shown), and an open front 258.

Front plate 244 is formed of any suitable size, shape, and design and is configured to be attached to front 258 of main body 242 and hold one or more components of worker detection system 204 in place. In the arrangement shown, as one example, front plate 244 has a generally rectangular planar shape extending between a top edge 260, a bottom edge 262, and opposing side edges 264. In this example arrangement, front plate 244 has openings 268 configured to facilitate positioning of components of worker detection system 204 therein.

In this example arrangement, front plate 244 is connected to components of worker detection system 204 and main body 242 by fasteners 270 (e.g., bolts) that extend through holes in front plate 244. However, the embodiments are not so limited. Rather, it is contemplated that housing and other components of worker detection system 204 may be operably connected using any means and methods known in the art including but not limited to, for example, adhesive bonding, chemical bonding, welding, and/or mechanical attachment means such as screws, bolts, threading, interlocks, clips, pins, or other coupling devices.

Door 246 is formed of any suitable size, shape, and design and is configured to form a water-tight enclosure with main body 242 that houses front plate 244 and other components of worker detection system 204 therein. In the arrangement shown, as one example, door 246 has a generally rectangular planar shape extending between a top edge 272, a bottom edge 274, and opposing side edges 276. In this example arrangement, door 246 is hingedly connected to one of the sides 254 of main body 242 by hinges 278. Hinges 278 permit door 246 to be moved between an open position and a closed position. When door 246 is moved to the closed position, a seal 282 is positioned around the outer edges of front plate 244 and forms a water-tight seal with door 246 when moved to the closed position.

In this example arrangement, housing 240 includes a latch 280 connected to the side 254 of main body 242 opposite hinges 278. Latch 280 is formed of any suitable size, shape, and design and is configured to hold door 246 in the closed position. In the arrangement shown, latch 280 is a compression type latch configured to compress seal 282 and form a water-tight seal. However, the arrangements are not so limited. Rather, it is contemplated latch 280 may be any type of latching device known in the art including but not limited to, for example, cam latches, compression latches, slam latches, draw latches, sliding latches, belt latches, snaps, and/or any other method or means for holding door 246 in the closed position.

Control System 206:

In one or more shown arrangements, system 200 includes a control system 206. Control system 206 is formed of any suitable size, shape, design and is configured to retrieve and/or receive information from worker detection system 204 (or other data source) relevant to operation of a production line 64 and perform one or more control processes 88 to adjust operation (e.g., line speed, input rates, and/or work rotation) based on the received/retrieved information.

The arrangements are primarily discussed with reference to a system having a control system 206 connected over one or more networks 104 to worker detection system 204. However, the embodiments are not so limited. Rather, it is contemplated that control system 206 and worker detection system 204 may be implemented and located together as one system. Any other arrangement or distribution of system components is also contemplated.

In the arrangement shown, control system 206 includes a data processing system 290 database 292. Data processing system 290 and database 292 are configured similar to data processing system 70 and database 68 of worker detection system 204. In this example arrangement, database 292 is used to store information received from and/or generated by worker detection system 204.

Control Processes 88:

In some various different arrangements, control system 206 may be configured to perform various different control processes 88 to adjust operation of one or more production lines 202 based on information received from or generated by worker detection system(s) 204 and/or other data source.

Throughput Adjustment:

In one or more arrangements, control processes 88 performed by control system 206 are configured to adjust speed of a production line 202 and/or rate at which items are input to production line 202 based on the number of workers that worker detection system 204 detects present at the set of production equipment 202 at a given time.

Figure 25:
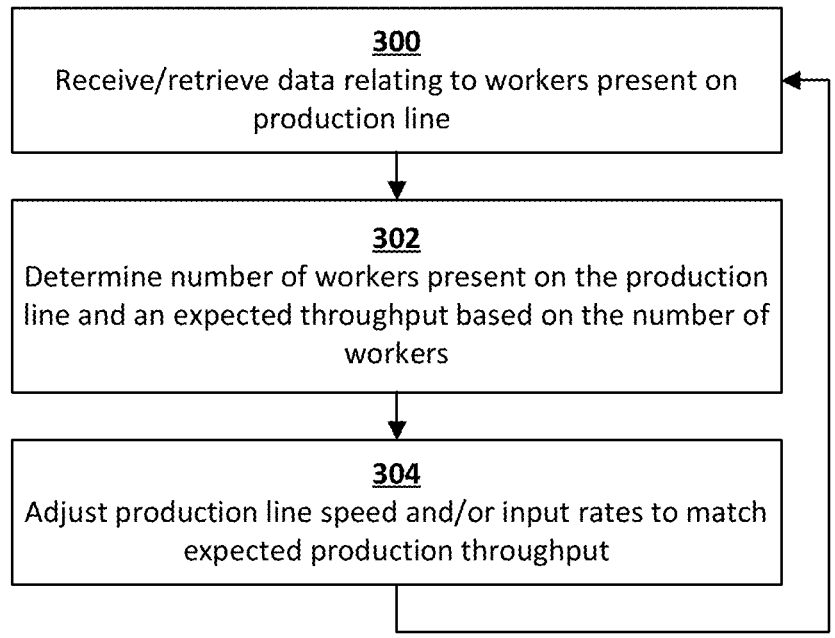
FIG. 25 shows a flow chart of an example process for controlling operation of a production line, in accordance with one or more embodiments.

FIG. 25 shows a flowchart for an example control process 88 for adjusting throughput of a production line 202, in accordance with one or more arrangements. At process block 300, control system 206 receives and/or retrieves data from worker detection system 204 relating to workers present on a production line 202. At process block 302, control system 206 determines a number of workers 102 currently present at the set of production equipment 202 and determines an expected throughput based on the determined number of workers. At process block 304, control system 206 adjusts speed of the production line 202 and/or rate at which input items to be processed are provided to the production line 202 to match the expected production throughput. In this example, the process proceeds to process block 300 following process block 304 and continues to loop in this manner during operation of the production line 202.

Figure 26:
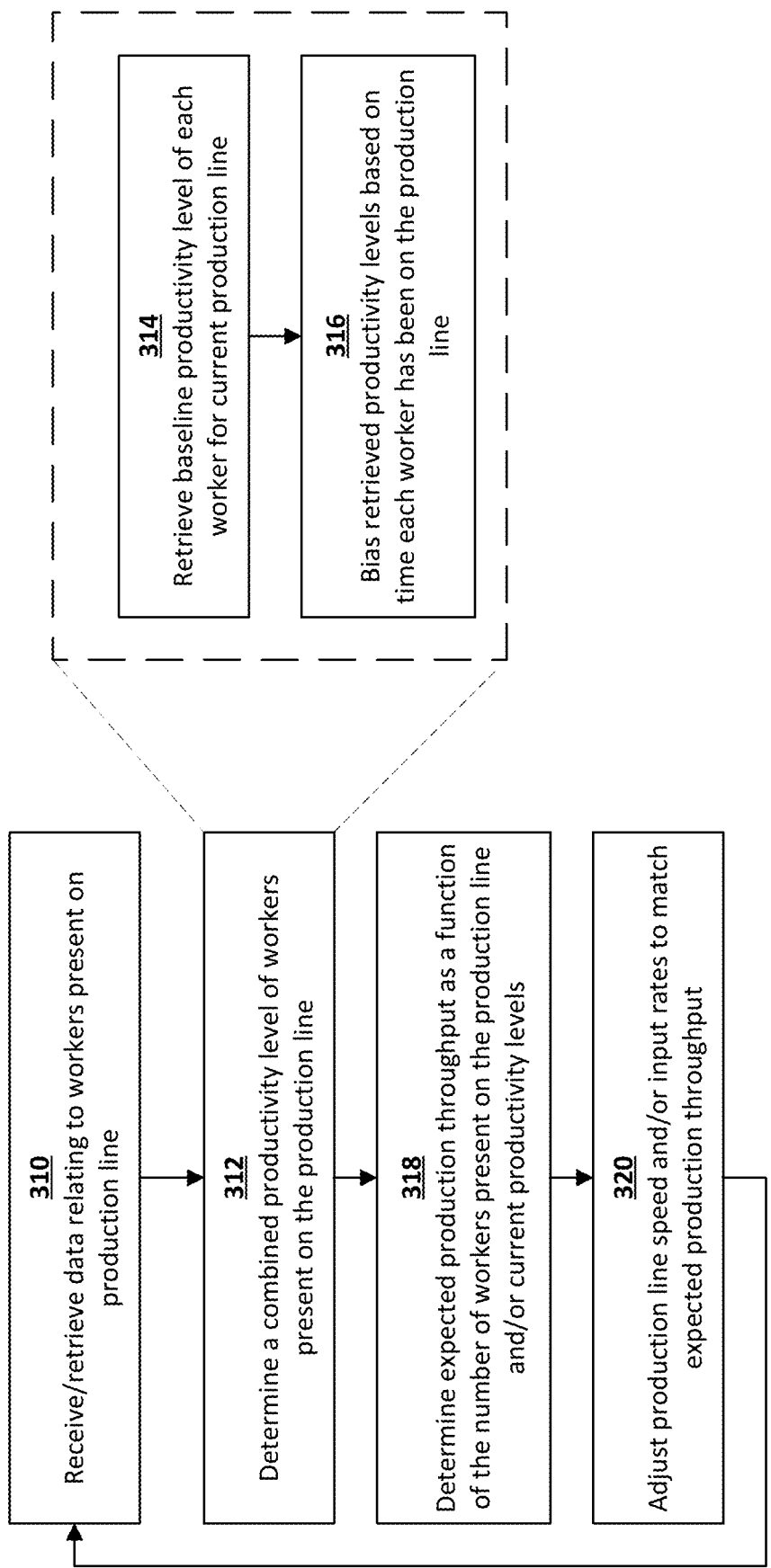
FIG. 26 shows a flow chart of an example process for controlling operation of a production line, in accordance with one or more embodiments.

FIG. 26 shows a flowchart for another example control process 88 for adjusting operation of a production line 202, in accordance with one or more arrangements. In this example control process 88, control system 206 is configured to additionally or alternatively adjust speed of production line 202 and/or rate at which items are input to production line 202 based on a productivity level of the workers 102 detected at the production line at a given time.

At process block 310, control system 206 receives and/or retrieves data from worker detection system 204 relating to workers present on a production line 202. At process block 312, control system 206 determines a combined productivity level of workers 102 currently present at the set of production equipment 202. In various different arrangements, control system 206 may determine productivity of workers 102 using various methods or means.

In some various different arrangements, productivity may be measured using various different data metrics including but not limited to, for example, quantities of items processed, processing time required per item processed, quality of work performed, and/or any other data metric. Quantities of items processed, processing time required per item processed, and/or quality of work performed may be determined automatically by a control system 206 (e.g., based on data gathered by various sensors) and/or may by an input to system (e.g., by a manager, quality control monitor, and/or other observer). In the context of meat production, as one illustrative example, control system 206 may automatically determine quality of work based on the size of cuts produced by workers, the amount of byproduct waste produced, the number of items rejected in a quality control inspection, or another of means or method for assessing quality of work.

In one or more arrangements, control system 206 may estimate productivity based on the amount of time the worker 102 has been working at the production line. Through careful observation, it has been observed that productivity of workers 102 typically varies over time. For example, productivity may increase as the worker 102 becomes accustomed to the task and then decrease slowly over time as the worker 102 becomes physically and/or mentally fatigued.

In some arrangements, control system 206 is configured to determine a productivity level for workers 102 by looking up productivity in a table (e.g., indicating productivity of an average worker over time). However, in this example arrangement shown, control system 206 is configured to may determine productivity for each worker individually based on historical productivity exhibited by the specific worker 102. At block 314, control system retrieves a respective baseline productivity for each worker 102 present on production line (e.g., from database 292).

In one or more arrangements, control system 206 is configured to determine baseline productivity of each worker 102 using data analytics. For example, in one or more arrangements, system 200 may be configured to track and store data indicating throughput of each production line 202 over time. In some arrangements, the system may determine baseline productivity of each worker 102 by cross correlating throughput history with data indicating time periods each worker 102 was working on each production line 202.

At block 316, control system 206 biases the retrieved baseline productivity levels based on the amount of time that the worker has been present at the set of production equipment. The amount that baseline productivity levels are biased by control system 206 may be determined, for example, using a table (e.g., from database 292). In some arrangements, such table may indicate bias amounts based on the typical shift of productivity of an average employee during a work shift. In some arrangements, control system 206 may use different bias tables for different production lines 202. In some arrangements, control system 206 may bias baseline productivity levels using a first amount specific to the specific production line 202 and a second amount determined for the specific worker 102. Any other method for biasing is also contemplated.

At process block 318, control system 206 determines an expected production throughput based on the combined productivity of the workers present at the set of production equipment. At process block 320, control system 206 adjusts speed of the production lines and/or rate at which input items to be processed are provided to the production line to match the expected production throughput. In this example, the process proceeds to process block 310 following process block 320 and continues to loop in this manner during operation of the production line 202.

Rotation of Workers:

It is recognized that it may be beneficial to rotate workers 102 between production lines, for example, to avoid injury due to repetitive movements, increase worker productivity, and/or rebalance workflow (e.g., to compensate for backlogs) among other reasons.

As an illustrative example, in some arrangements, control processes 88 of control system 206 may be configured to dynamically adjust rotation of workers 102 on demand, for example, to compensate for backlogs on a particular production line 202. For example, in one or more arrangements, production line 202 may have a bin 234 located at source end 226 to hold and queue input items before they are sent down the production line 202 for processing and/or assembly. In one or more arrangements, production line 202 may have an electronic scale sensor (not shown) configured to indicate the weight of the contents of bin 234. In response to the weight measured by the scale sensor indicating a backlog of items is developing in bin 234, control system 206 may prompt one or more workers to shift to the backlogged production line 202 to increase throughput and help alleviate the backlog.

Figure 27:
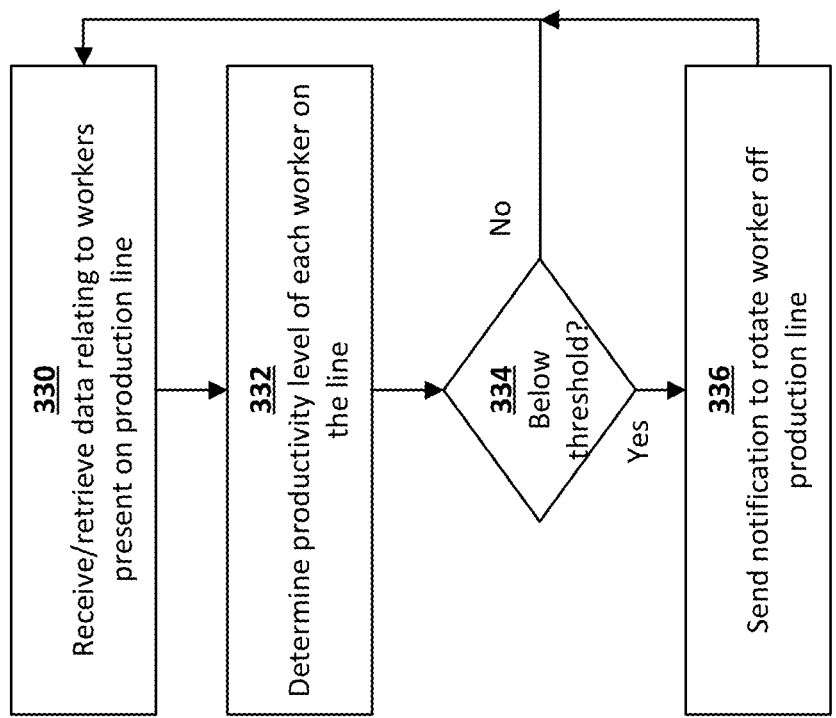
FIG. 27 shows a flow chart of an example process for managing work rotations of a worker, in accordance with one or more embodiments.
Figure 28:
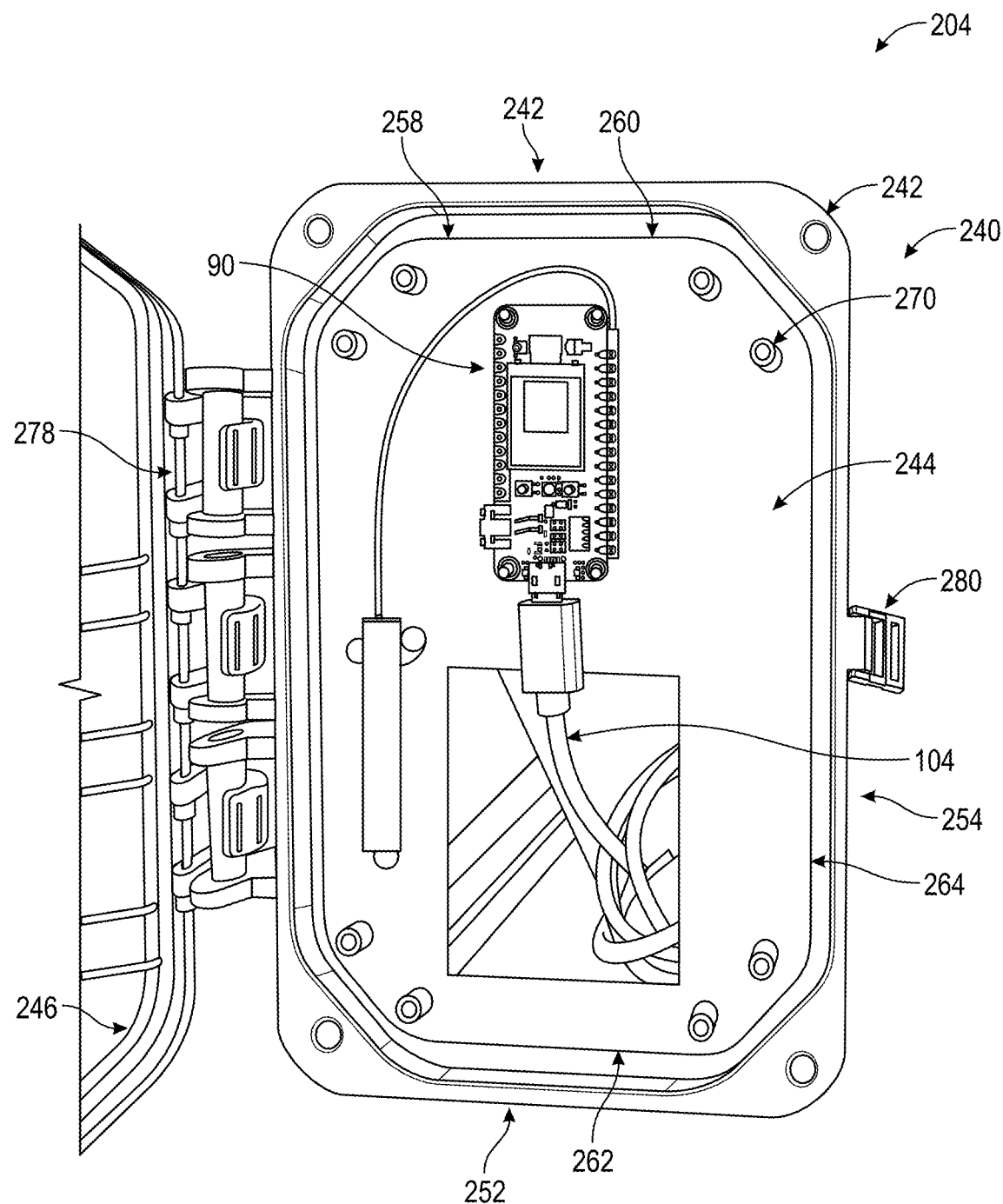
FIG. 28 shows a front left perspective view of an example worker detection system, in accordance with one or more embodiments; the view showing the worker detection system having a waterproof housing.
Figure 29:
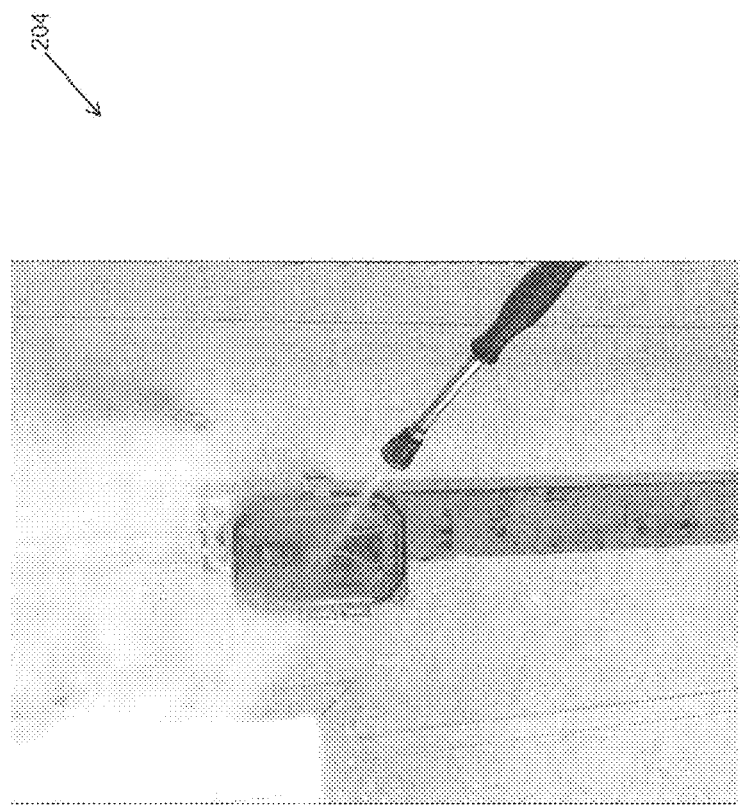
FIG. 29 shows a front left perspective view of an example worker detection system, in accordance with one or more embodiments; the view showing the worker detection system having a waterproof housing; the view showing the housing being cleaned with a high pressure sprayer.
Figure 30:
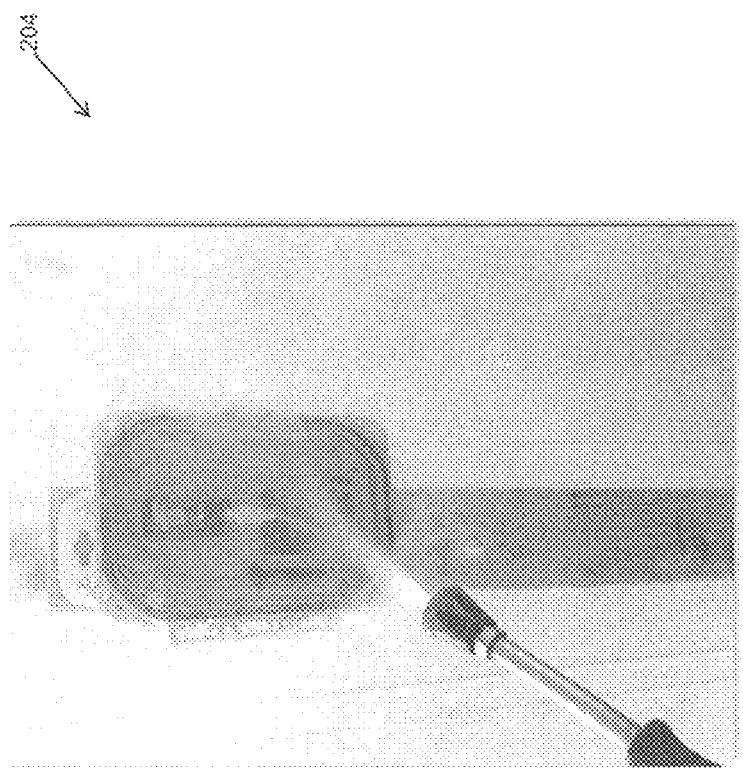
FIG. 30 shows a front view of an example worker detection system, in accordance with one or more embodiments; the view showing the worker detection system having a waterproof housing; the view showing the housing being cleaned with a high pressure sprayer.
Figure 31:
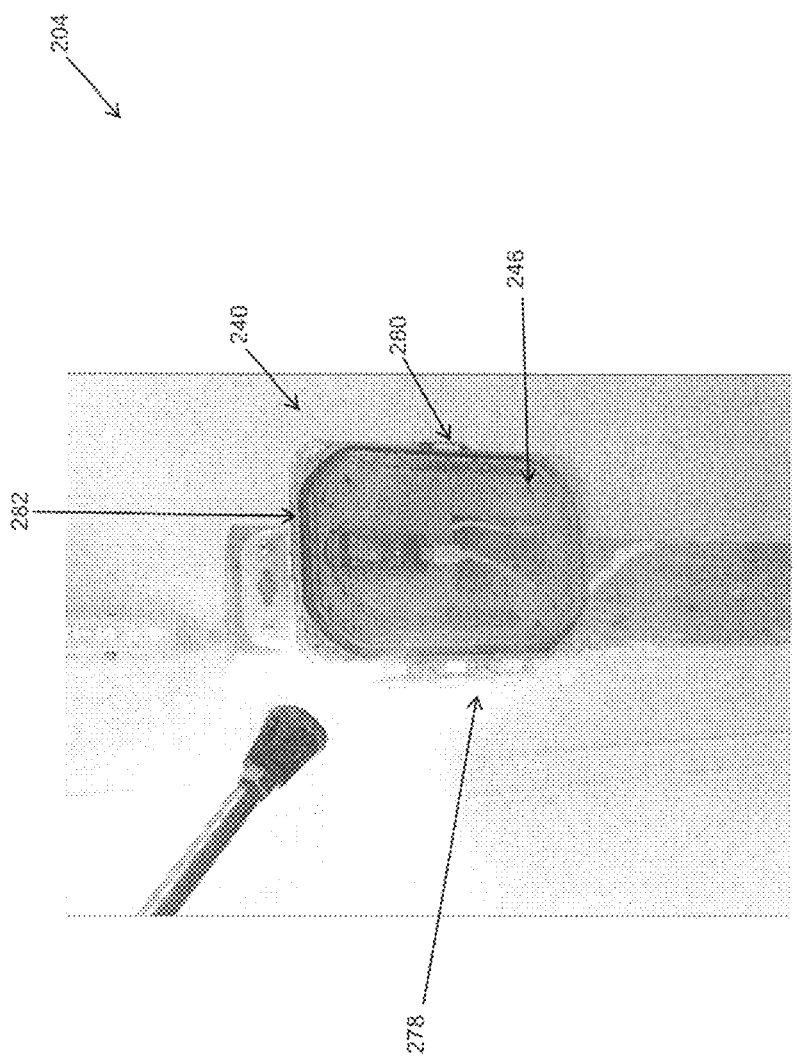
FIG. 31 shows a front view of an example worker detection system, in accordance with one or more embodiments; the view showing the worker detection system having a waterproof housing; the view showing the housing being cleaned with a high pressure sprayer.
Figure 32:
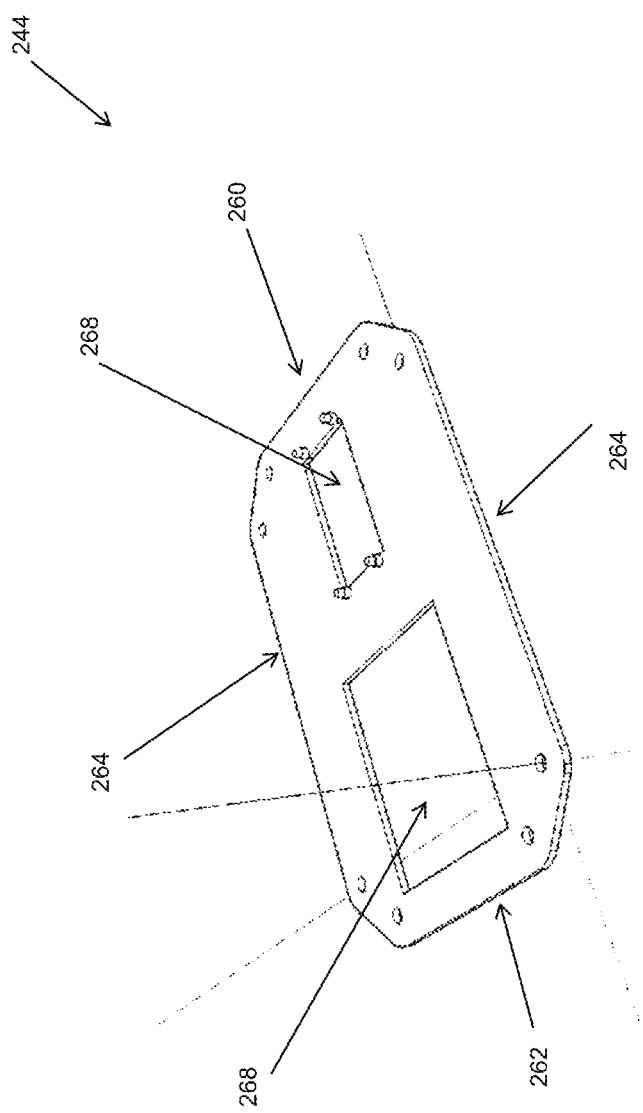
FIG. 32 shows a lower front left perspective view of a front plate for use in a housing of a worker detection system, in accordance with one or more embodiments.

Additionally or alternatively, in one or more arrangements control system 206 may be configured to manage rotation of workers 102 between production lines to maximize worker productivity. FIG. 27 shows an example control process 88 configured to manage rotation of workers 102 on to, off of, and/or between production lines 202, in accordance with one or more arrangements.

At process block 330, control system 206 receives and/or retrieves data from worker detection system 204 relating to workers present on a production line 202. At process block 332, control system 206 determines productivity levels of workers 102 currently present at the set of production equipment 202. Control system 206 may determine productivity of workers 102, for example, as described with reference to FIG. 26.

If the determined productivity of a worker is below a threshold level at decision block 334, control system 206 sends a notification or takes other action at process block 336 to cause worker 102 to be rotated off of the production line 202. In some various arrangements, notification may include but is not limited to, for example, audible alert, automated announcement, automated call, SMS, push notification, email, messaging on social networks, or any other means or methods for messaging). For instance, in one or more arrangements the notification may be sent to a production manager, who may then prompt the worker(s) to rotate off of the production line. Additionally or alternatively, in one or more arrangements, a notification may be sent directly to a worker to prompt the worker to rotate off of the production line. Following process block 336, or if the determined productivity of a worker is not below the threshold level at decision block 334, the process returns to 330. The process continues to loop in this manner during operation of production line 202.

Production Line-Specific Time Keeping:

In some industries, production facilities may include several different production lines on which workers 102 perform different tasks. Due to the different skills required, workers 102 on certain production lines 202 may be paid higher hourly rates than workers 102 on other production lines 202. For example, in meat processing, workers 102 who process higher value cuts are typically paid a higher rate than workers 102 who process lower value cuts.

However, in many production facilities, workers 102 may be frequently moved between several production lines as needed, for example, when throughput becomes backlogged at a particular processing stage. Due to the difficulty of tracking work performed with workers 102 moving between several production lines 202, workers 102 in many such facilities are paid at the rate of the highest paid production line 202 that they worked at any point in a work shift. Accordingly, a worker 102 on a lower paid production line 202 who is temporarily moved to a higher paid production line 202 for a short period is paid the higher rate for the entire work shift, thereby increasing production costs.

In one or more arrangements, worker detection system 204 and/or control system 206 are configured to track and store data indicating the times in which workers 102 worked on each production line 202 and calculate payroll based on the amount of time each worker 102 worked on each production line 202 (e.g. on a pro-rata basis). In this manner, workers 102 may accurately and fairly compensated for work on different production lines 202.

Geo Fencing Access Control:

In one or more arrangements, control processes 88 of control system 206 may be configured to control access to and/or operation of company resources based on geo-location of workers 102. For example, in one of more arrangements, control processes 88 are configured to control one or more remote locking devices 178 (not shown) to control access to and/or operation of company resources.

Remote locking devices 178 are formed of any suitable size, shape and design and are configured to prevent physical access to or use of company resources when in a locked state and permit physical access to or use of the company resources when in an unlocked state. Remote locking devices 178 may be used to restrict access and use of various company resources including but not limited to, for example, facilities, rooms, lockers, drawer, cabinets, elevators, doors, tools, machinery, computing systems, digital resources and/or phones to name a few. In the arrangement shown, remote locking device 178 has a communication circuit configured to wirelessly communicate (or over wired communication) with control system 206, safety devices 12, and/or other components via electronic network 104. In this example arrangement, remote locking device 178 also includes a locking mechanism. The locking mechanism is formed of any suitable size, shape and design and is configured to restrict access or operation to a particular resource in a locked state and permit access to the resource in the unlocked state.

In some various different arrangements, control processes 88 of control system 206 may control access to and/or operation of company resources using various processes. In one or more arrangements, control processes 88 of control system 206 is configured to monitor geolocation of workers 102 using data gathered from wearable devices 12 during a work shift and perform various operations in response to workers being in specific locations.

In some various different arrangements, geolocation of workers 102 may be monitored using various means and/or methods. For instance, in one or more arrangements, wearable devices 12 of workers 102 are configured to periodically and/or continuously communicate data to control system 206 indicating geolocation of wearable devices 12 of workers 102. Additionally or alternatively, in one or more arrangements, control system 206 may be configured to monitor geolocation of workers by receiving notifications when wearable devices 12 are in close proximity to various device (e.g., remote locking devices 178)

In one or more arrangements control processes 88 maintain a set of rules in a database 68/250 listing of geographic locations or zones and actions to be performed when workers 102 are determined to be located in the specific geographic locations or zones. Rules may be modified by an authorized user via user interface 106, for example. As one illustrative example, the rules in database 68/250 may cause control processes 88 to cause a remote locking device 178 to turn off and/or disable an inherently dangerous machine in response to geolocation data indicating a worker 102 is in close proximity to the machine.

In one or more arrangements, control processes 88 of control system 88 may be configured to perform different actions or provide different levels of access to different workers 102. For example, in one or more arrangements, control processes 88 are configured to maintain a listing of workers 102 and respective access and use permission in database 68/250. Permitted accesses and uses may be modified by an authorized user via user interface 106, for example. As one illustrative example, in one or more arrangements control processes 88 are configured to provide user specific access to company resources.

As one example implementation, when a safety device 12 is in close proximity to remote locking device 178 while in a locked state, safety device 12 transmits the unique ID 44 of the safety device 12 to remote locking device 178. In response to receiving the unique ID 44, remote locking device 178 sends a query to control processes 88 of control system 206 to determine if the worker 102 associated with the unique ID 44 should be granted access. In response to receiving the query, control processes 88, determine the worker 102 associated with unique ID 44 and then determines from database 68/250 if the worker 102 has permission to access the resource associated with the remote locking device 178. Control processes 88 of control system 206 then provides a response to the remote locking device 178 indicating whether or not the worker 102 is to be permitted access. If the response indicates that the worker 102 is permitted access, the remote locking device 178 transitions to the unlocked state remains in the locked state. Otherwise, the remote locking device 178 remains in the locked state.

When transitioning to the unlocked state, some remote locking devices 178 may remain in the unlocked state for a certain period of time. For example, a remote locking device 178 connected to a door, may transition to an unlocked state for 5 seconds to permit a permitted worker 102 to open the door. Conversely, some remote locking devices 178 may be configured to remain in the unlocked state while the safety device 12 having the unique ID 44 remains in close proximity. For example, a remote locking device 178 connected to a milling machine, may remain unlocked to permit use by an authorized worker.

In one or more arrangements, control processes 88 of control system 88 are configured to track training and/or certification status of workers for use of certain machines and/or equipment. For example, workers may be required to complete yearly safety training to operate potentially dangerous machines. In one or more arrangements, control processes 88 may be configured to automatically update access control permission for worker in response to changes in training and/or certification status. For example, control processes 88 may update access control permissions to deny a worker access to a particular machine in response to determining that a certification of the worker has expired. Conversely, control processes 88 may update access control permissions to permit the worker access to the machine in response to determining that the worker has been recertified.

Other Actions Based Data Gathered by Wearable Devices 12:

One benefit of using wearable devices 12 to detect presence of workers 102 is that control system 206 may additionally or alternatively control operation of various other production equipment and/or devices based on data gathered by various sensors 30 of wearable devices 12 and/or data metrics derived therefrom. For example, in one or more arrangements, control system 206 may be configured to generate control signals and/or control switching of one or more relay switches (not shown) in response to detection of wearable devices 12, and/or based on sensor data gathered by such wearable devices 12. Such control signals and/or relay switches may be configured to control operation of various devices (e.g., lights, alarms, locks, doors, and/or any other devices) based on presence of and/or data received from wearable devices 12.

As an illustrative example, in one or more arrangements, control system 206 is configured to control a relay switch connected to a door lock to control access to a restricted area. For example, in one or more arrangements, control is initiated by detection of a wearable device 12 by a worker detection system 204 having a sensor or a short range communication circuit (e.g. communication circuit 92 of logic circuit 90) that is configured to communicate with a wearable device 12 of a worker 102 when the worker 102 is in close proximity to the door.

To access the door, the worker 102 holds their wearable device 12 up to worker detection system 204. This causes wearable device 12 to communicates data identifying the worker to the worker detection system 204. Worker detection system communicates the data to control system 206. In this illustrative example, in response to receiving the data, worker detection system 204 determines what equipment is controlled by the worker detection system 204, actions to be performed, criteria for performing such actions, and required permissions to perform such action. In this example, control system 206 determines that the worker detection system 204 controls a relay for the door lock and determines that the identified worker 12 has permissions required for access. Accordingly, control system 206 causes relay to unlock the door for a period of time to permit the worker 102 to open the door. If the control system 206 determines the worker 102 does not have required permissions, the control system 206 does not cause relay to unlock the door. Additionally, in one or more arrangements, control system may perform various additional actions including but not limited to, providing an indicator to indicated access approved and/or denied, logging access or access attempt, notifying security, and/or any other action and/or process.

Identifying High Risk Events:

In one or more arrangements, analytics processes 80 are configured to process information received from wearable devices 12 and/or data stored in database 68 to derive additional data metrics pertinent to assessment of safety risk of workers 102. In an example arrangement, analytics processes 80 may be configured to evaluate the data using a classifier or state machine that is trained to identify high risk events (e.g. accidents, trips/falls, near misses, and/or other events indicative of injury or heightened safety risk) that are not directly identified and reported by wearable devices 12. In one or more arrangements, control system 206 may be configured to shut down a production line 202 in response to a wearable device of a worker 102 at the production line 202 indicating an accident has occurred.

Analytics Processes 80:

In some example arrangements, data processing system 70 and/or data processing system 290 may be configured to perform various tracking, analytics processes 80, and/or other operations described using data received from wearable devices 12 and/or data stored in database 68 and/or database 292. In the example arrangement shown in FIG. 3, data processing system 70 is illustrated as being separate from management software 108 and user interface 106. However, the embodiments are not so limited. In various implementations, analytics processes 80 may be executed alongside management software 108 and user interface 106 on data processing system 70. Additionally or alternatively, data analytics 80 and/or other processes performed by data processing system 70 and/or 290 may in whole or in part be incorporated into and form part of management software 108.

Repetitive Motion Identification and Assessment:

In yet another example arrangement, analytics processes 80 are configured to analyze data of accelerometer 32 to identify repetitive motions which may lead to injury over time. Identification of repetitive motions may be helpful to identify performance of tasks that have a higher risk of injury. Identification of such tasks may be useful in assessing safety risk faced by a worker during a work shift and determining how different durations of work shifts on different production lines affects worker productivity.

Additionally, identification of repetitive motions may be helpful to facilitate development and execution of measures to avoid such injury and/or optimize worker rotation schedules. In this example arrangement, analytics processes 80 may be configured to regularly retrieve accelerometer 32 data of workers 102 from database 68 for evaluation (e.g., daily, weekly, or monthly). After retrieving the data, analytics processes 80 processes the data using, for example a classifier or state machine that is trained to detect and group similar motion events.

In an example arrangement, after processing the data to identify similar motion events, analytics processes 80 determines a set of workers 102 in which a motion or similar group of motions is identified with high number of occurrences (e.g., exceeding a specified threshold). In this example arrangement, analytics processes 80 then flag the task performed by the workers 102 as a high risk activity.

In one or more arrangements, analytics processes 80 are configured to quantify the level of repetitive motions performed by a worker. For example, In one or more arrangements, analytics processes 80 may be configured to quantity repetitive motions based on the number of instances that a worker 102 performs the identified repetitive motions in a certain period of time (e.g., day, week, month). In some various arrangements, the analytics processes 80 may generate reports, e.g., tables, charts, graph, maps, showing the quantified repetitive motion, for example, for different jobs, workplace areas, different departments, groups and/or individual workers, and/or different shifts or times of day.

Physicality Assessment:

In yet another example arrangement, analytics processes 80 are configured to analyze data provided by sensors 30 to assess the physical exertion of workers 102. Jobs requiring high levels of physical exertion may be more likely to result in injury or require more frequent rotation between production lines 202. Identification of repetitive motions may be helpful to identify jobs requiring high levels of physical exertion. In this example arrangement, analytics processes 80 are configured to quantify the total physicality of tasks performed by workers 102 based on heart rate, temperature, perspiration level, number of steps, distance traveled, accelerometer data, and/or other data acquired by sensors 30 or determined by analytics processes 80 using data analytics (e.g., the determined repetitive motion quantification). In some various arrangements, the analytics processes 80 may generate and store data metrics indicating instances in which a worker 102 exhibits high levels of physical exertion during a work shift. Such data metrics may be useful in assessing safety risk faced by a worker 102 during a work shift, assessing worker 102 productivity, and/or determining work rotation schedules.

Optimizing Teams and Positioning of Workers:

It is recognized that for various different reasons that may or may not be discernable by management, certain grouping of workers may be more productive when working together than other grouping of workers. For instance, some workers may have complementary personalities and/or skills that increase productivity when the workers are paired together.

It is further is recognized that for various different reasons that may or may not be discernable, productivity of workers may vary depending on where workers are positioned on a production line. As one example, a left handed worker and a right handed worker may get in each other's way when the left handed worker is positioned to the right of the right handed worker. As another example, one worker may be more productive at tasks involved with the initial break down of poultry while another worker may be more productive at tasks involved with the further break down of poultry.

In one or more arrangements, analytics processes 80 are configured to analyze productivity and/or other data of gathered during operation of the production line to identify more productive groupings and positioning of workers on one or more production lines. In one or more arrangements, analytics processes 80 may generate a report indicating groupings and/or positionings of workers 102 that are identified as being more productive. In some arrangements, the analytics processes 80 may send the report to a manager for review. Such reports may be useful, for example, in scheduling work assignments and worker rotation schedules.

Deviation from Similar Workers

In one or more arrangements, analytics processes 80 are configured identify workers 102 in which recorded information and/or data metrics deviates from that of other workers having the same primary occupation. Such identification of workers 102 may be useful for example to identify workers 102 whose safety risk may be atypical and not accurately represented by the average risk for the workers primary occupation. In one or more arrangements, analytics processes 80 may generate a report indicating workers 102 for which deviations have been identified. In some arrangements, the analytics processes 80 may send the report to a manager or insurer for review. Such reports may be useful, for example, to assess reasons for higher or lower productivity of certain workers.

Trend Analysis:

It is recognized that workers 102 tend to experience increased risk over time, often due to changes in their work environment and/or long hours in difficult conditions. As an illustrative example, a worker 102 may being to regularly work in low lighting at the end toward of a long shift. Such low lighting may present risk of fatigue and increase risk of injury. In one or more arrangements, analytics processes 80 are configured track values of the worker data stored in database 68 to identify when trends occur. In one example arrangement, in response to identifying a trend in the data, analytics processes 80 update data metrics and/or risk assessments for the worker. Additionally or alternatively, in response to identifying a trend in the data, analytics processes 80 trigger recalculation of worker rotation schedules and/or prompt control system to perform various other actions to adjust operation of one or more production lines 202.

Machine Learning:

In one or more embodiments, data processing systems 70 and/or 290 and/or other components of system 200 may be configured and arranged to monitor, learn, and modify one or more features, functions, and/or operations of the system. For instance, data processing system 70 and/or 290 may be configured to monitor and/or analyze data stored in database 68 and/or 292 and/or operation of system 200. As one example, in one or more arrangements, data processing systems 70 and/or 290 may be configured to analyze the data and learn, over time, data metrics indicative of different activities or tasks that may be performed by workers 102 in addition to their primary duties during a work shift. Such learning may include, for example, generation and refinement of classifiers and/or state machines configured to map input data values to outcomes of interest or to operations to be performed by the system 200. In various embodiments, analysis by the data processing system 70 and/or 290 may include various guided and/or unguided artificial intelligence and/or machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

User Interface:

In one or more arrangements, worker detection system 204 and/or production line control system 206 may provide one or more user interfaces 106 to facilitate access and evaluation of data collected from wearable devices and analytics derived therefrom and/or configure settings and/or operation of system 200 components. In one or more arrangements, user interface 106 and/or other processes may be configured to provide one or more dashboard interfaces to facilitate review and/or evaluation of information and/or data metrics received or derived by worker detection system 204 and/or control system 206 indicative of physicality and/or safety risks of faced by workers 102.

FIGS. 33-36 show screen shots of some example dashboard interface, consistent with one or more arrangements. In this illustrative example, user interface 106 provides a number of various different tools to facilitate review and/or evaluation of information and/or data metrics received from and/or generated by worker detection system 204 and/or control system 206.

Figure 33:
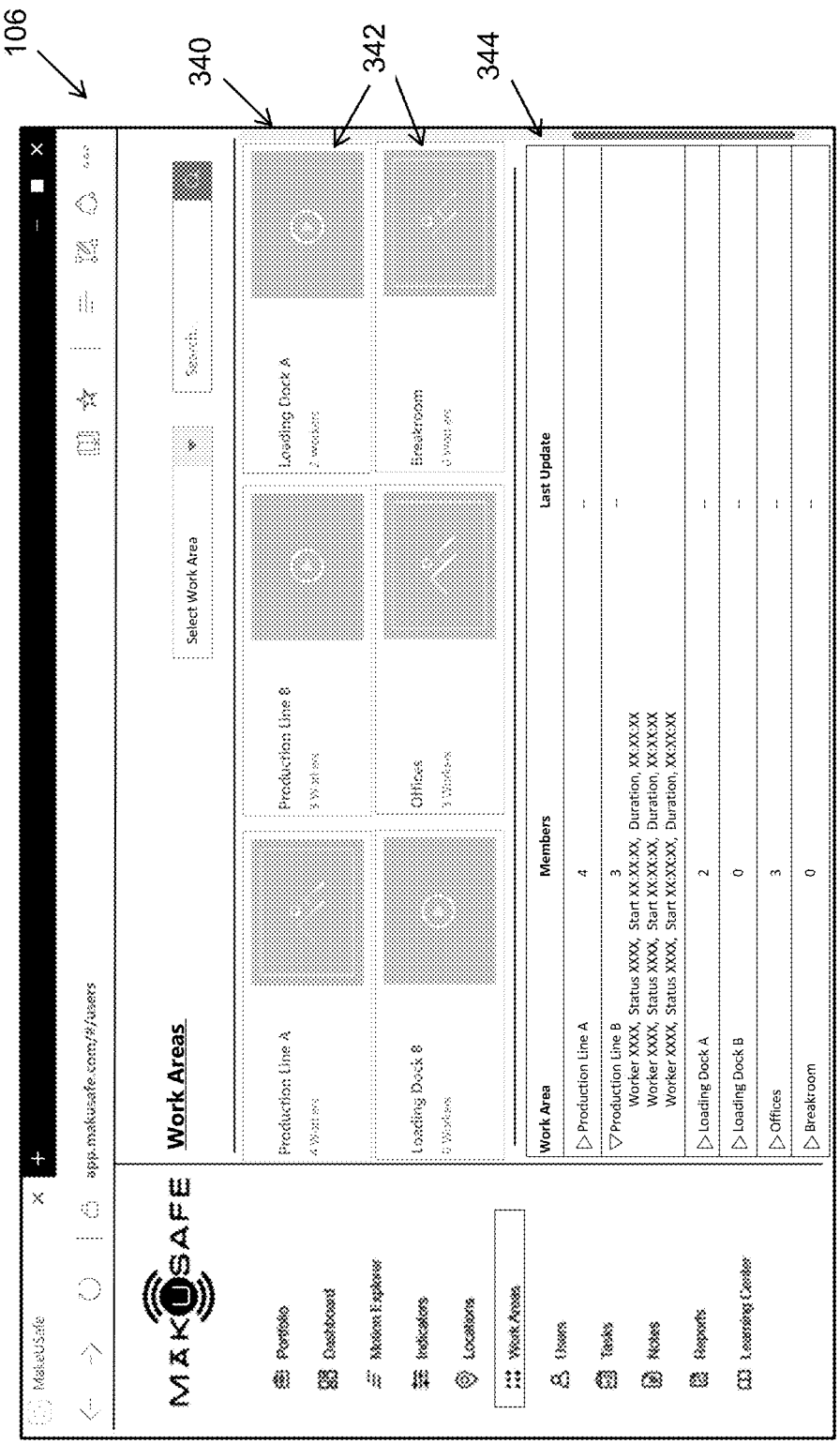
FIG. 33 shows a screenshot of an example user interface, in accordance with one or more embodiments, the view showing the user interface providing a Work Areas tool summarizing work areas in a production facility.

FIG. 33 shows an example "Work Areas" tool provided by user interface dashboard configured to facilitate review of workers 102 present in each work area in a specified period of time. In this example arrangement, the Work Areas tool includes an upper display panel 340 having tile summaries 342 for each work area. In this example arrangement, the tile summaries indicate a name or identifier for each work area, the number of users/workers in the work area, and a visual representation of the work area. In this example arrangement, some tiles includes an image/photo of the work area while some other tiles include a video display of the work area.

In this example arrangement, the Work Areas tool has a lower display panel 344 having collapsible lists of workers 102 determined to be located in each work area. In this example arrangement, the Work Areas tool lists workers 102 present in each work area along with the time at which the worker 102 was detected to be present in the work area and how long they have been working in the work area. In this example arrangement, the Work Areas tool permits a user to select criteria to filter and/or sort worker entries and/or work areas displayed.

Figure 34:
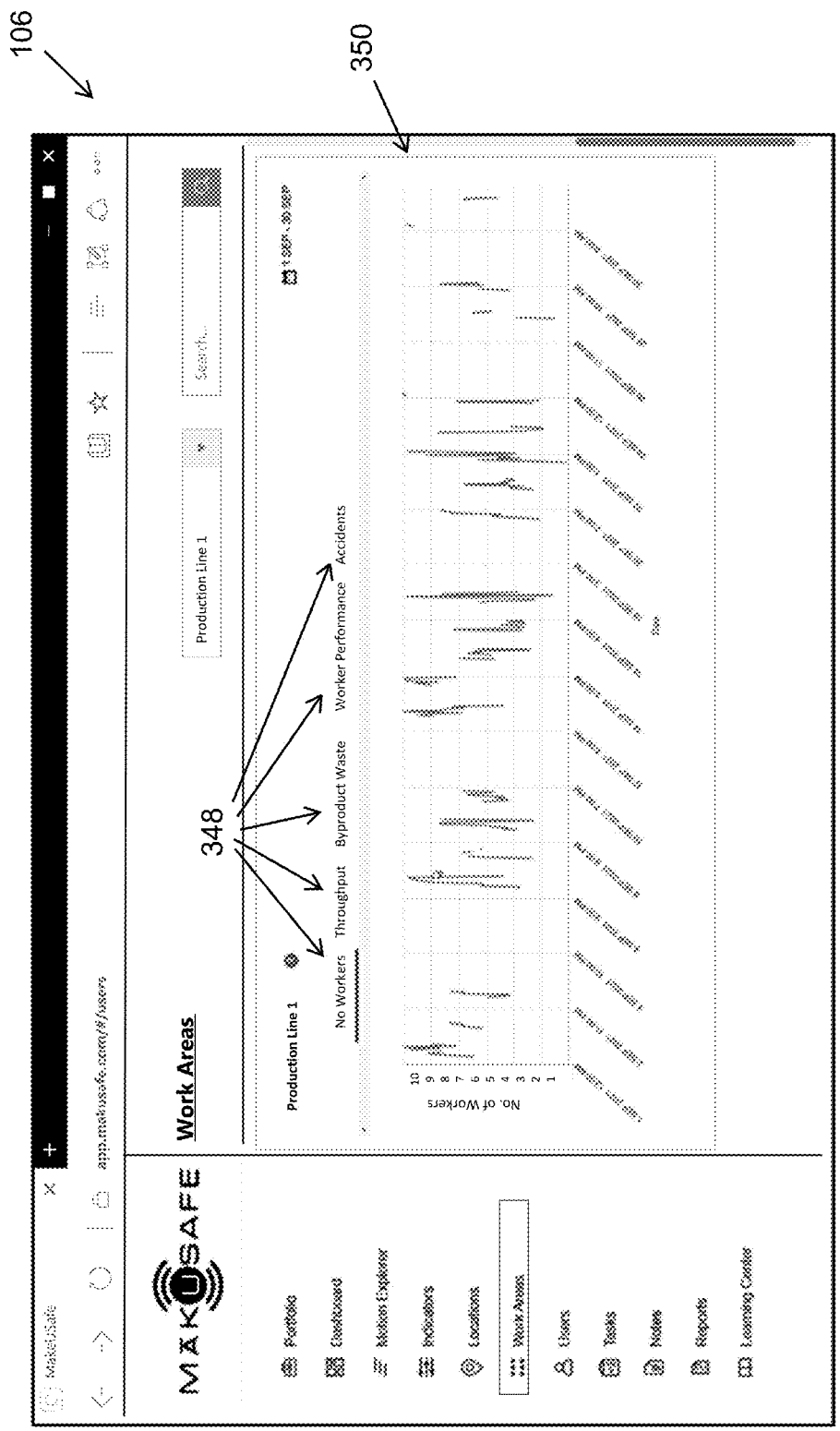
FIG. 34 shows a screenshot of an example user interface, in accordance with one or more embodiments, the view showing the user interface providing Work Areas tool summarizing data collected for an example selected work area; the user interface having selection tabs for viewing data characterizing the number of workers, throughput, product waste, worker performance, and accident history on the selected work area.

FIG. 34 shows a screenshot of an example user interface provide by the Work Areas tool for display of various information pertaining to a selected work area, in accordance with one or more embodiments. For example, in one or more arrangements, the Work Areas tool may provide the user interface shown in FIG. 34 in response to a user selecting a specific work area from the user interface shown in FIG. 33 (e.g., by clicking on a summary tile 342 of a work area in the upper display panel 340).

In this example arrangement, the user interface shown in FIG. 34 have a set of selection tabs 348 for viewing data characterizing the number of workers, throughput, product waste, worker performance, and accident history on the selected work area. In this example arrangement, the selection tabs 348 are positioned along a top edge of a display panel 350. Upon selection of a particular selection tab 348 by a user, the selected data is displayed in the display panel 350. In the example arrangement shown, the display panel 350 shows a historical graph of the number of workers present in the selected work area over time. In this example arrangement, a user may similarly display throughput, byproduct waste, worker performance, and detected accidents for the work area by clicking on the other selection tabs 348.

Figure 35:
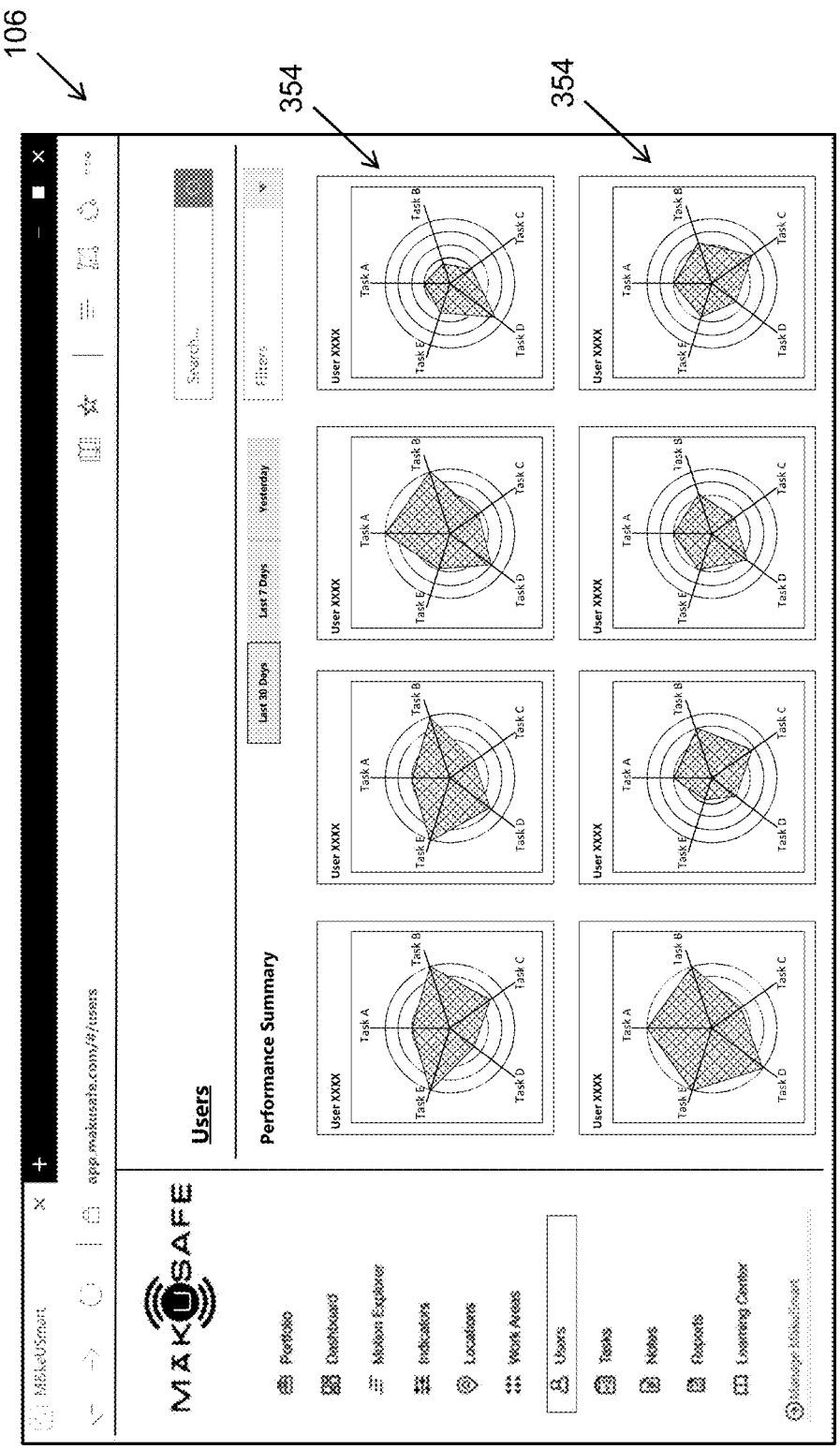
FIG. 35 shows a screenshot of an example user interface, in accordance with one or more embodiments, the view showing the user interface providing a Users tool summarizing data for individual users/workers in a production facility.
Figure 36:
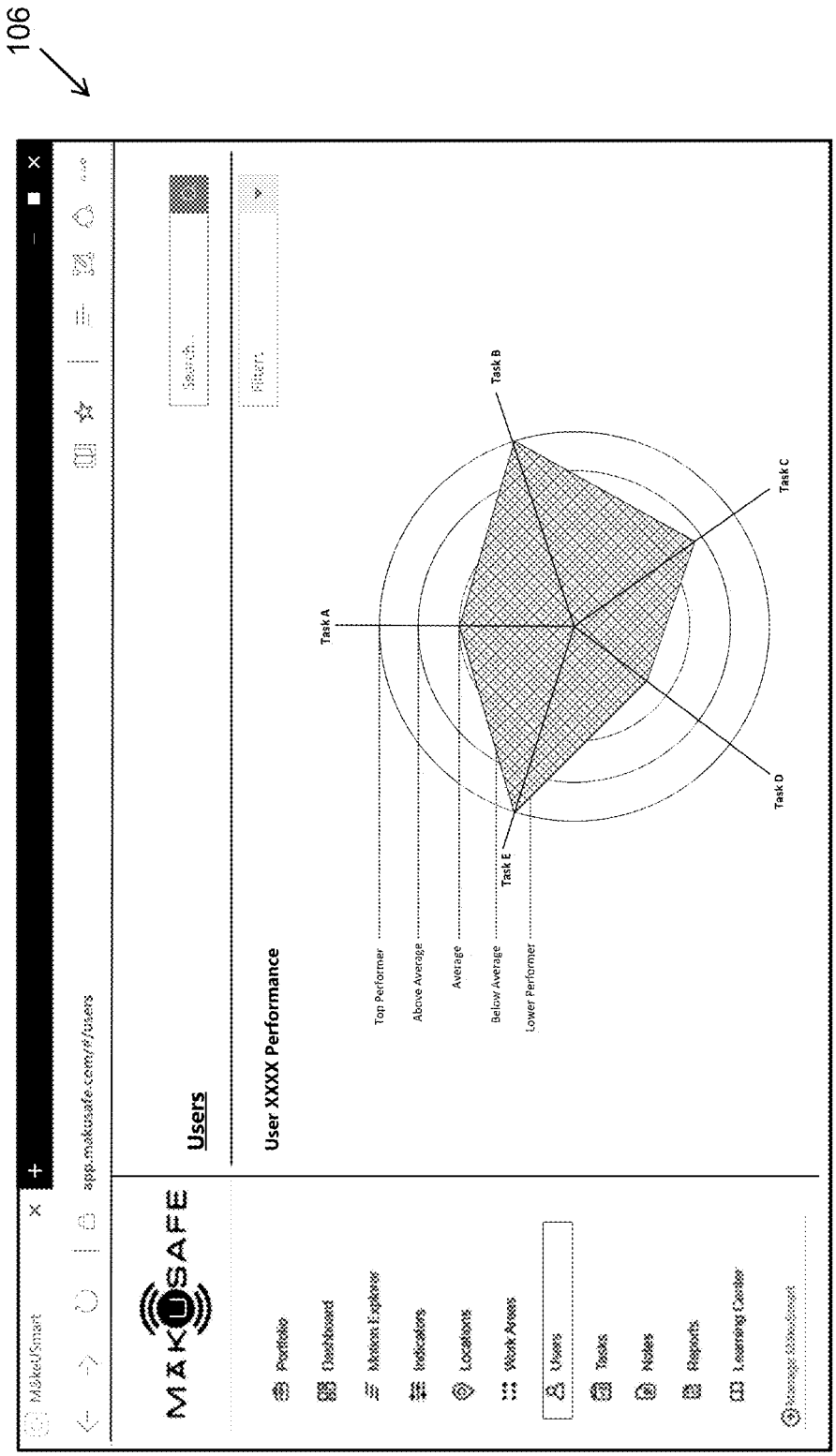
FIG. 36 shows a screenshot of an example user interface, in accordance with one or more embodiments, the view showing the user interface providing a summary of performance of a selected worker/user for a number of work areas and/or tasks in a production facility.

FIG. 35 shows an example "Users" tool provided by user interface dashboard that is configured to provide access to information and analytics for individual workers 102. In this example, the Users tool includes a performance summary interface to facilitates review of performance rating of workers 102 for various tasks/work areas. In this example, the Users tool display a performance summary tile 354 for each worker 102. In this example, the performance summary tiles 354 show a graphical representation of performance ratings of the worker 102 for various tasks/work areas. In this example, the Users tool includes a search bar to permit a reviewer to search for particular workers. In this example, the Users tool also includes a interfaces to select date ranges for calculation of performance rations and/or filter performance rations to be displayed (e.g., user selected tasks/work areas. In one or more arrangements, a user may click on a performance summary tile 354 for a worker 102 to display a more detailed view of performance rating, for example as shown in FIG. 36.

However, the arrangements are not so limited to the illustrative example interfaces shown in FIGS. 33-36. Rather, it is contemplated that in some various arrangements, the user interface 106 may additionally or alternatively display or provide access to various other information, data metrics, and/or analytics collected and/or derived by system 200 and/or in various other listings, summaries, and/or representations. From the above discussion, it will be appreciated that one or more arrangements provide a wearable device, system, and/or method of use presented improves upon the state of the art. Specifically, one or more arrangements provide a wearable device, system, and/or method for controlling operation of one or more production lines: that improves upon the state of the art, that optimizes operation, that managing operation of one or more production lines using a worker detection system; that monitors workers working at the production line; that monitors workers working at the production line using wearable devices;

that adjusts speed of a production line based on a number of workers present at the set of production equipment; that adjusts speed of a production line based on the productivity of workers present at the set of production equipment; that optimizes rotation of workers between multiple production lines; that tracks time workers worked on the various production lines; that aggregates a great amount of information about the work performed by workers and workplace conditions; that eliminates bias in the collection of information about the work performed by workers and workplace conditions; that more accurately assesses risk during a work shift; that eliminates the inconsistency in reporting information about the work performed by workers and workplace conditions; that analyzes data gathered to assess risk posed to workers at multiple times throughout a work shift; that aggregates a great amount of information indicative of work performed by workers and workplace conditions to facilitate data analytics; that assesses gathered data indicative of work performed by workers and workplace conditions to facilitate assessment of safety risks faced by workers during a work shift; that assesses gathered data indicative of work performed by workers and workplace conditions to facilitate optimization of throughput on one or more production lines; that is cost effective; that is safe to use; that is easy to use; that is efficient to use; that is durable; that is robust; that can be used with a wide variety of manufacturing facilities; that is high quality; that has a long useful life; that can be used with a wide variety of occupations; that provides high quality data; that provides data and information that can be relied upon; that allows for companies to compare the safety of their facilities to other facilities inside the same company and outside the company to determine how safe or efficient their facilities are in comparison; and/or that monitors physical exertion exhibited by workers during a work shift among countless other advantages and improvements.

These and countless other objects, features, or advantages of the present disclosure will become apparent from the specification, figures, and claims.

What is claimed:

1. A system for controlling a production line, comprising:
    a set of production equipment;
    a plurality of wearable devices configured to be worn by workers during a work shift;
    a worker detection system;
    wherein the worker detection system is configured to detect a presence of the workers on the set of production equipment by detecting the plurality of wearable devices;
    a control system;
    the control system communicatively connected to the worker detection system;
    wherein the control system is configured to receive data indicative of workers present at the set of production equipment from the worker detection system;
    wherein the control system is configured to perform data analytics on the received data to determine a physicality rating of the work performed by one or more of the workers; and
    wherein the control system is configured to adjust a rotation schedule for moving the workers to and from the set of production equipment based on the determined physicality rating.

2. The system of claim 1, wherein the control system is configured to track a number of workers present at the set of production equipment;
    wherein the control system is configured to adjust the speed of the set of production equipment as a function of the number of workers present at the set of production equipment.

3. The system of claim 1, wherein the control system is configured to track a duration of time each worker has been present at the set of production equipment;
    wherein the control system is configured to, in response to determining the duration of time one of the workers has been present at the set of production equipment exceeds a predetermined threshold, send a notification to the worker to prompt the worker to move to a different set of production equipment.

4. The system of claim 1, wherein the control system is configured to track a duration of time each worker has been present at the set of production equipment;
    wherein the control system is configured to, in response to determining the duration of time one of the workers has been present at the set of production equipment exceeds a predetermined threshold, send a notification to a manager to prompt the worker to move to a different set of production equipment.

5. The system of claim 1, wherein the worker detection system is configured to track geolocation of the plurality of wearable devices.

6. The system of claim 1, wherein the worker detection system is configured to track geolocation of the plurality of wearable devices;
    wherein the control system is configured to control access to or operation of one or more company resources based on the geolocation of the plurality of wearable devices.

7. The system of claim 1, wherein the worker detection system is configured to track geolocation of the plurality of wearable devices:
    wherein the control system is configured to determine access permissions of a worker in response to the geolocation the plurality of wearable devices indicating the worker is within a threshold in close proximity to a company resource;
    wherein the control system is configured to enable operation of the company resource in response to determining access permissions of the worker include access to the company resource.

8. The system of claim 1, wherein the worker detection system is configured to track geolocation of the plurality of wearable devices;
    wherein the control system is configured to determine access permissions of a worker in response to the geolocation the plurality of wearable devices indicating the worker is within a threshold proximity to a company resource;
    wherein the control system is configured to disable operation of the company resource in response to determining access permissions of the worker do not include access to the company resource.

9. The system of claim 1, wherein the plurality of wearable devices each have one or more sensors;
    wherein the data received by the control system includes data recorded by the one or more sensors of the plurality of wearable devices;
    wherein the control system is configured to shut down the set of production equipment in response to the received data recorded by the one or more sensors of one of the plurality of wearable devices for a worker present at the set of production equipment indicating an accident has occurred.

10. The system of claim 1, wherein the plurality of wearable devices each have one or more sensors;
wherein the control system includes:
a database;
the database configured to receive and store the data recorded by the one or more sensors of the plurality of wearable devices;
a data processing system;
the data processing system communicatively connected to the database;
the data processing system configured to determine control operation of the set of production equipment as a function of the data stored in the database.

11. The system of claim 1, wherein the plurality of wearable devices each have one or more sensors;
wherein the data received by the control system includes data recorded by the one or more sensors of the plurality of wearable devices;
wherein the control system is configured to perform data analytics on the received data to determine an optimal schedule for rotation of the workers on to and off of the set of production equipment.

12. The system of claim 1, wherein the plurality of wearable devices each have one or more sensors;
wherein the data received by the control system includes data recorded by the one or more sensors of the plurality of wearable devices;
wherein the control system is configured to evaluate the received data to identify accidents,
trips, or falls that occur during the work shift of the worker and shut down the set of production equipment in response to identifying accidents, trips, or falls.

13. The system of claim 1, wherein the plurality of wearable devices each have one or more sensors;
wherein the data received by the control system includes data recorded by the one or more sensors of the plurality of wearable devices;
wherein the control system is configured to perform data analytics on the received data to identify repetitive motions of the worker; and
adjust a rotation schedule for moving the workers between different sets of production equipment to avoid injury due to the repetitive motions.

14. The system of claim 1, wherein the plurality of wearable devices each have one or more sensors;
wherein the data received by the control system includes data recorded by the one or more sensors of the plurality of wearable devices;
wherein the control system is configured to perform data analytics on the received data to identify grouping of workers that are more productive when working together.

15. The system of claim 1, wherein the plurality of wearable devices each have one or more sensors;
wherein the data received by the control system includes data recorded by the one or more sensors of the plurality of wearable devices;
wherein the control system is configured to perform data analytics on the received data to identify positions of workers on the set of production equipment that are more productive.

16. The system of claim 1, wherein the plurality of wearable devices each have one or more sensors;
wherein the data received by the control system includes biometric data recorded by the one or more sensors of the plurality of wearable devices;
wherein the control system is configured to perform data analytics on the biometric data to determine the physicality rating.

17. The system of claim 1, wherein the plurality of wearable devices each have one or more sensors;
wherein the data received by the control system includes motion data recorded by the one or more sensors of the plurality of wearable devices;
wherein the control system is configured to perform data analytics on the motion data to determine the physicality rating.

18. The system of claim 1, wherein the plurality of wearable devices each have one or more sensors;
wherein the data received by the control system includes accelerometer data recorded by the one or more sensors of the plurality of wearable devices;
wherein the control system is configured to perform data analytics on the accelerometer data to determine the physicality rating.

19. The system of claim 1, wherein the set of production equipment includes a production line.

20. A system for controlling a production line, comprising:
a set of production equipment;
a plurality of wearable devices configured to be worn by workers during a work shift;
a worker detection system;
wherein the worker detection system is configured to detect a presence of the workers on the set of production equipment by detecting the plurality of wearable devices;
a control system;
the control system communicatively connected to the worker detection system;
wherein the control system is configured to receive data indicative of workers present at the set of production equipment from the worker detection system;
wherein the control system is configured to determine productivity levels of the workers present at the set of production equipment;
wherein the control system is configured to adjust a speed of the set of production equipment as a function of the determined productivity levels.

21. The system of claim 20, wherein the control system is configured to determine the productivity level of each worker present at the set of production equipment by retrieving productivity data for the worker from a database;
wherein the control system is configured to determine a combined productivity level based on the determined productivity levels;
wherein the control system is configured to adjust the speed of the set of production equipment as a function of the combined productivity level.

22. The system of claim 20, wherein the control system is configured to track a duration of time each worker has been present at the set of production equipment;
wherein the control system is configured to determine a productivity level of each worker present at the set of production equipment based on the duration of time the worker has been present at the set of production equipment;
wherein the control system is configured to determine a combined productivity level based on the determined productivity levels;
wherein the control system is configured to adjust the speed of the set of production equipment as a function of the combined productivity level.

23. A system for controlling a production line, comprising:
    a set of production equipment;
    a plurality of wearable devices configured to be worn by workers during a work shift;
    a worker detection system;
    wherein the worker detection system is configured to detect a presence of the workers on the set of production equipment by detecting the plurality of wearable devices;
    a control system;
    the control system communicatively connected to the worker detection system;
    wherein the control system is configured to receive data indicative of workers present at the set of production equipment from the worker detection system;
    the control system configured to adjust a speed of the set of production equipment as a function of the received data;
    wherein the control system is configured to track a duration of time each worker has been present at the set of production equipment;
    wherein the control system is configured to, in response to determining the duration of time one of the workers has been present at the set of production equipment exceeds a predetermined threshold, send a notification to prompt the worker to move to a different set of production equipment.

24. A system for controlling a production line, comprising:
    a set of production equipment;
    a plurality of wearable devices configured to be worn by workers during a work shift;
    a worker detection system;
    wherein the worker detection system is configured to detect a presence of the workers on the set of production equipment by detecting the plurality of wearable devices;
    a control system;
    the control system communicatively connected to the worker detection system;
    wherein the control system is configured to receive data indicative of workers present at the set of production equipment from the worker detection system;
    the control system configured to adjust a speed of the set of production equipment as a function of the received data;
    wherein the plurality of wearable devices each have one or more sensors;
    wherein the data received by the control system includes data recorded by the one or more sensors of the plurality of wearable devices;
    wherein the control system is configured to perform data analytics on the received data to determine a physicality rating of the work performed by one or more of the workers; and
    wherein the control system is configured to adjust a rotation schedule for moving the workers to and from the set of production equipment based on the determined physicality rating.

25. A system for controlling a production line, comprising:
    the production line including a set of production equipment;
    a worker detection system;
    the worker detection system configured to detect workers present at the set of production equipment;
    a control system;
    the control system communicatively connected to the worker detection system;
    the control system configured to adjust a speed of the production line as a function of a number of workers present at the set of production equipment.

26. The system of claim 25, wherein the control system is configured to determine productivity levels of the workers present at the set of production equipment;
    wherein the control system is configured to adjust the speed of the production line as a function of the determined productivity levels.

27. The system of claim 25, wherein the control system is configured to determine productivity levels of the workers present at the set of production equipment based on data indicating quality of work being performed by the workers present at the set of production equipment;
    wherein the control system is configured to adjust the speed of the production line as a function of the determined productivity levels.

28. The system of claim 25, wherein the control system is configured to determine a productivity level of each worker present at the set of production equipment by retrieving productivity data for the worker from a database;
    wherein the control system is configured to determine a combined productivity level based on the determined productivity levels;
    wherein the control system is configured to adjust the speed of the production line as a function of the combined productivity level.

29. The system of claim 25, wherein the control system is configured to track a duration of time each worker has been present at the set of production equipment;
    wherein the control system is configured to determine a productivity level of each worker present at the set of production equipment based on the duration of time the worker has been present at the set of production equipment;
    wherein the control system is configured to determine a combined productivity level based on the determined productivity levels;
    wherein the control system is configured to adjust the speed of the production line as a function of the combined productivity level.

30. The system of claim 25, wherein the control system is configured to track a duration of time each worker has been present at the set of production equipment;
    wherein control system is configured to, in response to determining the duration of time one of the workers has been present at the set of production equipment exceeds a predetermined threshold, send a notification to prompt the worker to move to a different production line.

31. The system of claim 25, wherein the control system is configured to track a duration of time each worker has been present at the set of production equipment;
    wherein control system is configured to, in response to determining the duration of time one of the workers has been present at the set of production equipment exceeds a predetermined threshold, send a notification to the worker to prompt the worker to move to a different production line.

32. The system of claim 25, wherein the control system is configured to track a duration of time each worker has been present at the set of production equipment;
    wherein control system is configured to, in response to determining the duration of time one of the workers has been present at the set of production equipment exceeds a predetermined threshold, send a notification to a manager to prompt the worker to move to a different production line.

33. The system of claim 25, further comprising a plurality of wearable devices;
wherein the worker detection system is configured to detect the workers present at the set of production equipment by detecting the plurality of wearable devices.

34. The system of claim 25, further comprising a plurality of wearable devices;
wherein the worker detection system is configured to track geolocation of the plurality of wearable devices.

35. The system of claim 25, further comprising a plurality of wearable devices;
wherein the plurality of wearable devices each have one or more sensors;
wherein the control system is configured to receive data recorded by the one or more sensors of the plurality of wearable devices;
wherein the control system is configured to shut down the production line in response to the received data recorded by the one or more sensors of one of the plurality of wearable devices indicating an accident has occurred.

36. The system of claim 25, further comprising a plurality of wearable devices;
wherein the plurality of wearable devices each have one or more sensors;
wherein the control system is configured to receive data recorded by the one or more sensors of the plurality of wearable devices;
wherein the control system includes:
a database;
the database configured to receive and store the data recorded by the one or more sensors of the plurality of wearable devices;
a data processing system;
the data processing system communicatively connected to the database;
the data processing system configured to determine control operation of the production line as a function of the data stored in the database.

37. The system of claim 25, further comprising a plurality of wearable devices;
wherein the plurality of wearable devices each have one or more sensors;
wherein the control system is configured to receive data recorded by the one or more sensors of the plurality of wearable devices;
wherein the control system is configured to perform data analytics on the received data to determine an optimal schedule for rotation of the workers on to and off of the production line.

38. The system of claim 25, further comprising a plurality of wearable devices; wherein the plurality of wearable devices each have one or more sensors;
wherein the control system is configured to receive data recorded by the one or more sensors of the plurality of wearable devices;
wherein the control system is configured to evaluate the received data to identify accidents, trips, or falls that occur during the work shift of the worker and shut down the production line in response to identifying accidents, trips, or falls.

39. The system of claim 25, further comprising a plurality of wearable devices;
wherein the plurality of wearable devices each have one or more sensors;
wherein the control system is configured to receive data recorded by the one or more sensors of the plurality of wearable devices;
wherein the control system is configured to perform data analytics on the received data to identify repetitive motions of the worker; and
adjust a rotation schedule for moving the workers between production lines to avoid injury due to the repetitive motions.

40. The system of claim 25, further comprising a plurality of wearable devices;
wherein the plurality of wearable devices each have one or more sensors;
wherein the control system is configured to receive data recorded by the one or more sensors of the plurality of wearable devices;
the received data includes biometric measurement data of the worker;
wherein the control system is configured to perform data analytics on the biometric data to determine a physicality rating of the work performed by the worker; and
wherein the control system is configured to adjust a rotation schedule for moving the workers on and off of the production line based on the determined physicality rating.

41. The system of claim 25, further comprising a plurality of wearable devices;
wherein the plurality of wearable devices each have one or more sensors;
wherein the control system is configured to receive data recorded by the plurality of wearable device;
wherein the data received by the control system includes biometric data recorded by the one or more sensors of the plurality of wearable devices;
wherein the control system is configured to perform data analytics on the biometric data to determine a physicality rating of the work performed by the worker; and
wherein the control system is configured to adjust a rotation schedule for moving the workers on and off of the production line based on the determined physicality rating.

42. The system of claim 25, further comprising a plurality of wearable devices;
wherein the plurality of wearable devices each have one or more sensors;
wherein the control system is configured to receive data recorded by the plurality of wearable devices;
wherein the data received by the control system includes motion data recorded by the one or more sensors of the plurality of wearable devices;
wherein the control system is configured to perform data analytics on the motion data to determine a physicality rating of the work performed by the worker; and
wherein the control system is configured to adjust a rotation schedule for moving the workers on and off of the production line based on the determined physicality rating.

43. The system of claim 25, further comprising a plurality of wearable devices;
wherein the plurality of wearable devices each have one or more sensors;
wherein the control system is configured to receive data recorded by the plurality of wearable devices;

wherein the data received by the control system includes accelerometer data recorded by the one or more sensors of the plurality of wearable devices;

wherein the control system is configured to perform data analytics on the accelerometer data to determine a physicality rating of the work performed by the worker; and wherein the control system is configured to adjust a rotation schedule for moving the workers on and off of the production line based on the determined physicality rating.

44. The system of claim 25, further comprising a plurality of wearable devices;

wherein the plurality of wearable devices each have one or more sensors;

wherein the control system is configured to receive data recorded by the one or more sensors of the plurality of wearable devices;

the received data includes motion data of the worker;

wherein the control system is configured to perform data analytics on the motion data to determine a physicality rating of the work performed by the worker; and wherein the control system is configured to adjust a rotation schedule for moving the workers on and off of the production line based on the determined physicality rating.

* * * * *